United States Patent
Okawa

(10) Patent No.: US 9,086,541 B2
(45) Date of Patent: *Jul. 21, 2015

(54) OPTICAL INSTRUMENT AND IMAGING DEVICE

(71) Applicant: Olympus Imaging Corp., Shibuya-ku, Tokyo (JP)

(72) Inventor: Satoshi Okawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,372

(22) Filed: Jun. 17, 2014

(65) Prior Publication Data

US 2014/0293440 A1 Oct. 2, 2014

Related U.S. Application Data

(63) Continuation of application No. PCT/JP2012/082194, filed on Dec. 12, 2012.

(30) Foreign Application Priority Data

Dec. 27, 2011 (JP) ................. 2011-285289

(51) Int. Cl.
*G02B 15/14* (2006.01)
*G02B 7/28* (2006.01)
*G03B 3/10* (2006.01)
*G03B 5/00* (2006.01)
*G02B 7/10* (2006.01)
*G02B 15/16* (2006.01)

(52) U.S. Cl.
CPC ................ *G02B 7/282* (2013.01); *G02B 7/102* (2013.01); *G02B 15/16* (2013.01); *G03B 3/10* (2013.01); *G03B 5/00* (2013.01); *G03B 2205/0046* (2013.01); *G03B 2205/0053* (2013.01)

(58) Field of Classification Search
USPC ................... 359/694–704, 811–830
See application file for complete search history.

(56) References Cited

U.S. PATENT DOCUMENTS

| 5,448,413 A | * | 9/1995 | Kobayashi et al. ........... 359/698 |
| 5,477,298 A | | 12/1995 | Shiina |
| 2003/0030920 A1 | * | 2/2003 | Okawara ...................... 359/823 |
| 2009/0168199 A1 | * | 7/2009 | Ishikawa et al. ............. 359/696 |

FOREIGN PATENT DOCUMENTS

| JP | 2003-172866 | 6/2003 |
| JP | 2010-211175 | 9/2010 |

OTHER PUBLICATIONS

International Search Report (PCT/ISA/210) to PCT Application No. PCT/JP2012/082194. (with translation), Dec. 12, 2012.

\* cited by examiner

*Primary Examiner* — Mohammed Hasan
(74) *Attorney, Agent, or Firm* — John C. Pokotylo; Straub & Pokotylo

(57) ABSTRACT

An optical instrument of the present invention comprises a first ZM group drive section for moving a first lens group, a second ZM group drive section for moving a second lens group, a storage section for storing positional information on position of the first and second lens groups corresponding to focal length, and storing information relating to the movement speed of the first and second lens groups, and a control section for controlling position of the first and second lens groups based on positional information of the first and second lens groups, and controlling the first and second drive sections so as to move the first and second lens groups by synchronizing the movement speed of the first and second lens groups based on information relating to movement speed of the first and second lens groups.

20 Claims, 40 Drawing Sheets

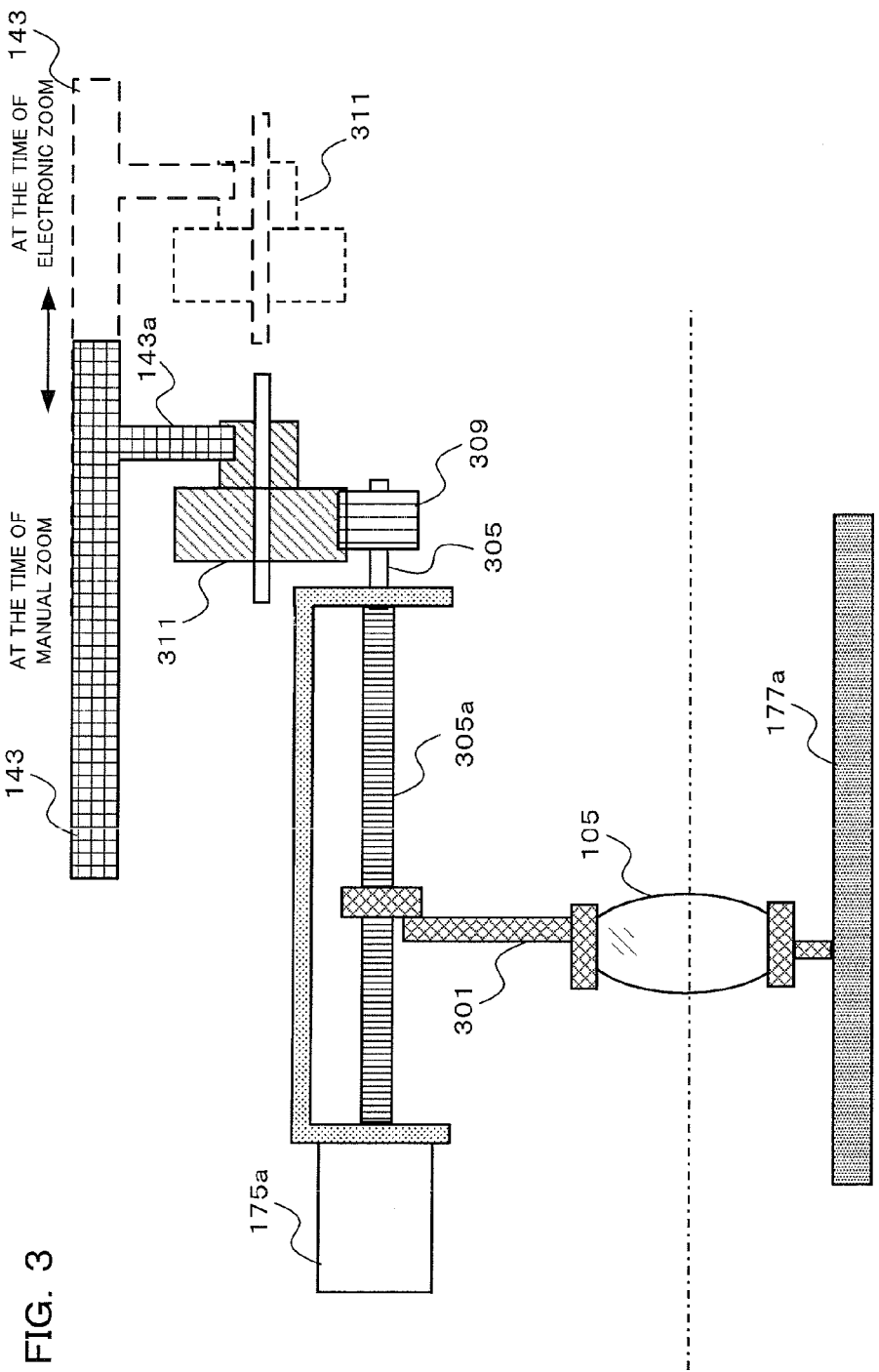

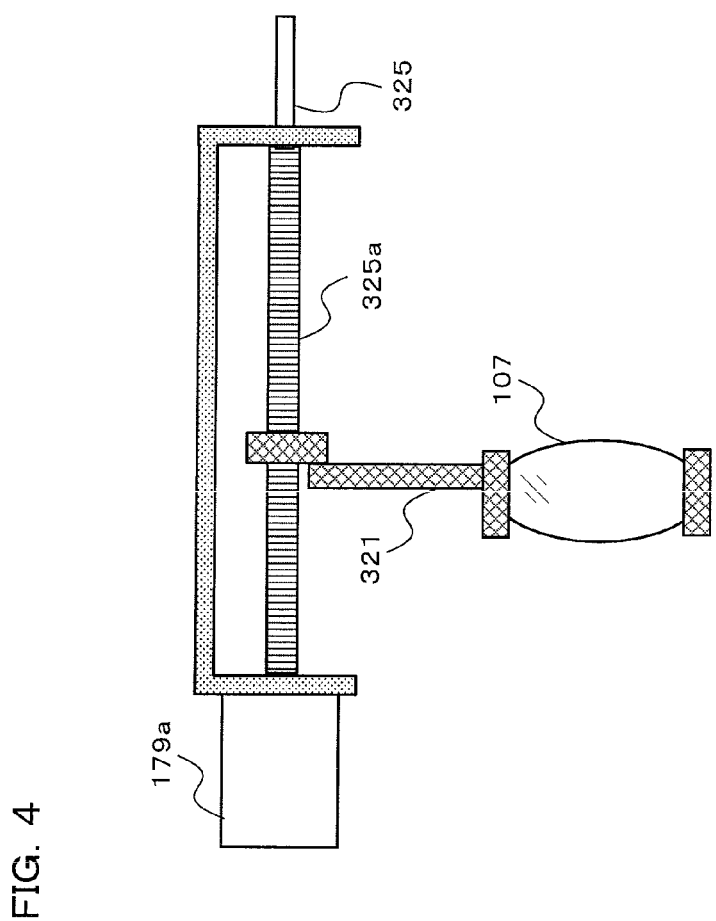

A POINT 177aA

177a

177aOUT

B POINT 177aB

FIG. 7A
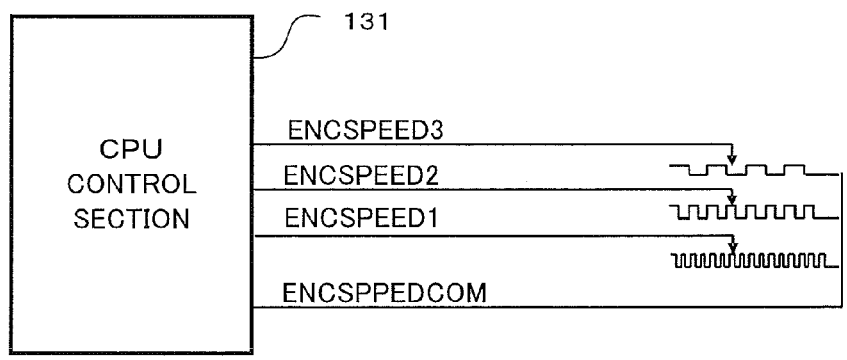
FIG. 7B
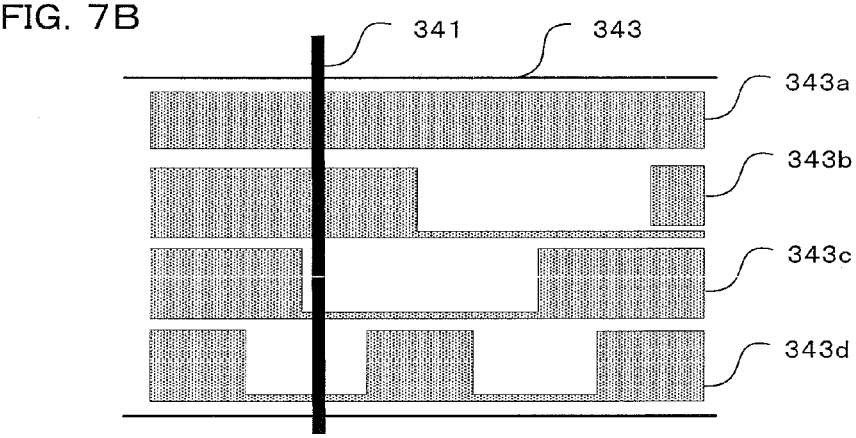
FIG. 7C
| NAME | I/O | FUNCTION |
|---|---|---|
| ENCSPEED1 | I | L:CONTACT  H:NON-CONTACT |
| ENCSPEED2 | I | L:CONTACT  H:NON-CONTACT |
| ENCSPEED3 | I | L:CONTACT  H:NON-CONTACT |
| ENCSPEED··· | I | L:CONTACT  H:NON-CONTACT |
| ENCSPEEDCOM | O | L:ACTIVE, COMMON |

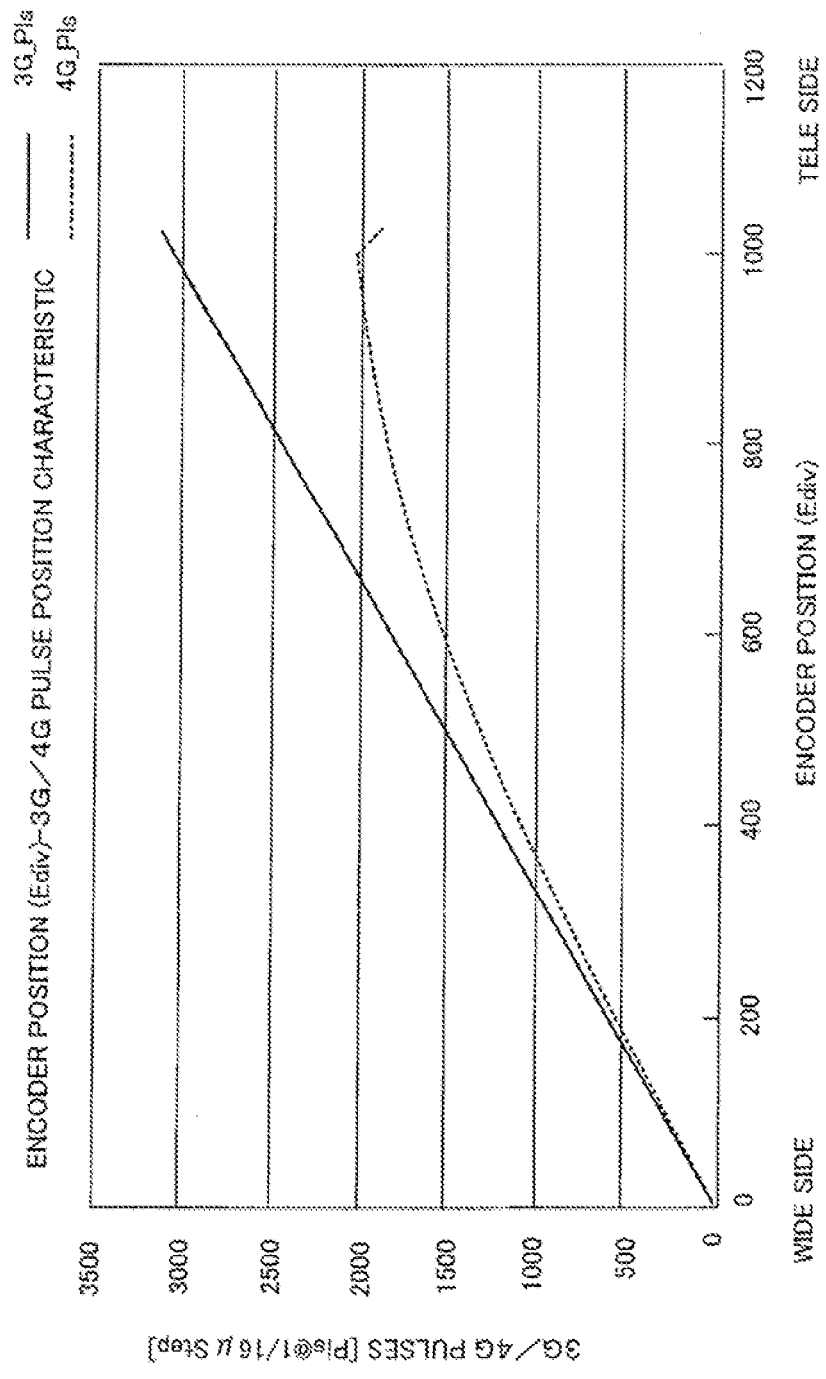

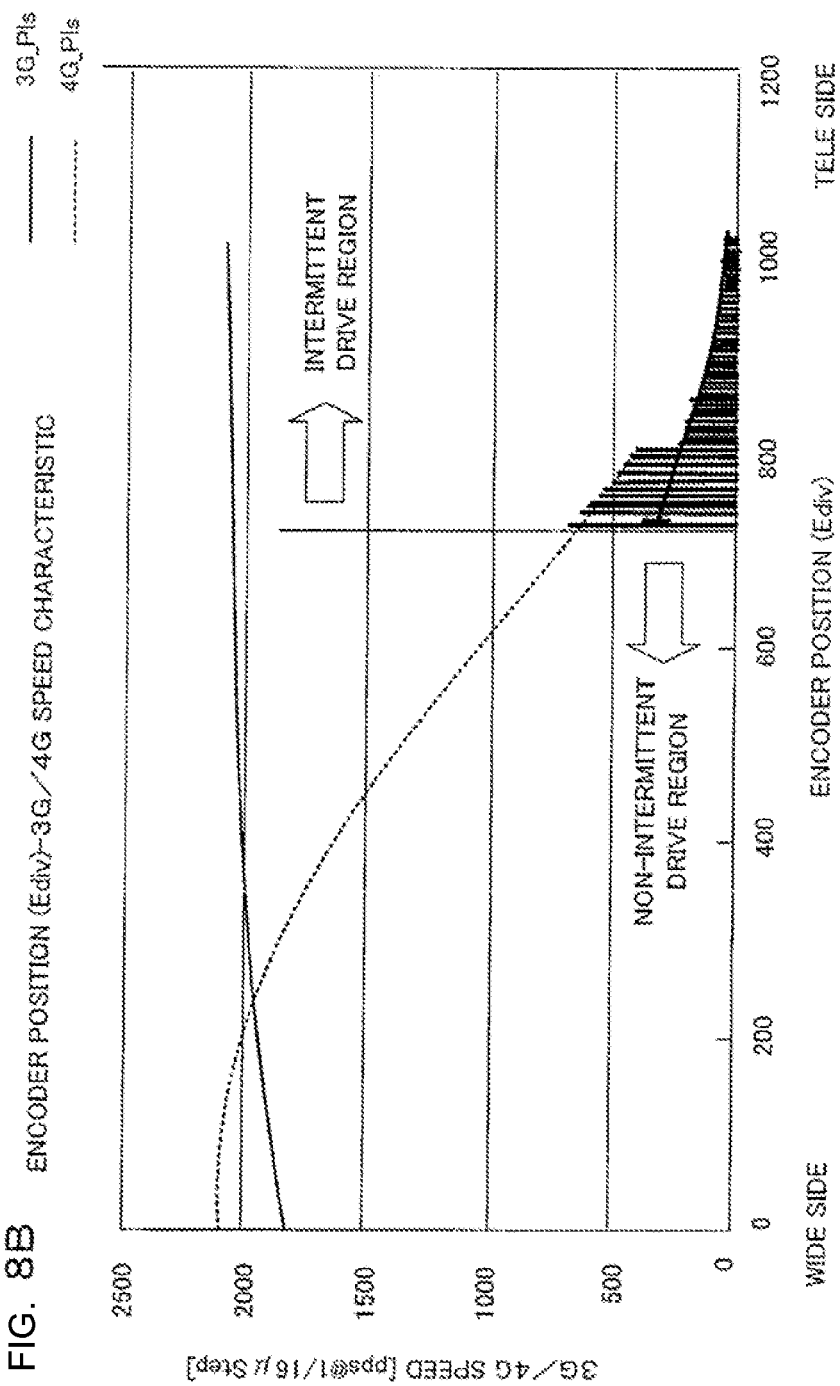

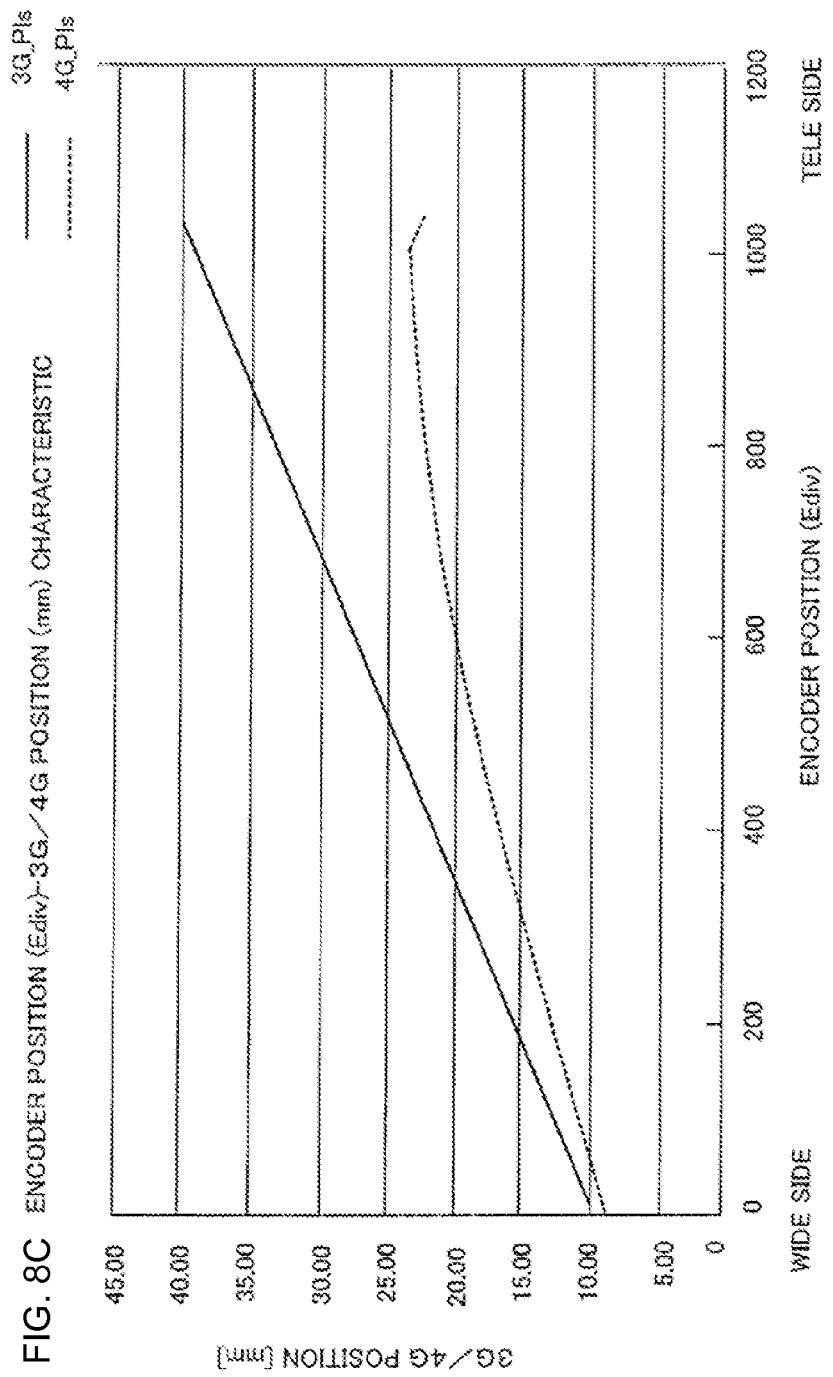

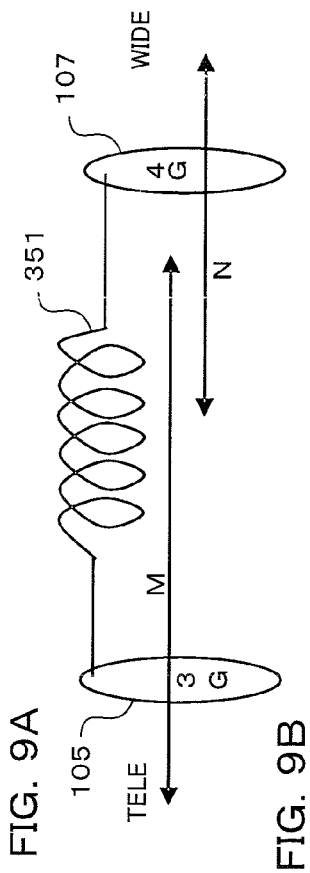
FIG. 9A
FIG. 9B
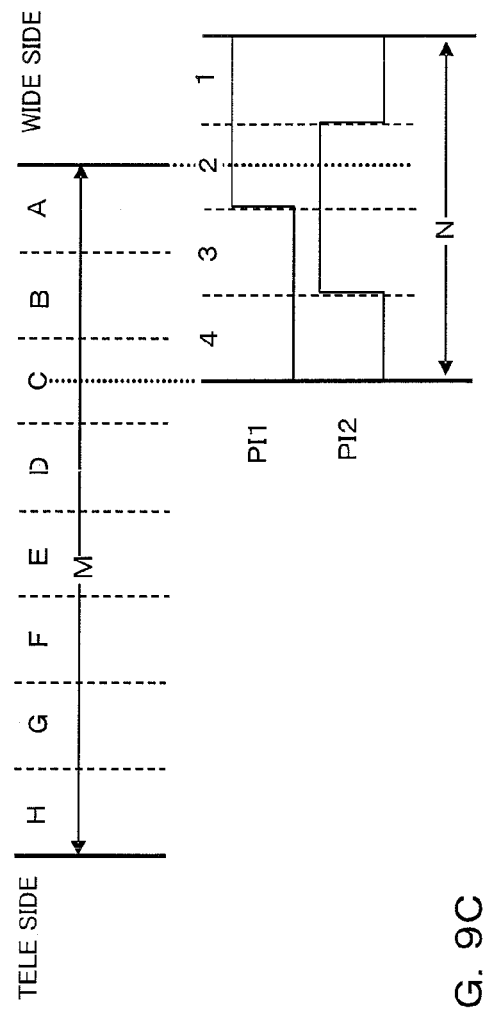
FIG. 9C
| BORDER | A-B | B-C | C-D | D-E | E-F | F-G | G-H |
|---|---|---|---|---|---|---|---|
| AREA⇒Ediv CONVERSION | 132 | 400 | 592 | 670 | 751 | 830 | 909 |
| BORDER | 1-2 | 2-3 | 3-4 |
|---|---|---|---|
| AREA⇒Ediv CONVERSION | 7 | 184 | 593 |

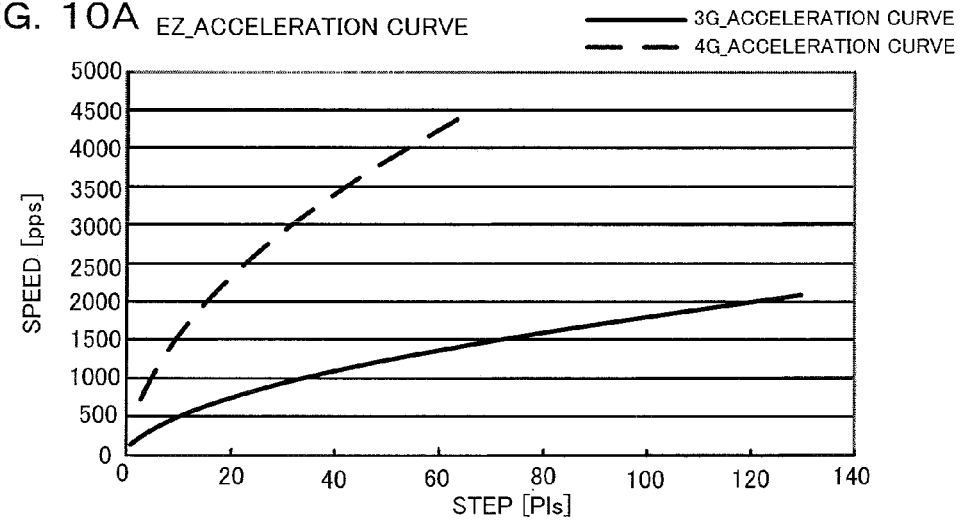
FIG. 10A EZ_ACCELERATION CURVE
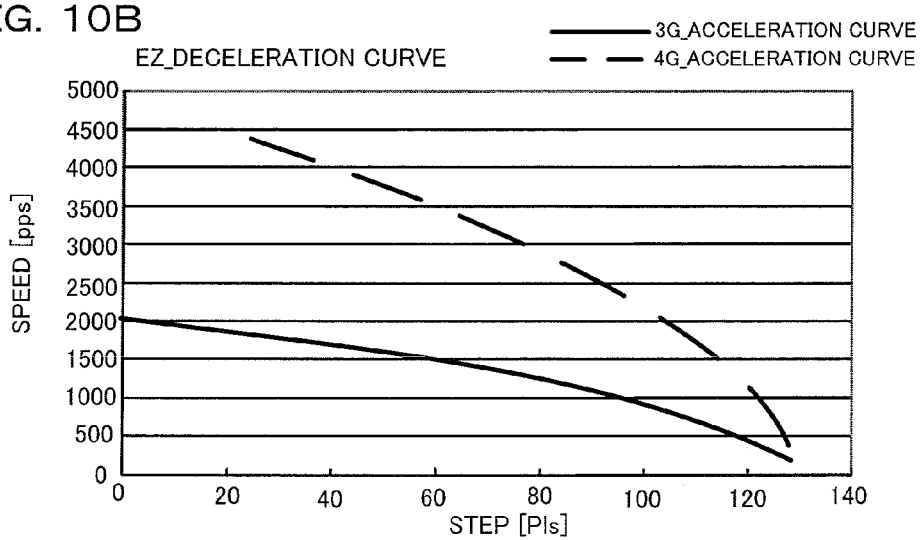
FIG. 10B EZ_DECELERATION CURVE

FIG. 11A

3G—SPEED—AREA—VOLTAGE TABLE

| TEMPERA-TURE | SPEED (GEAR) | 3G AREA | | | | | | | |
|---|---|---|---|---|---|---|---|---|---|
| | | A | B | C | D | E | F | G | H |
| Tf<2 | LOW-SPEED | 2.89 | 2.96 | 3.05 | 3.10 | 3.17 | 3.25 | 3.35 | 3.45 |
| | MEDIUM SPEED | 2.89 | 2.96 | 3.05 | 3.10 | 3.17 | 3.25 | 3.35 | 3.45 |
| | HIGH-SPEED | 3.09 | 3.16 | 3.25 | 3.30 | 3.37 | 3.45 | 3.55 | 3.65 |
| 2<=Tf<17 | LOW-SPEED | 2.84 | 2.91 | 3.00 | 3.05 | 3.12 | 3.20 | 3.30 | 3.40 |
| | MEDIUM SPEED | 2.84 | 2.91 | 3.00 | 3.05 | 3.12 | 3.20 | 3.30 | 3.40 |
| | HIGH-SPEED | 3.04 | 3.11 | 3.20 | 3.25 | 3.32 | 3.40 | 3.50 | 3.60 |
| 17<=Tf<49 | LOW-SPEED | 2.84 | 2.91 | 3.00 | 3.05 | 3.12 | 3.20 | 3.30 | 3.40 |
| | MEDIUM SPEED | 2.84 | 2.91 | 3.00 | 3.05 | 3.12 | 3.20 | 3.30 | 3.40 |
| | HIGH-SPEED | 3.04 | 3.11 | 3.20 | 3.25 | 3.32 | 3.40 | 3.50 | 3.60 |
| 49<=Tf<87 | LOW-SPEED | 2.84 | 2.91 | 3.00 | 3.05 | 3.12 | 3.20 | 3.30 | 3.40 |
| | MEDIUM SPEED | 2.84 | 2.91 | 3.00 | 3.05 | 3.12 | 3.20 | 3.30 | 3.40 |
| | HIGH-SPEED | 3.04 | 3.11 | 3.20 | 3.25 | 3.32 | 3.40 | 3.50 | 3.60 |
| 87<=Tf<99 | LOW-SPEED | 2.84 | 2.91 | 3.00 | 3.05 | 3.12 | 3.20 | 3.30 | 3.40 |
| | MEDIUM SPEED | 2.84 | 2.91 | 3.00 | 3.05 | 3.12 | 3.20 | 3.30 | 3.40 |
| | HIGH-SPEED | 3.04 | 3.11 | 3.20 | 3.25 | 3.32 | 3.40 | 3.50 | 3.60 |

UNITS:V

FIG. 11B

4G—SPEED—AREA—VOLTAGE TABLE

| TEMPERA-TURE | SPEED (GEAR) | 3G AREA | | | | | | | |
|---|---|---|---|---|---|---|---|---|---|
| | | A | B | C | D | E | F | G | H |
| Tf<2 | LOW-SPEED | 3.01 | 2.97 | 2.92 | 2.88 | 3.65 | 3.65 | 3.65 | 3.65 |
| | MEDIUM SPEED | 3.01 | 2.97 | 2.92 | 2.88 | 3.65 | 3.65 | 3.65 | 3.65 |
| | HIGH-SPEED | 3.21 | 3.17 | 3.12 | 3.08 | 3.85 | 3.85 | 3.85 | 3.85 |
| 2<=Tf<17 | LOW-SPEED | 2.96 | 2.92 | 2.87 | 2.83 | 3.60 | 3.60 | 3.60 | 3.60 |
| | MEDIUM SPEED | 2.96 | 2.92 | 2.87 | 2.83 | 3.60 | 3.60 | 3.60 | 3.60 |
| | HIGH-SPEED | 3.16 | 3.12 | 3.07 | 3.03 | 3.80 | 3.80 | 3.80 | 3.80 |
| 17<=Tf<49 | LOW-SPEED | 2.96 | 2.92 | 2.87 | 2.83 | 3.60 | 3.60 | 3.60 | 3.60 |
| | MEDIUM SPEED | 2.96 | 2.92 | 2.87 | 2.83 | 3.60 | 3.60 | 3.60 | 3.60 |
| | HIGH-SPEED | 3.16 | 3.12 | 3.07 | 3.03 | 3.80 | 3.80 | 3.80 | 3.80 |
| 49<=Tf<87 | LOW-SPEED | 2.96 | 2.92 | 2.87 | 2.83 | 3.60 | 3.60 | 3.60 | 3.60 |
| | MEDIUM SPEED | 2.96 | 2.92 | 2.87 | 2.83 | 3.60 | 3.60 | 3.60 | 3.60 |
| | HIGH-SPEED | 3.16 | 3.12 | 3.07 | 3.03 | 3.80 | 3.80 | 3.80 | 3.80 |
| 87<=Tf<99 | LOW-SPEED | 2.96 | 2.92 | 2.87 | 2.83 | 3.60 | 3.60 | 3.60 | 3.60 |
| | MEDIUM SPEED | 2.96 | 2.92 | 2.87 | 2.83 | 3.60 | 3.60 | 3.60 | 3.60 |
| | HIGH-SPEED | 3.16 | 3.12 | 3.07 | 3.03 | 3.80 | 3.80 | 3.80 | 3.80 |

UNITS:V

○ ···VOLTAGE RISE WITH AREA VOLTAGE SETTING
□ ···VOLTAGE RISE WITH GEAR VOLTAGE SETTING
● ···VOLTAGE DROP WITH AREA VOLTAGE SETTING
■ ···VOLTAGE DROP WITH GEAR VOLTAGE SETTING

FIG. 13A EZ SPEED COEFFICIENT GearK

| EZ SPEED COEFFICIENT INDEX | CHANGE COEFFICIENT FOR EACH GEAR | |
|---|---|---|
| 0 | 0.12 | GearK0 |
| 1 | 0.20 | GearK1 |
| 2 | 0.33 | GearK2 |
| 3 | 0.46 | GearK3 |
| 4 | 0.60 | GearK4 |
| 5 | 1.00 | GearK5 |

FIG. 13B EZ SPEED CHANGE COEFFICIENT

| No | SPEED (pps) | COEFFICIENT |
|---|---|---|
| 0 | 200 | 0.400 |
| 1 | 300 | 0.200 |
| 2 | 400 | 0.150 |
| 3 | 500 | 0.080 |
| 4 | 600 | 0.050 |
| 5 | 800 | 0.030 |
| 6 | 1000 | 0.020 |
| 7 | 1200 | 0.012 |
| 8 | 1500 | 0.010 |
| 9 | 4500 | 0.008 |

FIG. 13C LEZ BUTTON (ZOOM RING SPEED) AND EZ SPEED COEFFICIENT CORRESPONDENCE

| BUTTON | INTERNAL GEAR INDEX | | BUTTON STRENGTH |
|---|---|---|---|
| | Mov | Still | |
| 1 | 1 | 1 | LOW |
| 2 | 2 | 3 | MEDIUM |
| 3 | 3 | 5 | HIGH |

FIG. 13D EZ SPEED COEFFICIENT-TEMPERATURE VOLTAGE TABLE CORRESPONDENCE

| EZ SPEED COEFFICIENT INDEX | CORRESPONDING SPEED (GEAR) SELECTION |
|---|---|
| 0 | LOW-SPEED |
| 1 | LOW-SPEED |
| 2 | MEDIUM SPEED |
| 3 | MEDIUM SPEED |
| 4 | HIGH-SPEED |
| 5 | HIGH-SPEED |

FIG. 14

SPEED CHANGE POSSIBLE
DETERMINATION Ediv

Wide->Tele

| CURRENT GEAR INDEX | TARGET GEAR INDEX | | | | | |
|---|---|---|---|---|---|---|
| | 0 | 1 | 2 | 3 | 4 | 5 |
| 0 | 0 | 0 | 0 | 0 | 0 | 0 |
| 1 | 0 | 0 | 32 | 55 | 129 | 205 |
| 2 | 0 | 24 | 0 | 41 | 115 | 191 |
| 3 | 0 | 37 | 31 | 0 | 97 | 173 |
| 4 | 0 | 79 | 73 | 65 | 0 | 110 |
| 5 | 0 | 117 | 111 | 103 | 72 | 0 |

Tele->Wide

| CURRENT GEAR INDEX | TARGET GEAR INDEX | | | | | |
|---|---|---|---|---|---|---|
| | 0 | 1 | 2 | 3 | 4 | 5 |
| 0 | 0 | 0 | 0 | 0 | 0 | 0 |
| 1 | 0 | 0 | 32 | 55 | 129 | 205 |
| 2 | 0 | 24 | 0 | 41 | 115 | 191 |
| 3 | 0 | 37 | 31 | 0 | 97 | 173 |
| 4 | 0 | 79 | 73 | 65 | 0 | 110 |
| 5 | 0 | 117 | 111 | 103 | 72 | 0 |

FIG. 15B  BEZ SETTING-EZ SPEED COEFFICIENT CORRESPONDENCE TABLE

| EZ SPEED | INTERNAL GEAR INDEX | | EXPLANATION OF SPEED |
|---|---|---|---|
| | Mov | Still | |
| 0 | 1 | 1 | LOWEST |
| 1 | 1 | 1 | LOW |
| 2 | 2 | 3 | MEDIUM LOW |
| 3 | 2 | 3 | MEDIUM |
| 4 | 3 | 5 | MEDIUM HIGH |
| 5 | 3 | 5 | HIGH |
| 6 | 3 | 5 | HIGHEST(TRACKING PRIORITY) |
| 7 | 3 | 5 | HIGHEST(ZOOM MOVEMENT PRIORITY) |

FIG. 15C  BEZ BUTTON STRENGTH

| ELECTRONIC ZOOM BUTTON STRENGTH | ELECTRONIC ZOOM BUTTON STRENGTH |
|---|---|
| 1 | LOW |
| 2 | MEDIUM |
| 3 | HIGH |

FIG. 23A
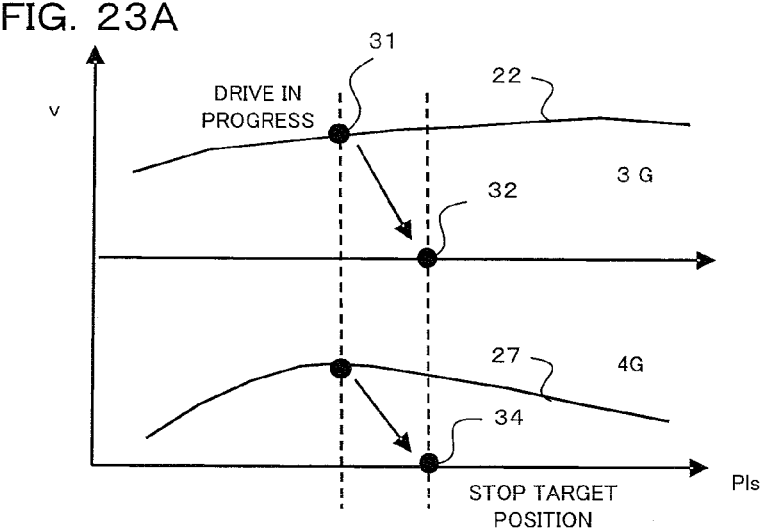
FIG. 23B
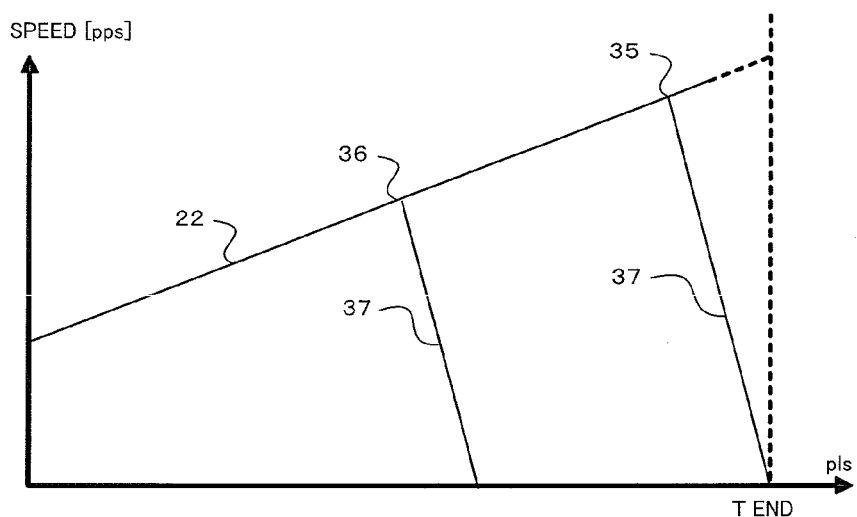
FIG. 23C
| EZ SPEED COEFFICIENT INDEX | WIDE DERECTION | TELE DIRECTION |
|---|---|---|
| 0 | 4 | 6 |
| 1 | 12 | 17 |
| 2 | 15 | 21 |
| 3 | 26 | 30 |
| 4 | 32 | 42 |
| 5 | 40 | 50 |
※UNITS: Ediv

OPTICAL INSTRUMENT AND IMAGING DEVICE

CROSS-REFERENCE TO RELATED APPLICATIONS

This application is a Continuation Application of PCT Application No. PCT/JP2012/082194, filed on Dec. 12, 2012 and based upon and claiming the benefit of priority from prior Japanese Patent Application No. 2011-285289, filed on Dec. 27, 2011, the entire contents of all of which are incorporated herein by reference.

BACKGROUND OF THE INVENTION

1. Field of the Invention

The present invention relates to an optical instrument having a zoom function for varying focal length of an imaging optical system, and being capable of moving a plurality of zoom lens groups independently, and to an imaging device.

2. Description of the Related Art

In order to achieve size reduction of a lens barrel, it has been proposed, instead of a mechanical cam, to drive a front group and rear group of lenses by respective independent motors. For example, Japanese patent laid-open No. Hei. 6-324245 (hereafter referred to as patent publication 1) discloses, in a zoom lens having a front lens group and a rear lens group, a zoom lens unit having a front lens group drive motor and a rear lens group drive motor, that carries out a zoom operation by driving both motors together when a power supply voltage is greater than or equal to a specified value.

SUMMARY OF THE INVENTION

By driving each lens group with an individual motor, as with the zoom lens unit disclosed in patent publication 1, it is possible to do away with the mechanical zoom, making it possible to plan miniaturization of the zoom lens unit. However, if movie shooting is performed with this zoom lens unit there is degradation in image quality of the movie.

Specifically, with the zoom lens disclosed in patent publication 1, since each lens group is individually driven so as to be positioned at an optical zoom position that constitutes the final target, then during movement of each lens group to the target position, the shooting angle of view and focal length characteristics are optically maintained, and no consideration is given to achieving an in focus relationship. As a result, if a zoom operation is carried out during movie shooting or during live view display, variation in shooting angle of view due to the zoom operation becomes unstable, and there is a possibility of degradation in image quality of a movie.

The present invention has been conceived in view of the above described situation, and an object thereof is to provide an optical instrument, configured to carry out a zoom operation by driving a plurality of zoom lens groups using separate actuators, and having a zoom function capable of preventing degradation in image quality as a result of zoom operation during movie shooting or during live view display, and an imaging device.

An optical instrument of the present invention has first and second lens groups capable of moving in an optical axis direction in order to perform optical zooming, and comprises a first drive section for moving the first lens group using a first actuator, a second drive section for moving the second lens group using a second actuator that is different from the first actuator of the first drive section, a storage section for storing information on the position of the first lens group and position of the second lens group in accordance with a specified focal length of the optical instrument, and storing information relating to movement speed of the first lens group and movement speed of the second lens group in accordance with specified focal length, a first lens group position detection section for detecting position of the first lens group, and a control section for calculating a first synchronous speed of the first lens group and a second synchronous speed of the second lens group, which are respective movement speeds for synchronizing the movement speed of the first lens group and movement speed of the second lens group, based on position of the first lens group, and movement speed of the first lens group and movement speed of the second lens group that have been stored in the storage section, calculating a first target position for the first lens group and a second target position for the second lens group based on position of the first lens group and information relating to position information of the first lens group and position information on the second lens group that has been stored in the storage section, and controlling the first drive section and the second drive section so as to respectively move the first lens group to the first target position at the first synchronous speed, and move the second lens group to the second target position at the second synchronous speed.

An imaging device of the present invention, for acquiring image data by forming a subject image on an image sensor, by means of an optical system having first and second lens groups capable of moving in an optical axis direction in order to perform optical zooming, comprises a first drive section for moving the first lens group using a first actuator, a second drive section for moving the second lens group using a second actuator that is different from the first actuator of the first drive section, a storage section for storing information on the position of the first lens group and position of the second lens group in accordance with a specified focal length of the imaging device, and storing information relating to movement speed of the first lens group and movement speed of the second lens group in accordance with specified focal length, a first lens group position detection section for detecting position of the first lens group, and a control section for calculating a first synchronous speed of the first lens group and a second synchronous speed of the second lens group, which are respective movement speeds for synchronizing the movement speed of the first lens group and movement speed of the second lens group, based on position of the first lens group, and movement speed of the first lens group and movement speed of the second lens group that have been stored in the storage section, calculating a first target position for the first lens group and a second target position for the second lens group based on position of the first lens group and information relating to position information of the first lens group and position information on the second lens group that has been stored in the storage section, and controlling the first drive section and the second drive section so as to respectively move the first lens group to the first target position at the first synchronous speed, and move the second lens group to the second target position at the second synchronous speed.

BRIEF DESCRIPTION OF THE DRAWINGS

FIG. 3 is a cross sectional diagram showing the structure of a first zoom group of the interchangeable lens of one embodiment of the present invention.

FIG. 4 is a cross sectional diagram showing the structure of a second zoom group of the interchangeable lens of one embodiment of the present invention.

FIG. 7A-FIG. 7C are drawings for describing a detection mechanism for slide position in an optical axis direction of the zoom function switching member of the interchangeable lens of one embodiment of the present invention, with FIG. 7A being a block diagram showing electrical connections of an encoder, FIG. 7B being a plan view showing structure of a Gray code encoder, and FIG. 7C being a drawing showing respective input and output functions of the encoder.

FIG. 8A is a graph showing drive trajectories of zoom groups of the interchangeable lens of one embodiment of the present invention, and shows a relationship between encoder position for a first zoom group (3G) and a second zoom group, and pulse position.

FIG. 8B is a graph showing drive trajectories of zoom groups of the interchangeable lens of one embodiment of the present invention, and shows a relationship between encoder position for a first zoom group (3G) and a second zoom group, and speed.

FIG. 8C is a graph showing drive trajectories of zoom groups of the interchangeable lens of one embodiment of the present invention, and shows a relationship between encoder position for a first zoom group (3G) and a second zoom group, and position of the first zoom group (3G) and the second zoom group.

FIG. 9A-FIG. 9C are drawings for describing a spring provided between the first zoom group (3G) and the second zoom group (4G) of the interchangeable lens of the one embodiment of the present invention, with FIG. 9A being a schematic drawing showing the arrangement of the first zoom group, the second zoom group and the spring, FIG. 9B being a drawing showing partitioned areas of 3G and 4G, and FIG. 9C being a drawing showing boundaries of the partitioned areas.

FIG. 10A and FIG. 10B are graphs showing acceleration curves for stepping motors at the time of electronic zoom (EZ) mode, in the interchangeable lens of the one embodiment of the present invention, with FIG. 10A being a graph showing an EZ_acceleration curve and FIG. 10B being a graph showing an EZ_deceleration curve.

FIG. 11A and FIG. 11B are drawings showing a relationship between temperature and voltage, in the interchangeable lens of the one embodiment of the present invention, with FIG. 11A being a drawing showing the relationship between speed, area and voltage of the first zoom group (3G), and FIG. 11B being a drawing showing a relationship between speed, area and voltage of the second zoom group (4G).

FIG. 13A-FIG. 13D are drawings showing content of various parameters used in algorithms of the interchangeable lens of one embodiment of the present invention, with FIG. 13A showing EZ speed coefficients, FIG. 13B showing EZ speed change coefficients, FIG. 13C showing a correspondence relationship between LEZ button (zoom ring speed) and EZ speed coefficient, and FIG. 13D showing a correspondence relationship between EZ speed coefficient and temperature dependent voltage.

FIG. 14 is a drawing showing a permissible Ediv for speed change used in an algorithm of the interchangeable lens of one embodiment of the present invention.

FIG. 15A-FIG. 15C are drawings for describing BEZ mode for instructing electronic zoom from the camera body side, in the interchangeable lens of one embodiment of the present invention, with FIG. 15A being a block diagram of the interchangeable lens and the camera body, FIG. 15B being a drawing showing a correspondence relationship between BEZ setting and EZ speed coefficient, and FIG. 15C being a drawing showing BEZ button strength.

FIG. 23A-FIG. 23C are drawings for describing operation of the electronic zoom (EZ) at the time of deceleration, in the interchangeable lens of one embodiment of the present invention, FIG. 23A being a graph showing an outline of trajectories of the first zoom group (3G) and the second zoom group (4G), FIG. 23B being a graph showing trajectories of the first zoom group (3G), and FIG. 23C showing deceleration commencement positions for the wide end and the telephoto end.

DETAILED DESCRIPTION OF THE PREFERRED EMBODIMENTS

Preferred embodiments using an interchangeable lens to which the present invention has been applied will be described in the following in accordance with the drawings. An interchangeable lens of a preferred one embodiment of the present invention is capable of being attached to and detached from a camera body. This camera body has an imaging section, with a subject image being converted to image data by this imaging section, and live view display and shooting carried out based on this converted image data. Communication is possible between the camera body and the interchangeable lens, with the interchangeable lens being operated in accordance with instructions from the camera body, and status of the interchangeable lens being transmitted to the camera body. Also, first and second zoom groups, and actuators for each zoom group, are arranged in the interchangeable lens, and it is possible to adjust focal length by moving the positions of these zoom lens groups.

Figure 1:
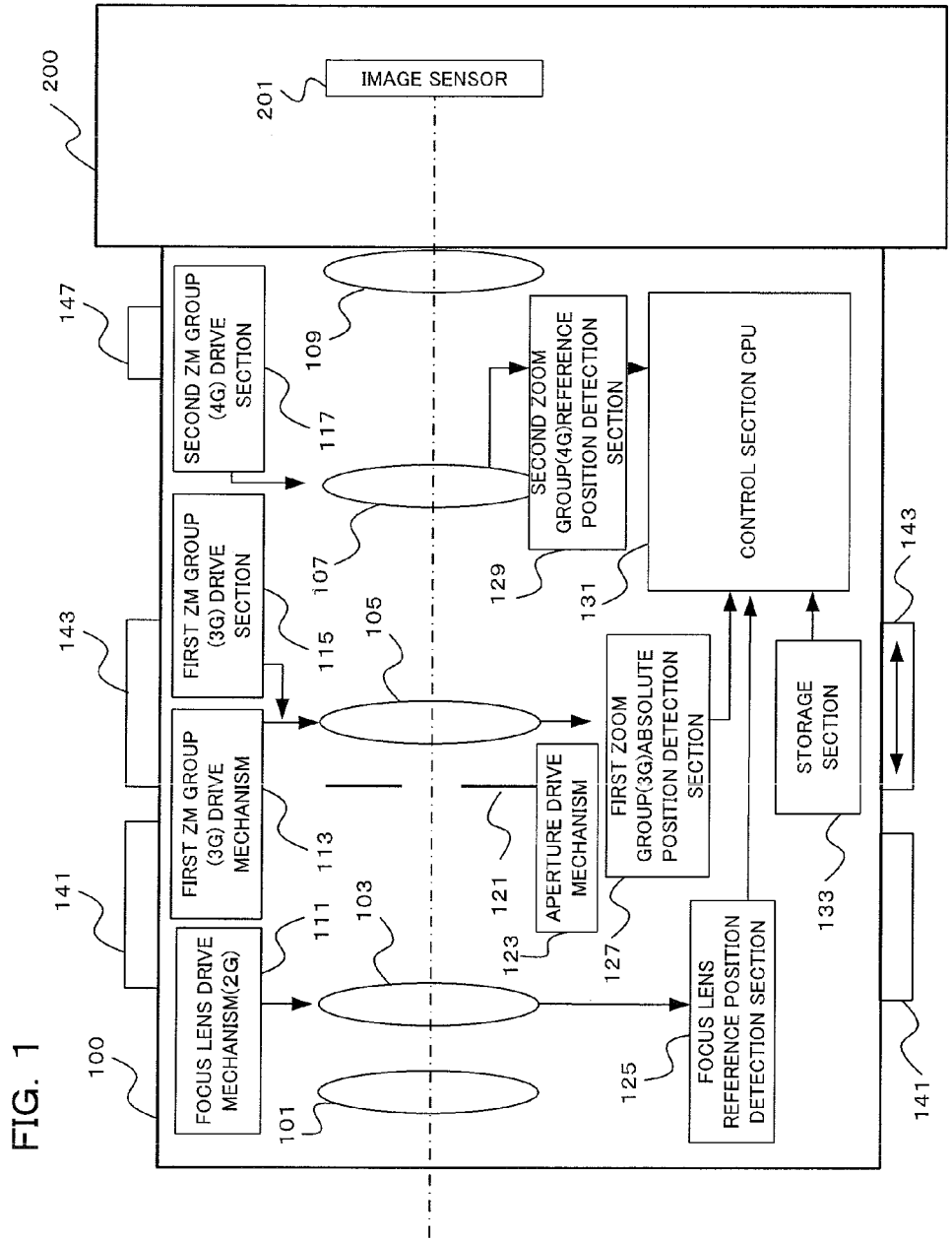
FIG. 1 is a block diagram showing the structure of an interchangeable lens relating to one embodiment of the present invention.
Figure 2:
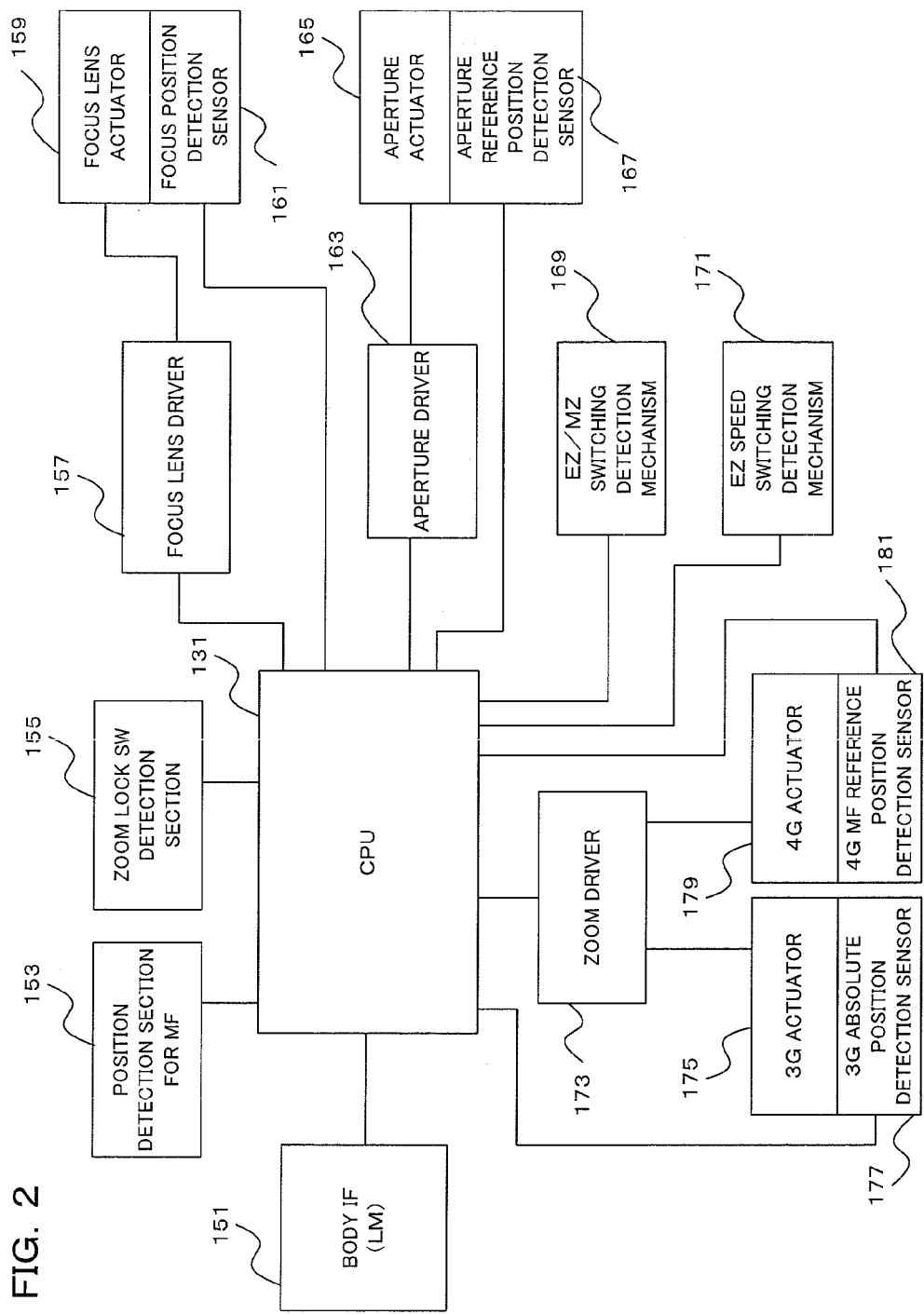
FIG. 2 is a functional block diagram of the interchangeable lens of one embodiment of the present invention.

FIG. 1 is a block diagram showing the structure of an interchangeable lens 100, and FIG. 2 is a functional block diagram of the inside of the interchangeable lens 100. The interchangeable lens 100 is attached to or detached from a camera body 200. A total of five lens groups, namely a first lens group (1G) 101, a focus lens group (2G) 103, a first zoom group (3G) 105, a second zoom group (4G) 107, and a third lens group (5G) 109, are arranged on the same optical axis within the interchangeable lens 100, as an imaging optical system. Each lens group may also be constituted by a simple lens. The first lens group 101 and the third lens group 109 are fixed lens groups.

The focus lens group 103 constituting the second group (2G) within the imaging optical system is a lens group for focusing, and is capable of being moved in the optical axis direction by a focus lens drive mechanism (2G) 111. An actuator 159, such as a stepping motor, and a focus lens driver 157, are provided within the focus lens drive mechanism 111 (refer to FIG. 2), and drive of the focus lens 103 is carried out in accordance with control signals from a control section 131. A focus lens reference position detection section 125 has a focus position detection sensor 161 for detecting position from reference position of the focus lens group 103 (refer to FIG. 2), and outputs a detection result to the control section 131. As a result, the control section 131 carries out drive control of the focus lens group 103 by the focus lens drive mechanism 111 to a position for the focus lens group 103 to be driven to by calculating relative position from the reference position that has been detected by the focus lens reference position detection section 125, based on drive pulses of a stepping motor.

Also, an MF ring 141 is a rotation operation member for manual focus, and is provided to be rotatable around the outside of the interchangeable lens 100. An MF position detection section 153 (refer to FIG. 2) detects rotation direction and rotation amount of the MF ring 141, and outputs a detection result to the control section 131. If the user operates the MF ring 141, the control section 131 moves the focus lens group 103 backwards and forwards along the optical axis direction using electrical power, using the focus lens actuator 159 within the focus lens drive mechanism 111, in accordance with rotation direction and rotation amount that have been detected by the MF position detection section 153.

A zoom optical system is constituted by the first zoom group 105 constituting the third group (3G) within the imaging optical system, and the second zoom group 107 constituting the fourth group (4G) (hereafter zoom will sometimes be referred to as ZM). The first zoom group 105 and the second zoom group 107 are respectively independently driven, but a spring is provided between the two, and the two lens groups are brought together by this spring. This spring will be described later using FIG. 9A-FIG. 9C.

The first and second zoom groups 105 and 107 are switched between three modes, namely macro, electronic zoom (EZ) and mechanical manual zoom (MZ), by a sliding operation in the optical axis direction using a zoom function switching operation member 143. Macro mode is a mode adopted for close-up shooting. Electronic zoom mode is a mode for carrying out a zooming operation using an actuator, such as a stepping motor, at a drive speed corresponding to a rotation operation of the zoom function switching operation member 143. Mechanical manual zoom mode is a mode for carrying out a zooming operation manually, in accordance with a turning operation of the zoom function switching operation member 143. Switching positions of modes using the zoom function switching operation member 143 will be described later using FIG. 6.

The first zoom group 105 (3G) is moved in the optical axis direction by a first ZM group drive mechanism 113 or a first ZM group drive section 115. The first ZM group drive mechanism 113 moves the first zoom group 105 in the optical axis direction by manual operation by the user when mechanical manual zoom mode is set, while the first ZM group drive section 115 moves the first zoom group 105 in the optical axis direction using an actuator when electronic zoom mode is set.

The first ZM group drive section 115 has a zoom driver 173 and a 3G actuator 175 (refer to FIG. 2). A stepping motor is used as the 3G actuator, and fine control is carried out using micro step drive. With this embodiment, a stepping motor has been adopted, but besides a stepping motor it is also possible to adopt another drive source, such as a DC motor.

If the user performs an operation to move the zoom function switching operation member 143 in the optical axis direction to switch to mechanical manual zoom, the zoom function switching operation member 143 functions as a manual zoom ring. At this time, the first ZM group drive mechanism 113 causes the first zoom group 105 to move in the optical axis direction in accordance with rotation direction and rotation amount of the zoom function switching operation member 143.

If the user performs an operation to move the zoom function switching operation member 143 in the optical axis direction to switch to electronic zoom, the zoom function switching operation member 143 functions as an electronic zoom ring. At this time, the first ZM group drive section 115 causes the first zoom group 105 to move towards the infinity end or the close-up end, under the drive force of an actuator within the first ZM group drive section 115, in accordance with rotation direction of the zoom function switching operation member 143. At this time the first zoom group 105 is driven at a zooming speed corresponding to rotation amount (rotation angle) of the zoom function switching operation member 143. Switching of the first ZM group drive mechanism 113 and the first ZM group drive section 115 using the zoom function operation member 143 will be described later using FIG. 3.

A first ZM group absolute position detection section 127 has a linear encoder as a 3G absolute position detection sensor 177, and absolute position of the first zoom group 105 is detected by this linear encoder. The detection result from the ZM group absolute position detection section 127 (3G absolute position detection sensor 177) is output to the control section 131. The linear encoder will be described later using FIG. 5A and FIG. 5B.

The second zoom group (4G) 107 constituting the zoom optical system is moved in the optical axis direction by a second group drive section 117. The second group drive section 117 has a zoom driver 173 and a 4G actuator 179 (refer to FIG. 2). The second zoom group 107 carries out a tracking operation to a position corresponding to the position of the first zoom group 105. Specifically, position of the second zoom group 107 is moved by the 4G actuator 179 in accordance with position of the first zoom group that has been detected by the first ZM group absolute position detection section 127 so as to obtain an image with intended shooting angle and focal length characteristic and that is also focused. Behavior of the zoom groups in each mode will be described later using FIG. 18 to FIG. 27. In the event that mechanical manual zoom mode has been set, the first zoom group 105 is driven manually by the user, but the second zoom group 107 is electrically driven in accordance with position of the first zoom group 105 even if mechanical manual zoom mode has been set.

As the 4G actuator 179 within the second group drive section 117, a stepping motor is adopted in this embodiment, similarly to the first ZM group drive section 115, but besides a stepping motor another drive source may also be adopted, such as a DC motor. Also, with this embodiment the zoom driver 173 doubles as a driver circuit for the first ZM group drive section 115 and the second group drive section 117, but driver circuits respectively dedicated to the first ZM group drive section 115 and the second group drive section 117 may also be provided.

A second zoom group reference position detection section 129 detects reference position of the second zoom group 107, and outputs to the control section 131. Specifically, the second ZM group reference position detection section 129 uses a photo interrupter (PI) of a 4G reference position detection sensor 181 to acquire a reference position, and position is controlled using detection of relative position from this reference position. Here, reference position is a position at a specified time, and relative position is calculated by counting PI from this position.

The reason why position of the first zoom group 105 is controlled by carrying out absolute position detection using the first ZM group absolute position detection section 127, and the position of the second lens group 109 is controlled by detecting relative position using the second ZM group reference position detection section 129, is as follows. Here, absolute position detection refers to ascertaining an absolute position, for example, and relative position detection refers to ascertaining a position at a relative position with respect to a reference absolute position. In the case of using a stepping motor as the actuator, it is possible to carry out control of relative position in accordance with a number of steps of the stepping motor. It is therefore possible, with relative position detection, to simplify the mechanical structure, regarding use of space, and realize cost and space saving.

However, with this embodiment, the drive mechanism for the first zoom group 105 and the second zoom group 107 is switched in accordance with a switching operation of the zoom function switching operation member 143, and in the case of operating with mechanical manual zoom excitation position of the stepping motor is offset. Also, with mechanical manual zoom, since it is drive with external force, a pulse count of the stepping motor is also offset. Therefore, if relative position detection is carried out in order to correct the offset position, it is necessary to detect an initial position at the time of initial drive every time the zoom function is switched. This initial drive every time mode function is switched results in a wait for the initial drive time, which degrades operability.

With this embodiment, therefore, initial drive is avoided by detecting absolute position of one of the zoom lens groups. If absolute value detection is performed for two zoom lens groups together, space also becomes necessary and cost is increased. Therefore, operability, cost, and utilization of space are all improved by performing absolute position detection for one zoom lens group and performing relative position detection for the other zoom lens group.

An aperture 121 is arranged in an optical path of the imaging optical system, and drive control for opening amount of the aperture is performed by an aperture drive mechanism 123. The aperture drive mechanism 123 comprises an aperture actuator 165, an aperture driver 163, and an aperture reference position detection sensor 167 (refer to FIG. 2). The aperture actuator 165 uses a stepping motor, and fine control is carrying out using micro step drive. The aperture driver 163 is an aperture actuator drive circuit. The aperture reference position detection sensor 167 acquires reference position of the aperture, and controls position by relative position detection. A photo interrupter (PI) is used in reference position detection.

The zoom function switching operation member 143 is provided so as to be capable of sliding and turning on the outside of the interchangeable lens 100, and by sliding the position in the optical axis direction backwards and forwards switching between macro, electronic zoom (EZ) and mechanical manual zoom (MZ) is carried out. An EZ/MZ switching detection mechanism 169 carries out detection of switching position as a result of sliding operation of the zoom function switching operation member 143, and outputs to the control section 131 (refer to FIG. 2). In FIG. 1, switching is carried out by sliding the zoom function switching operation member 143 laterally, or in other words sliding towards the subject or towards the camera. Detection of switching position using the slide operation is carried out using a Gray code encoder etc.

If the zoom function switching operation member 143 is slid in the optical axis direction to switch to mechanical manual zoom, it is possible to freely rotate the zoom function switching operation member 143, and the first zoom group is driven manually without electrical control in accordance with the amount of rotational movement, and it is possible to change the focal length.

On the other hand, if the zoom function switching operation member 143 is slid in the optical axis direction to switch to electronic zoom, the zoom function switching operation member 143 becomes configured so that it can only be rotated in a specified rotational range by a mechanical structure. At this time, by moving the zoom function switching operation member 143 in a rotational direction, electronic zoom is carried out at a speed corresponding to rotation angle (rotation amount). With this embodiment, the drive is carried out in three speed stages in accordance with rotational angle. The EZ speed switching detection mechanism 171 (refer to FIG. 2) detects rotational angle and rotation direction in the wide/telephoto direction of the zoom function switching operation member 143 at the time of electronic zoom, and outputs detection results to the control section 131. In this embodiment, the EZ speed switching detection mechanism 171 has a Gray code encoder, and encodes rotational angle of the zoom function switching operation member 143 for output to the control section 131. The Gray code encoder will be described later using FIG. 7A-FIG. 7C.

If the zoom function switching operation member 143 is slid in the optical axis direction to select macro, then rotation operation of the zoom function switching operation member 143 is prohibited, and the first zoom group 105 and the second zoom group 107 are electrically driven to predetermined positions that are stored in a storage section 133. The predetermined positions are optical positions suitable for macro shooting. The focus lens group 103 may also be moved to a predetermined position.

A zoom lock switch 147 is a mechanical lock structure arranged on the outside of the interchangeable lens 100. Specifically, if the zoom function switching operation member 143 is always made slidable in the optical axis direction, there is a possibility that the mode may be switched contrary to the intention of the user. Therefore, sliding of the zoom function switching operation member 143 to perform a switching operation for macro, electronic zoom and mechanical manual zoom is only permitted when the zoom lock switch 147 is operated. With this embodiment, the detection of mode switching is carried out by detection of the zoom function switching operation member 143, but it is also possible to carry out state detection for state of the zoom lock switch 147 in a zoom lock SW detection section 155.

The control section 131 has a CPU, and is connected to sensors such as the focus lens reference position detection section 125, the ZM group absolute position detection section 127 that includes the 3G absolute position detection sensor 177, the second ZM group reference position detection section 129 that includes the 4G reference position sensor 181, the electrical Z/manual Z switching detection mechanism 169, the EZ speed switching detection mechanism 171 etc. The control section 131 is also connected to the focus lens drive mechanism 111 that includes the focus lens driver 157, the aperture drive mechanism 123 that includes the aperture actuator 165, the first ZM group drive section 115 that includes the 3G actuator 175, and the second ZM group drive section 117 that includes the 4G actuator 179 etc. The control section 131 carries out internal control of the interchangeable lens 100, for example, various controls such as zoom control, manual focus control, autofocus control, aperture control etc. by outputting control commands to actuators etc. depending on detection results of the above described sensors etc., in accordance with programs that have been stored in the storage section 133.

The control section 131 also carries out various controls, as zoom control, such as drive at the time of start-up, constant speed drive, deceleration drive, drive speed change, intermittent/non-intermittent drive, etc. Also, at the time of zoom control, the control section 131 controls the second zoom group drive section 117 based on detection output of the second ZM group reference position detection section 129 in accordance with position of the first zoom group 105 that has been detected by the ZM group absolute position detection section 127, so that a focused subject image is obtained that has desired shooting angle of view and focal length characteristics. The control section 131 also carries out communication with control sections within the camera body 200 via a body IF 151, and carries out control within the interchangeable lens 100 in accordance with control commands output by the camera body 200.

The storage section 133 is an electrically rewritable non-volatile memory, such as flash memory, and as well as the previously described programs for causing operation of the control section 131, stores positional relationships of the second zoom group 107 in accordance with position of the first zoom group 105. Also, as will be described later, various parameters shown in FIG. 11A and FIG. 11B, FIG. 13A to FIG. 15C etc. are also stored.

An image sensor 201 is arranged within the camera body 200, on the optical axis of the imaging optical system. A subject image that has been formed by the imaging optical system is converted to image signals by the image sensor 201, and subjected to live view display on a display section by non-illustrated circuits etc., and image data is stored in a storage medium.

Next, the first zoom group 105 and its switching mechanism will be described using FIG. 3. The zoom function switching operation member 143, that is provided capable of rotation around the outside of the interchangeable lens 100 and sliding in the optical axis direction, is capable of movement in the left right direction on the sheet of FIG. 3. A projecting section 143a of the zoom function switching operation member 143 is fixed to a step-up gear 311. As a result, if the zoom function switching operation member 143 is slid along the optical axis direction the step-up gear 311 also moves along the optical axis direction. In FIG. 3, a dashed line shows the position at the time of electronic zoom, and a solid line shows position at the time of mechanical manual zoom.

The step-up gear 311 meshes with a motor shaft gear 309. At the time of mechanical manual zoom, if the zoom function switching operation member 143 is turned around the outside of the interchangeable lens 100, the step-up gear 311 also turns, and the motor shaft gear 309 also rotates. This motor shaft gear 309 is supported by a motor shaft 305, and the motor shaft 305 is integrally formed with a rotation shaft of a stepping motor 175a.

A screw thread 305a is provided on part of the surface of the motor shaft 305, and a lens support section 301 is engaged on this thread 305a. The lens support section 301 holds the first zoom group 105 close to the center, and at the other end contacts a linear encoder 177a.

With this type of structure, if the zoom function operation member 143 is slid to the left side in FIG. 3, mechanical manual zoom mode is switched to. At the time of mechanical manual zoom, the step-up gear 311 and the zoom function switching operation member 143 are linked by a clutch system. If the zoom function switching operation member 143 is subjected to a rotation operation, the motor shaft gear 309 is rotated, overcoming the detent torque of the stepping motor 175a, the motor shaft 305 that is integral with the motor shaft gear 309 also rotates, and the first zoom group 105 moves in the optical axis direction.

If the zoom function operation member 143 is slid to the right side in FIG. 3, electronic zoom mode is switched to. At the time of electronic zoom, the step-up gear 311 is disengaged from the motor shaft gear 309, and the first zoom group 105 does not move even if the zoom function operation member 143 is subjected to a rotation operation. At this time instructions are sent from the control section 131→the zoom driver 173→the 3G actuator 175 (stepping motor 175a). In this way, the motor shaft 305 rotates and the first zoom group 105 is driven.

The ZM group absolute position detection section 127 (3G absolute position detection sensor 177) always detects absolute position of the first zoom group 105, regardless of a mechanical manual zoom, electronic zoom or macro state, and outputs the detected absolute position to the control section 131. The 3G absolute position detection sensor 177 adopts a linear encoder 177a in this embodiment. This linear encoder 177a will be described later using FIG. 5A and FIG. 5B.

Next, the second zoom group 107 and its drive mechanism will be described using FIG. 4. For controlling position of the second zoom group 107, an absolute position as a reference is detected by the photo interrupter (PI), as a 4G reference position detection sensor 181, and then the position of the second zoom group 107 is relatively controlled by a stepping motor, regardless of whether electronic zoom, mechanical manual zoom, or monochrome mode is set.

A rotational shaft of the stepping motor 179a is integral with a motor shaft 325. A screw thread 325a is provided on part of the surface of the motor shaft 325, and a lens support section 321 is engaged with this screw thread 325a. The lens support section 321 holds the second zoom group 107 close to the center.

With this type of structure, at the time of mechanical manual zoom the second zoom group 107 is relatively driven by the stepping motor 179a. The second zoom group 107 is not driven by a manual operation from outside. The control section 131 references the storage section 133, and electrically performs tracking drive to a position of the second zoom group 107 corresponding to the first zoom group 105. Also, at the time of electronic zoom, electrical drive is performed in accordance with speed instructions received in accordance with rotation direction of the zoom function switching operation member 143. Reference position is known from initial drive at the time of power up, and positional control is carried out to a relative position based on a number of steps of the stepping motor 179a.

Figure 5A:
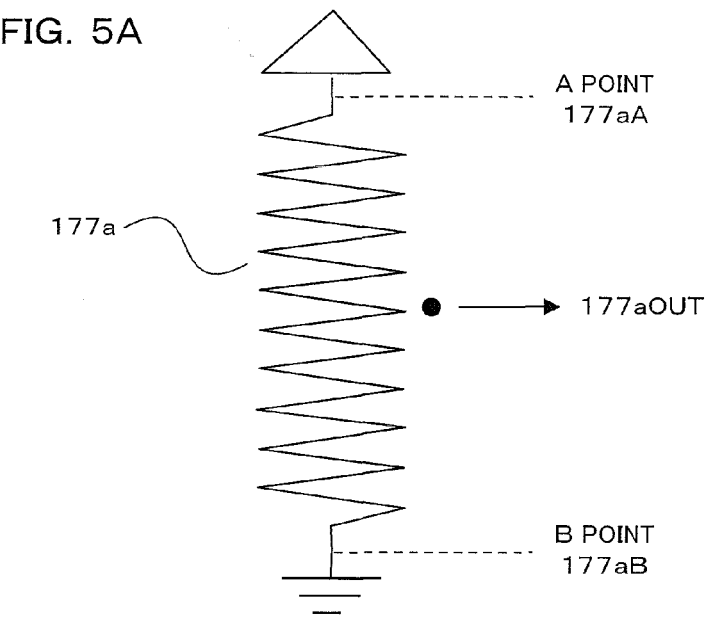
FIG. 5A and FIG. 5B are for a linear encoder of the interchangeable lens of one embodiment of the present invention, with FIG. 5A being a drawing showing the electrical structure of the linear encoder, and FIG. 5B being a graph showing an output characteristic of the linear encoder.
Figure 5B:
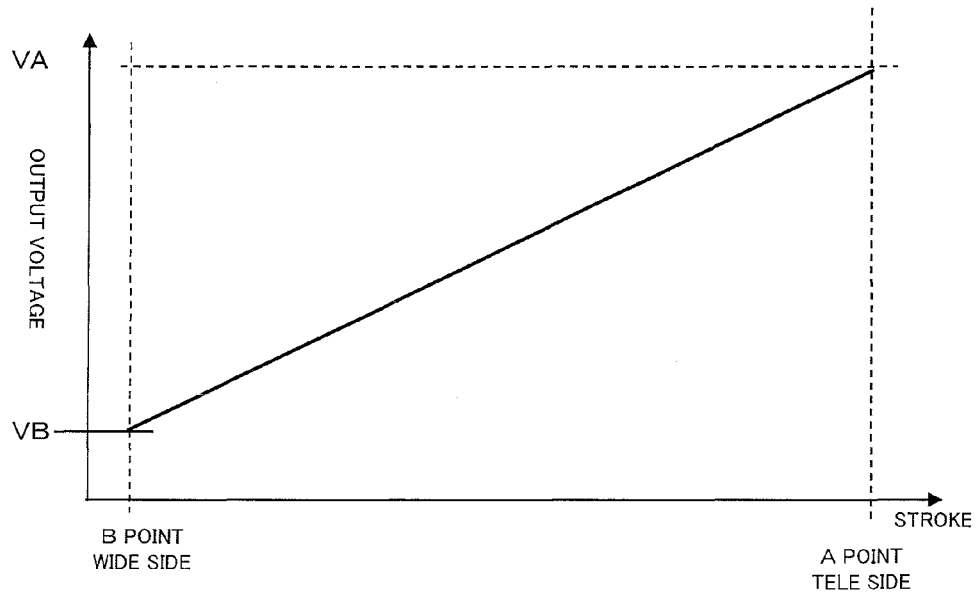

Next, the linear encoder 177a shown in FIG. 3 will be described using FIG. 5A and FIG. 5B. This linear encoder 177a is a constituent part of the ZM group absolute position detection section 127, and detects an absolute position of the first zoom group 105. The linear encoder 177a is a resistive slider type electrical component, as shown in FIG. 5A, with point A (177aA) being connected to a power supply Vcc, point B (177aB) being connected to ground (GND), and an output point 177aOUT being mechanically slid in accordance with position of the first zoom group 105. If the position of the output point 177aOUT is varied, a resistively divided output voltage varies as shown in FIG. 5B. Output voltage of the linear encoder 177a is converted to digital data by an AD converter, and output to the control section 131.

Figure 6:
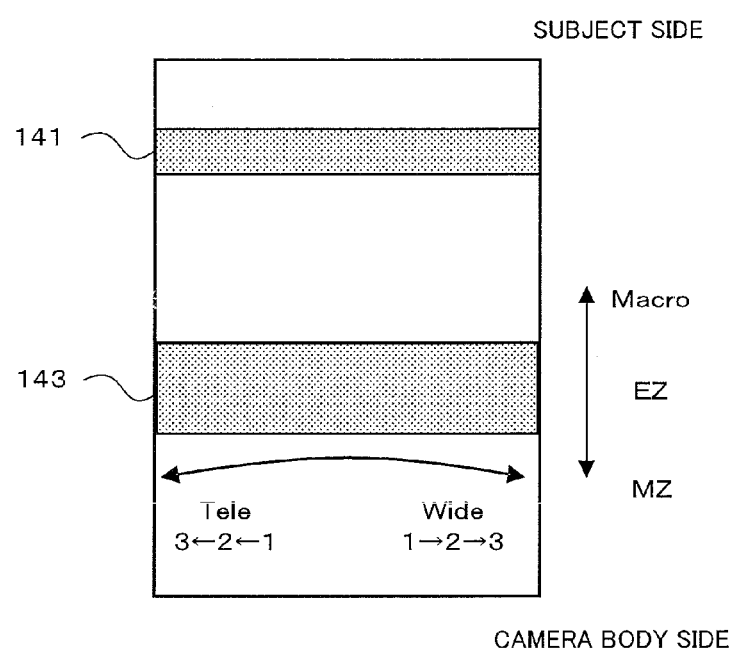
FIG. 6 is a drawing for describing operating states of a zoom function switching member of the interchangeable lens of one embodiment of the present invention.

Next, switching of zoom speed settings at the time of electronic zoom will be described using FIG. 6. FIG. 6 is a drawing of the outer periphery of the interchangeable lens 100 expanded out to a plan view. The MF ring 141 functioning as a manual focus ring is arranged on the outer periphery of the interchangeable lens 100, toward the subject side of the interchangeable lens 100, while the zoom function switching operation member 143 functioning as a zoom ring is arranged toward the camera body side of the interchangeable lens 100.

As described previously, the zoom function switching operation member 143 is capable of sliding in the optical axis direction (also called the Z direction), and if it is slid in the Z direction the mode of the interchangeable lens 100 is sequentially switched, from the subject side, from macro mode, to electronic zoom (EZ) mode, to mechanical manual zoom (MZ) mode.

When electronic zoom mode is set, if the zoom function switching operation member 143 is rotated in a clockwise direction (to the right in FIG. 6), zooming is performed to the wide end, while if the zoom function switching operation member 143 is rotated in a counter clockwise direction (to the left in FIG. 6) zooming is performed to the telephoto end. It is possible to adjust the zooming speed in accordance with rotation amount (rotational angle) from the center position at this time. A center position is made a neutral position (a position that is not driven to either the wide end or the telephoto end), and if rotation amount from the center position is large zooming speed becomes high speed. With the illustrated example, there are three stages of speed change, namely, speed 3 (high-speed)>speed 2 (medium speed)>speed 1 (low speed).

Detection of turning angle and rotational direction of the zoom function switching operation member 143 is detection using the EZ speed switching detection mechanism 171. This EZ speed switching detection mechanism 171 has the Gray code encoder shown in FIG. 7B. A rotor linked to operation of this operation member is provided on the zoom function switching operation member 143, and positional detection for rotational direction of the zoom function switching operation member 143 is carried out by varying contact position of a contact piece 341 provided on the rotor with Gray code patterns 343a-343d of the encoder flexible substrate 343.

Detection patterns of the encoder flexible substrate 343 constitute a Gray code encoder, as shown in FIG. 7B. The control section 131 shown in FIG. 7A has an internally set pull up connection, and ENCSPEED1-3 constitute input settings. ENCSPEED1-3 and ENCSPEEDCOM are CPU I/O ports of the control section 131, and these I/O ports are set as shown in FIG. 7C.

The contact piece 341 moves in the left right direction in FIG. 7B, in accordance with turning of the zoom function switching operation member 143. At a position where the contact piece 341 is in contact with the Gray code encoder patterns 343a-343d there is conduction to ENCSPEEDCOM, resulting in an L input to the control section 131. On the other hand, at the position where the contact piece 341 does not contact the encoder patterns the control section 131 receives H input due to the pull-up setting. In accordance with the inputs ENCSPEED1-3 to the control section 131 it is determined which speed is selected, namely, which one of wide end low-speed (speed 1), wide end medium speed (speed 2), wide end high-speed (speed 3), the neutral position, telephoto end low-speed (speed 1), telephoto end medium speed (speed 2), telephoto end high-speed (speed 3).

Next, drive trajectories of the first and second zoom groups 105 and 107 will be described using FIG. 8A-FIG. 8C. With this embodiment, units of a virtual encoder representing zoom position are expressed as Ediv. The wide end has small numerical values while the telephoto end has large numerical values, and with the example shown in FIG. 8A-FIG. 8C from the wide end to the telephoto end is divided into 1024 divisions. Ediv corresponds to focal length, with from 25-994 Ediv being a usage range for electronic zoom (EZ), and 0-1023 Ediv being usage range including mechanical manual zoom (MZ).

The position of 25 Ediv is made a position of 100 Pls for the first zoom group (3G) 105 and a position of 100 Pls for the second zoom group 107 (4G), and this position is made the reference position. Pls corresponds to a single step drive amount of the stepping motor 175a and the stepping motor 179a. If the first zoom group 105 and the second zoom group 107 are positioned at Ediv positions respectively corresponding to a synchronous pulse table, it is then possible to obtain an optical characteristic for a corresponding focal length. Asynchronous pulse table for the first zoom group (3G) 105 and the second zoom group (4G) 107 with respect to encoder position Ediv, such as shown in FIG. 8A, is stored in the storage section 133.

When driving the first zoom group (3G) 105 and the second zoom group (4G) 107 continuously, an optical characteristic for a corresponding focal length can be obtained with the positional relationship for 3G and 4G being held as the synchronous pulse position table relationship as is shown in FIG. 8A. Also, at this time, when driving the zoom groups with drive speeds of 3G/4G at each Ediv maintaining the relationship of the synchronous speed table as shown in FIG. 8B, angle of view fluctuation is kept constant. A synchronous speed table such as shown in FIG. 8B is stored in the storage section 133.

The meaning of having units of 1 Ediv is that Pls position offset of less than 1 Ediv is an extent that can be recognized as image degradation. However, the definition of 1 Ediv unit is not limited, and the relationship of 1 Ediv=1 Pls is also possible for example.

FIG. 8A is a graph with the horizontal axis showing encoder position and the vertical axis showing pulse position for the first zoom group (3G) and the second zoom group (4G). Pulse position is a position corresponding to a number of steps using the stepping motor. At each Ediv, when Pls positions of the first zoom group (3G) 105 and the second zoom group (4G) 107 are positions shown on the vertical axis, a positional relationship is established whereby an optical characteristic at the Ediv positional is obtained.

The position at the wide end with electronic zoom is made 25 Ediv, a positional relationship between the first zoom group (3G) 105 and the second zoom group (4G) 107 at this position is adjusted, and that position is made a 100 Pls position for 3G and 4G respectively, and made the reference position. With the interchangeable lens 100 of this embodiment, position at the wide end is obtained through adjustment, and after that positions toward the telephoto end are secured in the design at relative Pls positions. However, this is not limiting, and it is also possible to adjust position of the second zoom group (4G) 107 with respect to a Pls position of the first zoom group (3G) 105 towards the telephoto end (for example, 994 Ediv) or an intermediate Ediv position, interpolate pulse position from adjusted positions for both ends, and guarantee optical position of 3G and 4G.

FIG. 8B is a graph with the horizontal axis showing encoder position Ediv and the vertical axis showing speed of the first zoom group (3G) 105 and the second zoom group (4G) 107. At each Ediv position, when the drive speed of 3G and 4G is drive at the speed shown on the vertical axis, angle of view change between each Ediv is constant (constant angle of view fluctuation speed). When storing continuous images, such as with movie shooting, if drive is carried out at the constant angle of view fluctuation speed it is possible to acquire images with smooth focal length change.

Also, as shown in FIG. 8B, an intermittent drive region and a non-intermittent drive region are provided, with intermittent drive being carried out in the intermittent drive region and non-intermittent drive being carried out in the non-intermittent drive region. With non-intermittent drive, 3G and 4G are driven at synchronous positions with respect to positional variation at each Ediv position, and drive is such that drive speed at this time becomes a synchronous speed. In this way, focal length is changed while having an optical characteristic of constant angle of view fluctuation speed.

3G and 4G have different optical sensitivity. Therefore, since at a given Ediv position drive is such that angle of view fluctuation is constant, there is a region where a 4G drive amount for a 1 Ediv interval becomes 1 Pls or less. With drive using a stepping motor, it is not possible to drive by less than 1 Pls. To increase the number of divisions for micro step drive, there are also methods such that not allowing Pls sensitivity to become 1 Pls or less. However, if Pls number to be driven becomes massive or 1 Ediv is defined to have a fine Pls number, it will only result in control being complicated.

With this embodiment, therefore, intermittent drive is carried out in a region where a drive amount becomes 1 pls or less, and a region where an extremely slow speed is reached. With intermittent drive only position tracking is carried out at each Ediv, to perform intermittent drive. Control for intermittent drive will be described later using FIG. 24A-FIG. 24C.

FIG. 8C is a graph having the horizontal axis representing encoder position Ediv, and the vertical axis representing absolute position (mm) of 3G and 4G. This graph is practically the same as the graph of FIG. 8A, with the only difference being the units on the vertical axis. With the example shown in FIG. 8C, position of a lens mount surface etc. is made reference, and the positional relationship between 3G and 4G is shown by absolute position.

Next, the spring provided between the first zoom group 105 and the second zoom group 107 will be described using FIG. 9A-FIG. 9C. As shown in FIG. 9A, a spring 351 is provided between the first zoom group (3G) 105 and the second zoom group (4G) 107, and acts to pull the first and second zoom groups 105 and 107 together.

The first zoom group (3G) 105 is capable of movement in an operating range M, and from the wide side to the telephoto side within the operating range M is divided into eight segments A-H, as shown in FIG. 9B. This eight segmented region is determined by unit Ediv of the virtual encoder representing zoom position, as shown in FIG. 9C. For example, a border between region A and region B is at the 132 Ediv position, and a border between region B and region C is at the 400 Ediv position. Position within this operating range M is detected by the 3G absolute position detection sensor 177 (linear encoder 177*a*), and converted to Ediv.

The second zoom group (4G) 107 is capable of movement in an operating range N, and as shown in figure FIG. 9B from the wide side to the telephoto side within the operating range N is divided into four segments 1-4. This four segmented region is determined by unit Ediv of the virtual encoder representing zoom position, as shown in FIG. 9C. For example, a border between region 1 and region 2 is at the 7 Ediv position, and a border between region 2 and region 3 is at the 194 Ediv position. Position within this operating range N is detected by the 4G reference position detection sensor 181 (photo interrupter PI1, photo interrupter PI2) and converted to the above-described region.

Next, an acceleration curve at the time of carrying out acceleration and deceleration will be described using FIG. 10A-FIG. 10B. With this embodiment, when electronic zoom (EZ) is set, if zooming is started with each lens group in a stopped state, drive of the first zoom group 105 and the second zoom group 107 is commenced, and once zooming is completed drive of the first zoom group 105 and the second zoom group 107 is stopped. An acceleration curve at the time of this drive commencement is shown in FIG. 10A, and the deceleration curve at the time of stopping drive is shown in FIG. 10B.

In FIG. 10A and FIG. 10B, the horizontal axis represents Pls steps of a stepping motor, and the vertical axis represents speed. As was described using FIG. 8B, during a zooming operation target speed is determined in accordance with virtual encoder position (Ediv), and if acceleration is commenced acceleration is carried out along the acceleration curve shown in FIG. 10A toward the target speed. This acceleration curve is a speed at which the stepping motor can accelerate without losing synchronization.

Also, in the case of stopping during a zooming operation at the target speed, deceleration is carried out along the deceleration curve shown in FIG. 10B, from the target speed to 0. Specifically, in order to stop at the target position deceleration is performed at the speed shown in each step. This deceleration curve is a speed at which the stepping motor can decelerate without losing synchronization.

Next, a temperature dependent voltage table will be described using FIG. 11A and FIG. 11B. The first zoom group (3G) 105 and the second zoom group (4G) 107 are in a state of being pulled together by the spring 351, as was shown in FIG. 9A. Further, they are subjected to electronic zoom drive at a positional relationship so as to achieve synchronous positions shown in FIG. 8A-FIG. 8C. As a result, a positional relationship of the first zoom group (3G) 105 with respect to the second zoom group (4G) 107 differs depending on the area of the first zoom group (3G) 105, so that the force of the spring to pull the lens groups to each other changes. The drive voltage of the stepping motor is changed so as not to lose synchronization even with a changed force.

FIG. 11A is a table showing an example of a speed-area-voltage relationship for the first zoom group (3G) 105, which is stored in the storage section 133 together with the table shown in FIG. 11B. Temperature is detected by a non-illustrated temperature measurement circuit. In the drawing, as was described using FIG. 6, "speed (gear)" is speed corresponding to rotational angle of the zoom function switching operation member 143 when electronic zoom (EZ) has been set, with low-speed (speed 1), medium speed (speed 2), and high-speed (speed 3) corresponding to 1, 2 and 3 in FIG. 6. Also, areas A-H described as 3G areas in FIG. 11A represent areas corresponding to absolute position of the first zoom group (3G) 105, which was described in FIG. 9B. Accordingly, with this embodiment, as shown in FIG. 11A, a voltage applied to the stepping motor is changed in accordance with environmental temperature, speed instructed by the user and 3G position. The numerical value shown in FIG. 11A are only illustrative examples.

FIG. 11B is a table showing an example of a speed-area-voltage relationship for the second zoom group (4G) 107. The meanings of temperature, speed and 3G area are the same as for FIG. 11A. There is voltage setting for the stepping motor for drive of the second zoom group (4G) 107, but the set voltage is changed depending on area of the first zoom group (3G) 105. This is because with electronic zoom, the second zoom group (4G) 107 is driven so as to maintain the positional relationship of the synchronous position table shown in FIG. 8A, which means that if the position of the first zoom group 105 is known, the position of the second zoom group 107 can also be determined.

At the time of control, a relationship of 1 Ediv=3 Pls is designed, and position of the first zoom group 105 is taken as a control reference. It is also easier for processing of voltage setting for the second zoom group 107 to be changed and set with the first zoom group 105 reference.

Next, switching stepping motor voltage when the area or speed gear has changed will be described using FIG. 12A-FIG. 12D. Region determination for the previously described areas A-H carries out update of region at the time of start-up and at the time of Ediv update. Also, temperature detection is only updated at the time of start-up, regardless of whether or not the encoder is in the non intermittent region or intermittent region that were described with FIG. 8B. As was described previously, temperature-speed-voltage setting at the time of switching between the non-intermittent and intermittent regions is the performing of voltage setting for the second zoom group (4G) 107, at the position of the first zoom group (3G) 105. This is because with electronic zoom, position of the second zoom group 107 tracks the position of the first zoom group 105.

In describing the sequence for voltage setting, voltage setting due to gear change (speed change) will be called "gear voltage setting", and voltage setting due to area change will be called "area voltage setting" for the sake of expediency. As assumed conditions, in the case where a speed gear is decelerating, set voltage is lowered, while conversely in the case where speed gear is accelerating the set voltage is raised. With acceleration, switching in the order low speed gear→Medium speed gear→high speed gear is carried out, and with deceleration switching in the order high-speed gear→medium speed gear→low-speed gear is carried out. There are a time of reaching the medium speed gear and a time of crossing over the area. Strictly speaking, the time at which the medium speed gear is reached and the time at which the area is crossed over are not simultaneous, and the time of crossing over the border of an area is offset. Gear voltage setting or area voltage setting are carried out at the time that straddles the borders.

Figure 12A:
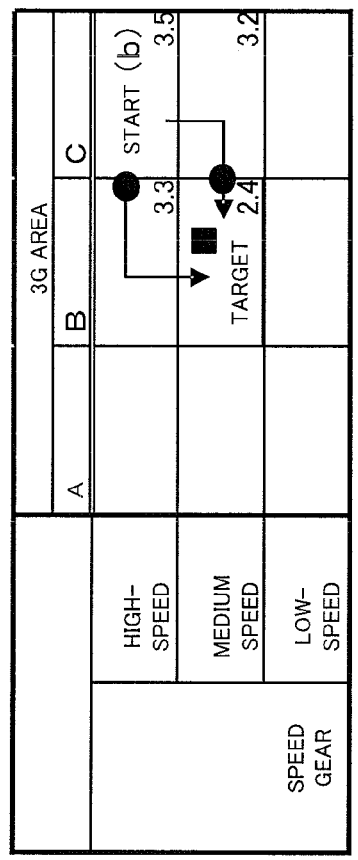
FIG. 12A-FIG. 12D are drawings for describing switching of stepping motor voltage at the time of changing area and speed gear of the first zoom group of the electronic zoom (EZ), with the interchangeable lens of one embodiment of the present invention.
Figure 12B:
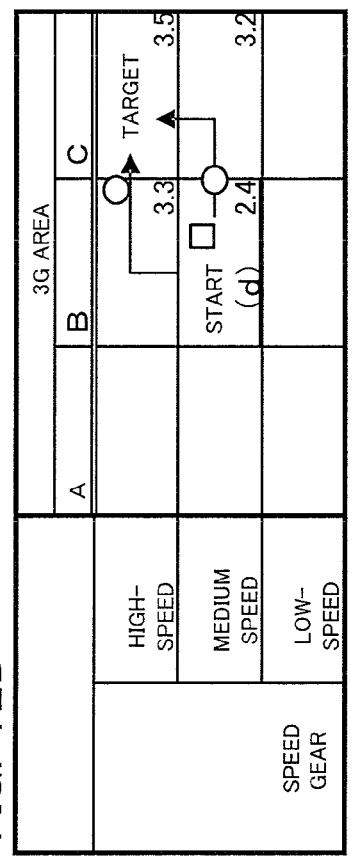

Route (a) shown in FIG. 12A and route (b) shown in FIG. 12B are for the case where change is in a decelerating gear direction. In this case, a voltage table for area switching is referred to with a high-speed gear reference. Every time an area is transitioned, area voltage setting is carried out, and at the point where low speed is reached gear voltage setting is carried out. Specifically:

(1) Drive is commenced, area voltage setting is carried out every time an area is transitioned, and at the point where low speed is reached gear voltage setting is carried out.

(2) In the case of changing from high speed to low speed, at the point where medium speed is reached from high-speed a gear voltage is set, and once low speed is reached from medium speed "gear voltage setting" for low speed is carried out.

(3) Even if voltage is finally lowered by gear voltage setting, in the case where the voltage setting is raised by area voltage setting (refer to FIG. 12A), voltage is raised by area voltage setting, and when low speed is reached voltage is lowered by gear voltage setting.

Figure 12C:
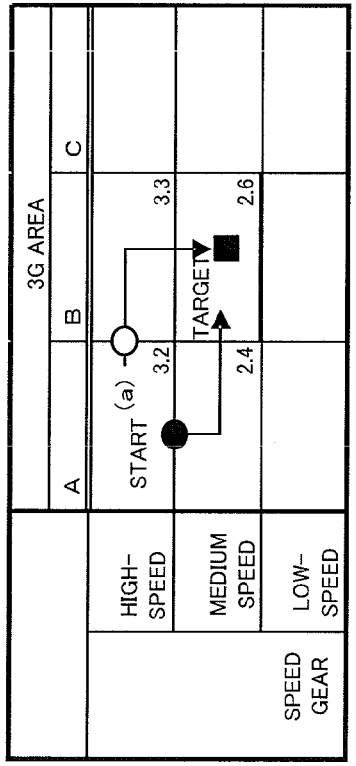
Figure 12D:
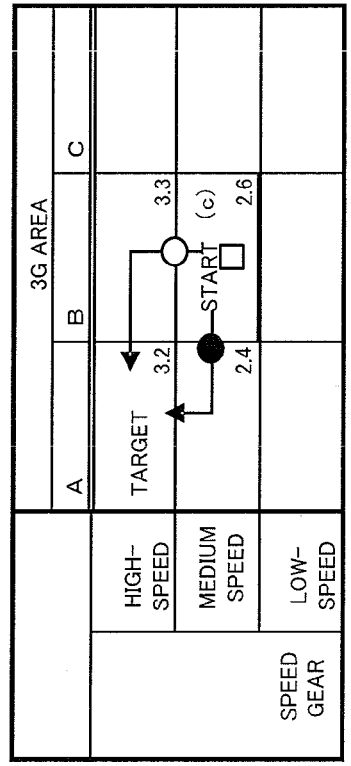

Route (c) shown in FIG. 12C and route (d) shown in FIG. 12D are for the case where change is in an accelerating gear direction. In this case, a voltage table for area switching is referred to with a high-speed gear reference. Gear voltage setting is carried out before drive and before a target is reached, and if area voltage setting arises during drive, voltage setting is carried out in accordance with that area of voltage setting.

Specifically:

(1) Drive is commenced after gear voltage setting has been carried out, and in the case where voltage is raised by area voltage setting when an area is transitioned, voltage is raised, while conversely if voltage is lowered by area voltage setting the voltage is lowered. Since it is an acceleration direction, voltage setting to raise the voltage before drive is carried out, but when an area is transitioned voltage is lowered in the case where voltage setting is lowered.

(2) In the case of moving from low speed to high speed, gear voltage for medium speed is set before commencing drive, and at the point where a low-speed gear is reached setting is carried out for high-speed gear voltage.

Next, parameters used in algorithms of this embodiment will be described using FIG. 13A-FIG. 13D, and FIG. 14.

FIG. 13A shows EZ speed coefficients (gear K), and shows coefficients for when speed entered in the synchronous speed table shown in FIG. 8B is set to maximum speed (Maxspeed). For example, in the case where 5 has been selected as an index, a change coefficient for each gear becomes X1, and the entry in the synchronous speed table shown in FIG. 8B is used as is, that is, speed becomes Max speed. Also, in the case where 3 has been selected as an index, a change coefficient for each gear becomes ×0.46, and speed becomes 0.46 of when the entry in the synchronous speed table shown in FIG. 8B is 1.

FIG. 13B shows EZ speed change coefficients. Zoom speed is switched by user operation to start-up, stop, low-speed (speed 1), medium speed (speed 2), or high-speed (speed 3). At the time of switching, the first zoom group (3G) 105 and the second zoom group (4G) 107 differ in Pls number to advance for a single Ediv, and in speed for driving with constant angle of view fluctuation. Speed change is carried out while keeping a fixed ratio coefficient in order to carry out speed change, while maintaining synchronous position and synchronous speed. A coefficient parameter for this purpose is the EZ speed change coefficient.

FIG. 13B shows speed and a coefficient for that speed. If speed is 200 pps or less 0.400 is selected as a coefficient, while if speed is greater than 200 pps and less than or equal to 300 pps 0.200 is selected as a coefficient. Values for coefficients at respective speeds are calculated from speed change amount for a single step at each speed, on the acceleration and deceleration curves. A detailed algorithm for speed change will be described later using FIG. 38.

FIG. 13C shows association of LEZ button (zoom ring speed) and EZ speed coefficient. In the event that it is possible to carry out switching between movie (Mov) mode and still picture (Still) mode in the camera body, then with this embodiment switching speed differs depending on the LEZ button (zoom ring speed, rotational angle of the zoom function switching operation member 143). Specifically, regarding zooming speed in the case of a movie, varying zooming speed rapidly is undesirable while shooting a movie, and so compared to the case of still picture shooting zooming speed becomes slow.

With the example shown in FIG. 13C, internal gear index corresponds to the index in FIG. 13A, and so in movie mode, with a maximum speed set to 1, there is a transition from maximum speed in the order 0.46×→0.33×→0.2×. Similarly, in still picture mode there is a transition from maximum speed in the order 1×→0.46×→0.2×. "LEZ button" in FIG. 13C corresponds to high-speed (speed 1), medium speed (speed 2), and low speed (speed 3).

FIG. 13D shows association of EZ speed coefficient and temperature dependent voltage table index in the left column corresponds to index in FIG. 13A. For example, in the case of driving with EZ speed gear 3, voltage setting is carried out with setting for medium speed in the temperature dependent voltage table.

FIG. 14 shows speed change possible determination Ediv. When carrying out speed change, in the event that the current position is close to a drive end, there may be cases where it is not possible to stop at the end section. Therefore, in the event that speed change has arisen from the current gear (currently set zooming speed) to a target gear (zooming speed after change), when current position Ediv with respect to the end is less than or equal to the value shown in FIG. 14, speed change is not carried out.

Figure 15A:
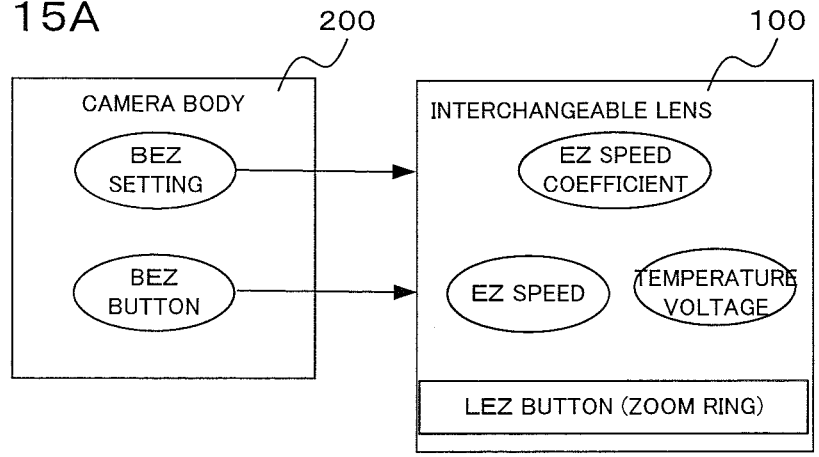

Next, the case of driving electronic zoom from the camera body 200 will be described using FIG. 15A-FIG. 15C. As shown in FIG. 15A, temperature and voltage are measured inside the interchangeable lens 100, and an EZ speed coefficient and an EZ speed corresponding to this temperature and voltage are stored. Also, an LEZ button is provided for changing the zooming speed (in FIG. 1 this corresponds to the zoom function switching operation member 143). Also, a BEZ button for changing zooming speed and BEZ setting for setting electrically driven zooming are provided within the camera body 200. The BEZ button may be provided as a dedicated operation member, or maybe set on a menu screen etc.

FIG. 15B shows correspondence between BEZ setting and EZ speed coefficient. In the camera body 200, one of the speed settings of the EZ speed shown in FIG. 15B is notified from the camera body 200 to the interchangeable lens 100. With respect to the setting that has been notified, a speed setting shown by the internal gear index (EZ speed coefficient) shown in FIG. 15B is stored in the storage section 133 within the interchangeable lens 100 as a correspondence relationship.

FIG. 15C shows BEZ button strength. In the case of carrying out a zoom operation with electronic zoom in the interchangeable lens 100, a lens operation and zooming speed corresponding to that lens operation are determined in accordance with correspondence between the LEZ button (zoom ring speed) and EZ speed coefficient, and this data is stored as internal data in the storage section 133. BEZ button strength within the camera body 200 is used to carry out speed weighting in accordance with a user operation, for speed the interchangeable lens 100 is capable of. For an EZ speed that has been established by the EZ speed coefficient, if electronic zoom button intensity (BEZ button intensity) is 1, a weighting coefficient of ×0.8 is stored in the storage section 133 within the interchangeable lens 100, and similarly for a button strength of 2 a weighting coefficient of ×1.2 is stored, and for a button strength of 3 a weighting coefficient of ×2 is stored.

Figure 16:
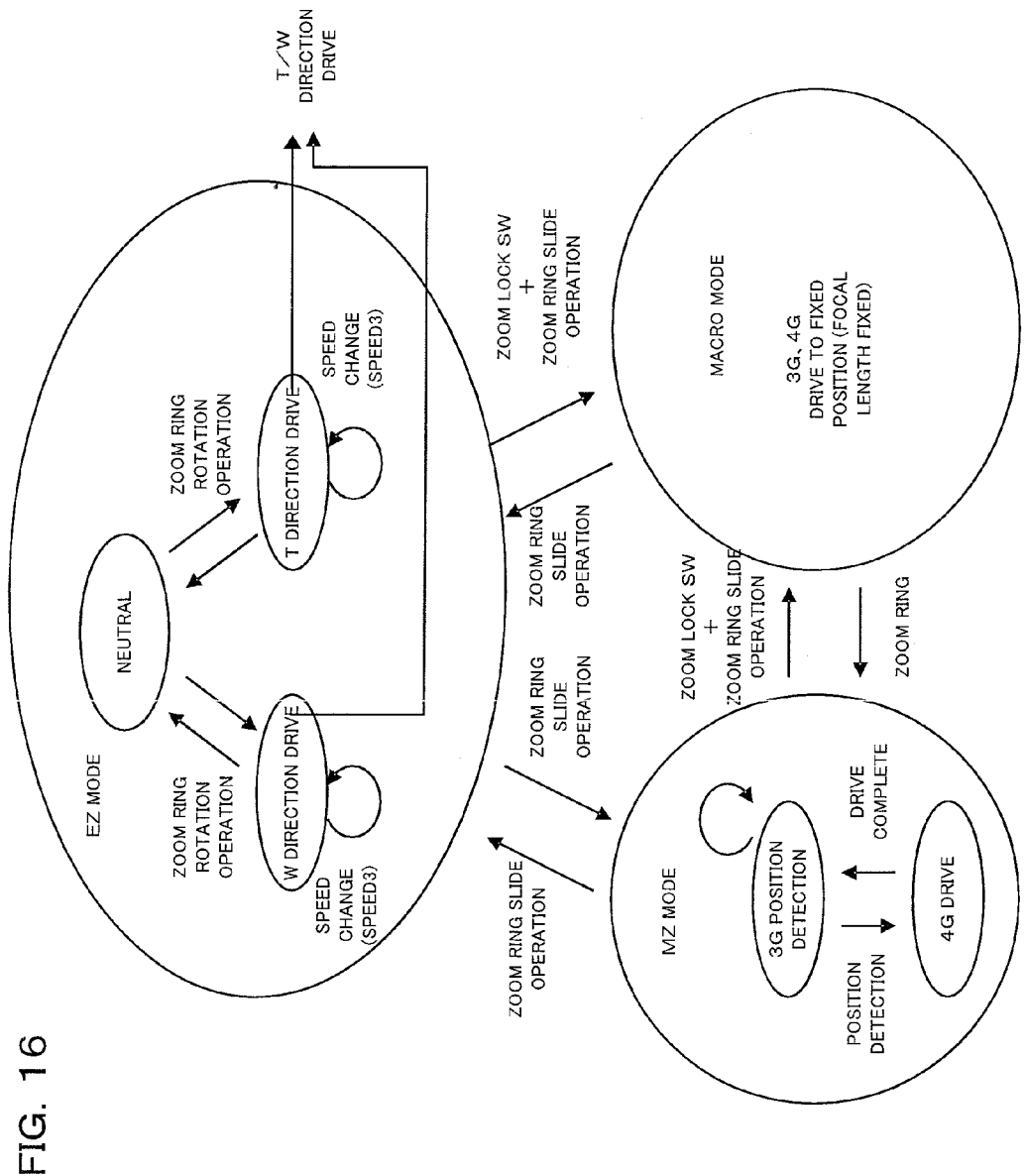
FIG. 16 is a mode switching transition diagram for the interchangeable lens of one embodiment of the present invention.

Next, mode switching of this embodiment will be described using FIG. 16. With this embodiment, as was described previously, it is possible to set electronic zoom (EZ) mode, mechanical manual zoom (MZ) mode, and macro mode. Switching between electronic zoom (EZ) mode, mechanical manual zoom (MZ) mode and macro mode can be carried out by a sliding operation of the zoom function switching operation member 143 functioning as a zoom ring. When switching from electronic zoom mode or mechanical manual zoom mode to macro mode, with this embodiment, in order to prevent erroneous operation, a sliding operation of the zoom function switching operation member 143 is carried out together with operation of the zoom lock switch 147.

When electronic zoom (EZ) mode has been set, in the case of carrying out a rotation operation of the zoom function switching operation member 143 in a neutral position where a zooming operation has not been carried out, wide direction drive or telephoto direction drive is carried out in accordance with the direction of that rotation, as was described using FIG. 6 and FIG. 7A-FIG. 7C. Also, at that time, it is possible to carry out speed change in accordance with rotation amount (rotational angle) of the zoom function switching operation member 143.

When mechanical manual zoom (MZ) mode has been set, the first zoom group 105 is manually driven in accordance with a turning operation of the zoom function switching member 143, as was described using FIG. 3. At this time, the position of the first zoom group (3G) 105 is detected by the linear encoder 177a, and the second zoom group (4G) 107 is driven to a position shown in FIG. 8A based on the result of this detection.

If macro mode is set, then the first zoom group (3G) 105 and the second zoom group (4G) 107 are driven to fixed positions stored in the storage section 133.

Figure 17:
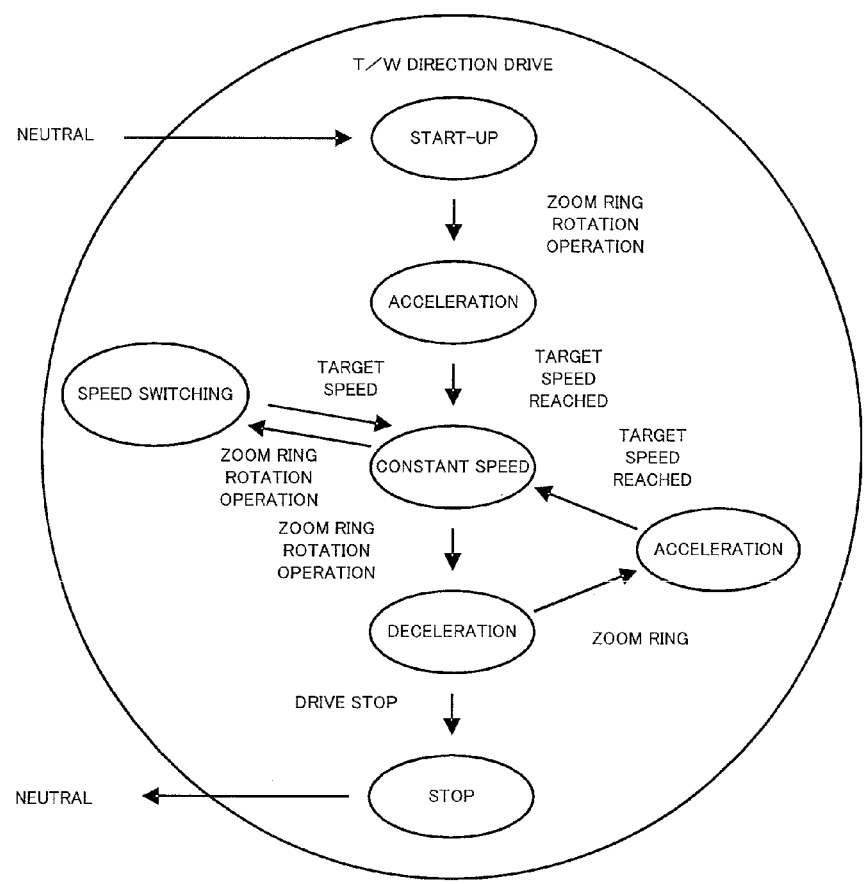
FIG. 17 is an electronic zoom transition diagram for the interchangeable lens of one embodiment of the present invention.

FIG. 17 is a transition diagram showing transitions for electronic zoom (EZ). In a neutral state, determination to commence start-up is carried out, and if a rotation operation of the zoom ring (zoom function switching operation member 143) is carried out, acceleration drive is performed. As acceleration drive, the first and second zoom groups 105 and 107 are driven at synchronous positions and synchronous speeds allocated in the synchronous speed table shown in FIG. 8A and FIG. 8B. Once the target speed is reached, constant speed drive is carried out, and when stopping, it is made possible to stop with the Ediv position being a synchronous position. With speed switching, speed switching is carried out in accordance with a speed instruction that has been changed by user operation.

Next, start-up of the first zoom group (3G) 105 and the second zoom group (4G) 107 at the time of operating the zoom ring (zoom function switching operation member 143) will be described using FIG. 18-FIG. 21B.

Figure 18:
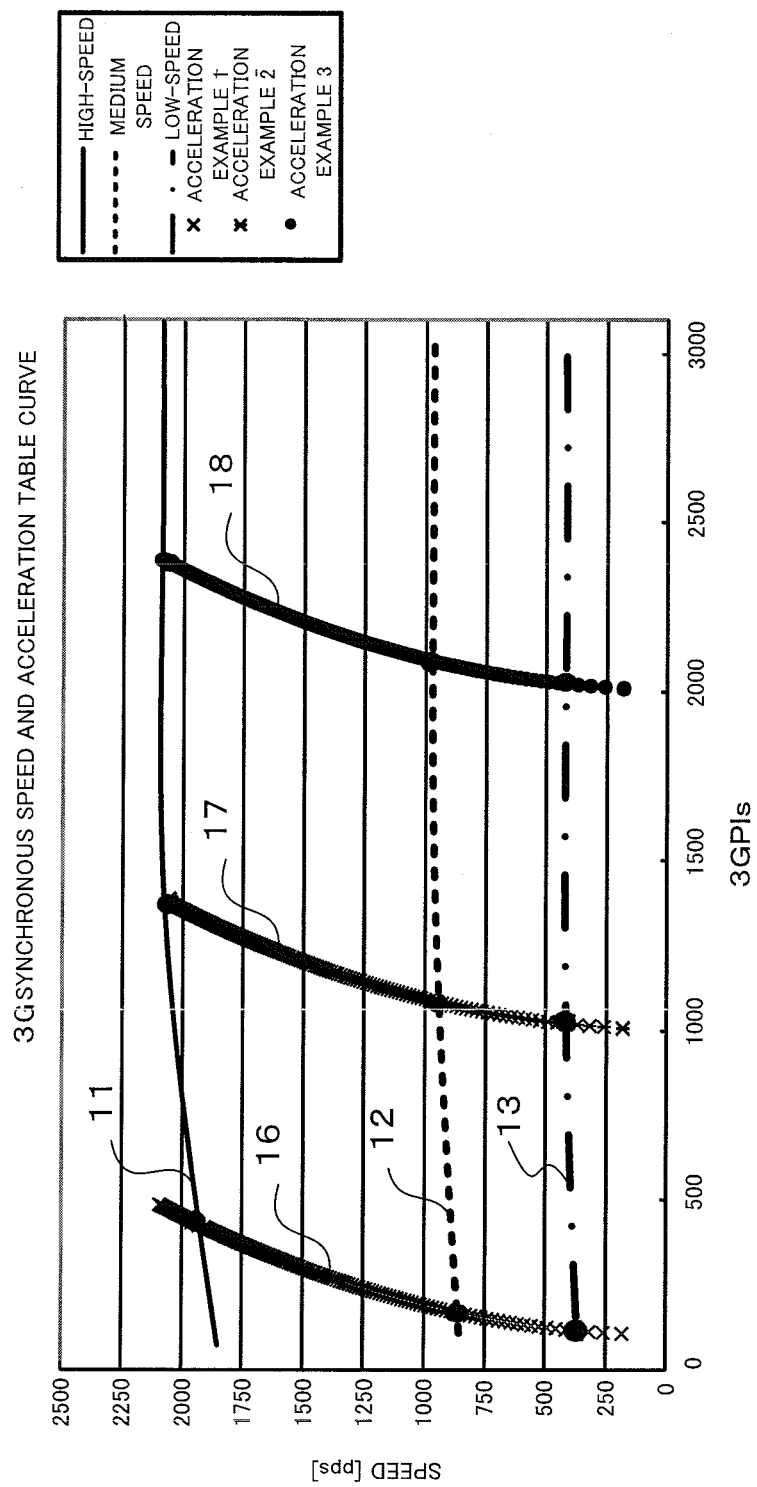
FIG. 18 is a graph showing one example of setting of a target PIs at the time of start-up when commencing zooming of an electronic zoom (EZ), in the interchangeable lens of one embodiment of the present invention.

First, setting of target Pls at the time of start-up will be described using FIG. 18. In FIG. 18, reference numerals 11-13 represent synchronous speed tables. Reference numeral 11 represents a synchronous speed table for the case of high-speed, 12 represents a synchronous speed table form medium speed, and 13 represents a synchronous speed table for low speed. Here, the horizontal axis is 3GPls (units:Ediv) showing relative position of the first zoom group (3G) 105, and the vertical axis shows speed. Reference numerals 16-18 represent acceleration examples.

Target setting at the time of start-up of the first zoom group (3G) 105 is carried out in the following sequence.

(1) Current position of the first zoom group (3G) 105 is obtained from the linear encoder 177a, and made the current encoder position. Alternatively, Ediv controlled by a relative number of pulses from a reference position may be made the encoder position.

(2) A value for zoom ring speed is obtained using the EZ speed switching detection mechanism 171. Specifically, zoom ring speed is obtained from rotational angle of the zoom function switching operation member 143.

(3) From (1) above, as shown in FIG. 18, trajectories of acceleration tables (reference numerals 16-18) are known from reference point Pls positions (25, 1000, 2000 Ediv). The acceleration examples of reference numerals 16-18 are illustrative examples, and with an actual unit each Ediv position is a potential reference point.

(4) From (2) above either one of high-speed (reference 11), medium speed (reference numeral 12), or low-speed (reference numeral 13) is selected from synchronous speed table.

(5) Cross points of selected lines of the 3G acceleration table in (3) above and the 3G synchronous speed table of (4) above are set to target Pls.

Figure 19:
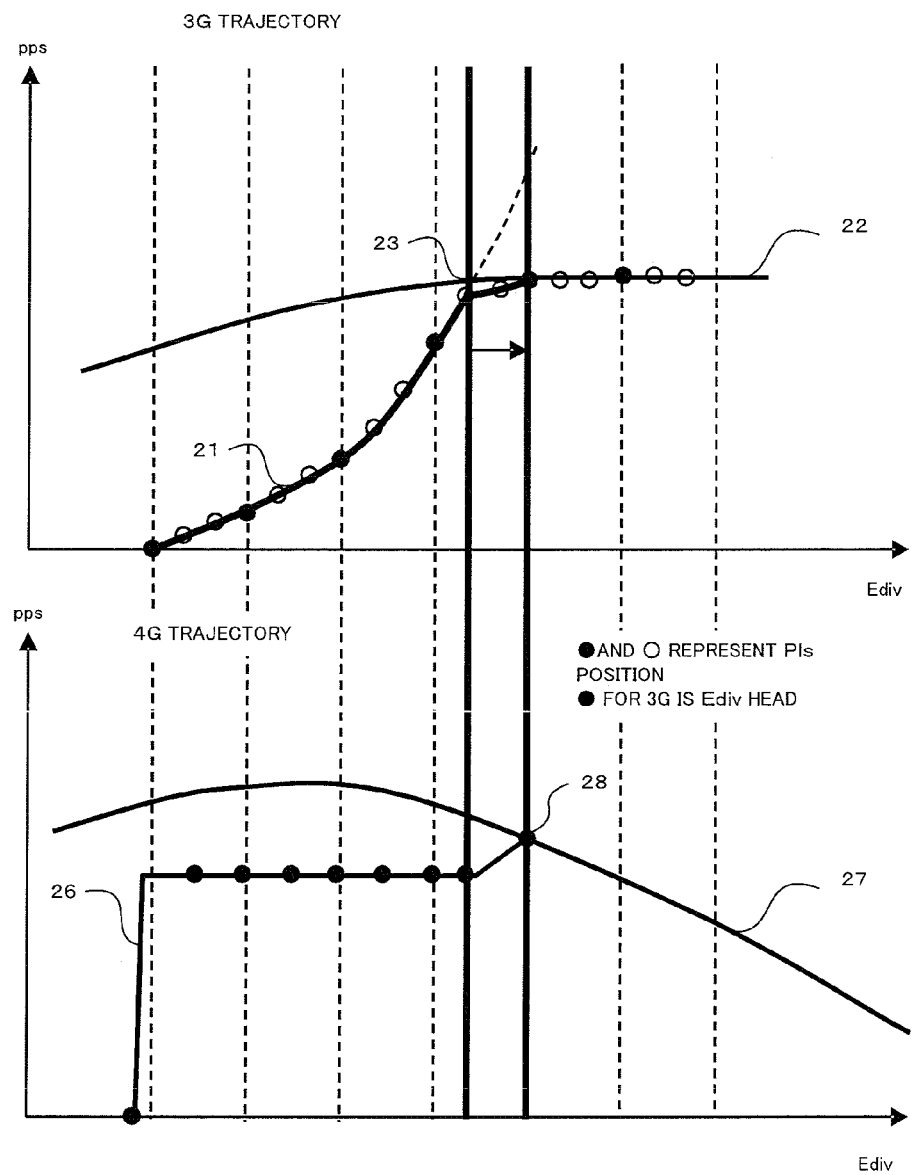
FIG. 19 is a graph showing an outline of trajectories of the first zoom group (3G) and the second zoom group (4G) at the time of start-up of electronic zoom (EZ), in the interchangeable lens of one embodiment of the present invention.
Figure 20:
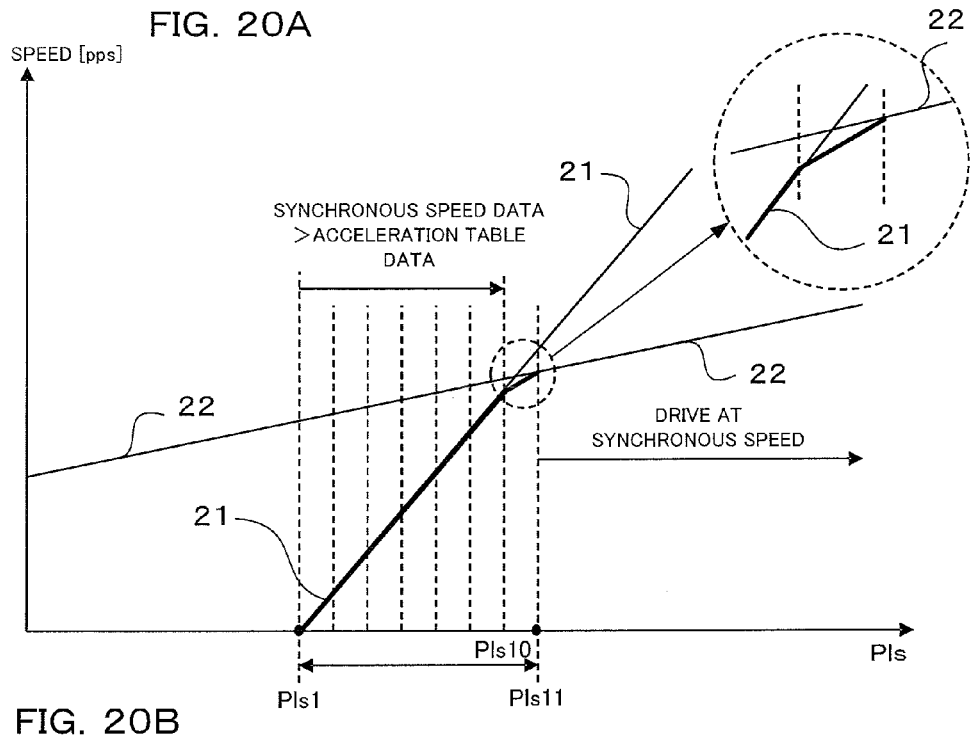
FIG. 20A and FIG. 20B are drawings for describing start-up of electronic zoom (EZ) for the first zoom group (3G), in the interchangeable lens of one embodiment of the present invention.
Figure 21:
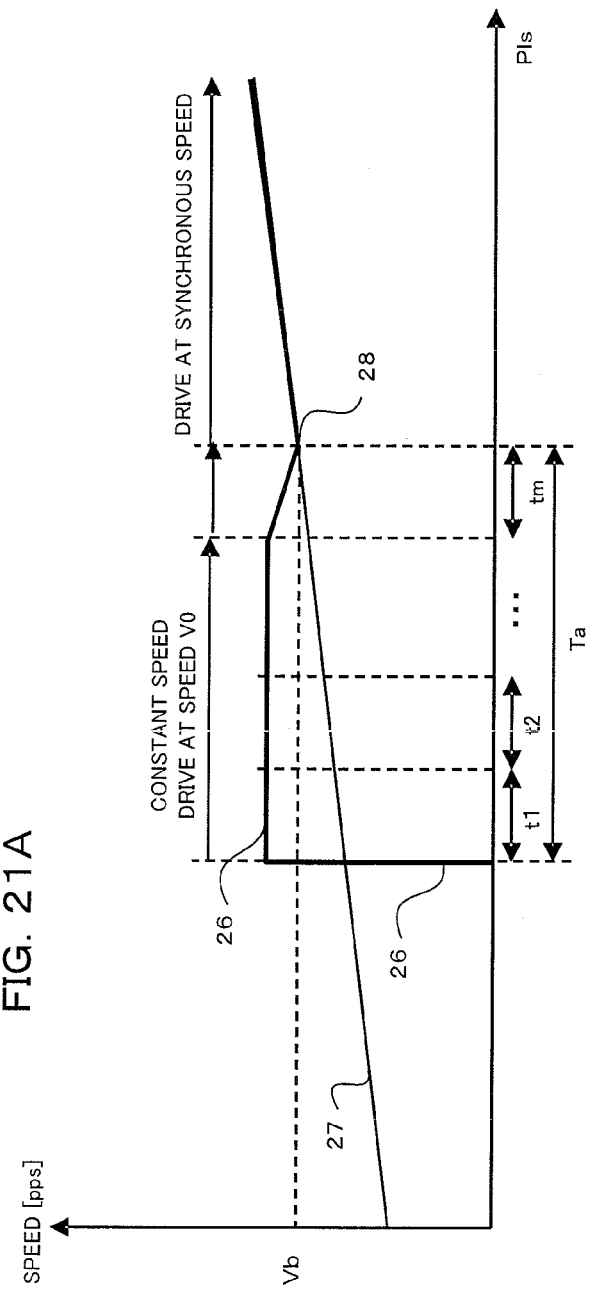
FIG. 21A and FIG. 21B are drawings for describing start-up of electronic zoom (EZ) for the second zoom group (4G), in the interchangeable lens of one embodiment of the present invention.

Next, an overview of start-up of the first zoom group (3G) 105 and the second zoom group (4G) 107 in relation to the set target Pls will be described using FIG. 19.

(1) Target position of the first zoom group 3G is set in Ediv units. With this embodiment, since 1 Ediv corresponds to 3Pls, target position is set in units of 3 Pls.

(2) In the event that a cross point 23 for the 3G acceleration table 21 and the 3G synchronous speed table 22 at the target Pls (target position) is not an exact Ediv unit, the 3G target Pls is corrected so as to become an exact Ediv. As a correction method, for example, a shortfall in Pls is compensated for (1 or 2 Pls are added).

(3) For the cross point 23, the speed is consistent with the 3G synchronous speed table 22, and so the corrected Pls (target position) is driven at the speed consistent with the 3G synchronous speed table 22.

(4) A 4G acceleration table 26 for the second zoom group (4G) 107 is different to the case of the first zoom group (3G) 105, with a driving speed of 4G close to that of the synchronous speed table 27 for the 4G target position 28 being set at the time of start-up, and being made consistent with the target speed the 4G synchronous speed table 27 for the 4G target position 28.

Next, details of start-up of the first zoom group (3G) 105 (3G start-up) will be described using FIG. 20A and FIG. 20B. Start-up is carried out with the following procedure from a start-up position Pls 1 to an attained position Pls11, and drive is carried out using speeds of drive profile curves shown in FIG. 20A and FIG. 20B. The drive profile curves are obtained as follows.

(1) At the start-up Pls position (Pls1), synchronous speed and speed of the acceleration table are compared (in FIG. 20B, synchronous speed synpps1 and acceleration table accpps1 are compared). If the result of comparison is that synchronous speed>acceleration table speed, the acceleration table speed accpps is set to the drive profile curve speed, and the next step is moved to.

(2) Synchronous speed and acceleration table speed are compared for the next Pls position, and this comparison and creation of drive profile acceleration are repeated until the synchronous speed becomes less than the acceleration table speed.

(3) Once the result of comparison becomes that the synchronous speed is less than the acceleration table speed (when the synchronous speed becomes smaller than the acceleration table speed for Pls11 in FIG. 20A), in addition to the drive profile curve up to Pls10 for the previous comparison, the drive profile curve for Pls 11 is set to the synchronous speed (synpps11).

In this way, once start-up has commenced at Pls1, while accelerating along the acceleration table, at Pls10 close to the synchronous speed the drive speed is switched from drive speed in the acceleration table up to that point (accps) to synchronous speed (synchronous attained speed), so as to be coincident with synchronous speed at Pls11. Immediately after commencement of start-up, Pls position where the acceleration table speed becomes less than the synchronous speed is pre-calculated, and there is a switch from acceleration table speed to synchronous speed at the calculated Pls position.

Next, details of start-up of the second zoom group (4G) 107 (4G start-up) will be described using FIG. 21A and FIG. 21B. Start-up is performed with the following procedure from the 4G start-up position up to the 4G target position. FIG. 21A and FIG. 21B show drive processing in a non-intermittent drive region (synchronous drive region).

As described previously, a Pls position where there is transition to synchronous speed is obtained from synchronous speed data and acceleration table data for the first zoom group (3G) 105, and so acceleration control for the second zoom group (4G) 107 is carried out with this Pls position as a target position.

A reciprocal of speed data of the 3G acceleration table is integrated to calculate time to target attainment, and 4G acceleration data is then calculated from the time, the current 4G position (start-up position) and target position.

For the zoom group 3G, as has been described previously, acceleration control is carried out in accordance with the acceleration table up to 1Pls short of the target position, and in the remaining 1Pls acceleration is carried out so as to be closer to the synchronous speed data for the target position. Conversely, for the 4G zoom group acceleration control is carried out in accordance with the calculated acceleration table 26. Specifically, constant speed drive is carried out at a speed V0 that has been obtained from equally spaced times (t1-tm), with start-up time, with the drive time for 1Pls immediately before synchronization removed, as drive time for each Pls.

Until 1Pls immediately before synchronization, acceleration or deceleration is performed so as to attain synchronous speed at the target position. After reaching the target position drive control is carried out in accordance with synchronous speed data for both 3G and 4G.

Calculation of the 4G start-up profile is carried out as follows. First, TimAcc3G is made the total start-up time at the start of 3G start-up. TimAcc3G is a time obtained by adding 1/synpps11 to a total of drive times 1/accpps1 -1/accpps10 in FIG. 20B. PlsAcc4G is made a relative Pls number from current position Pls of 4GPls corresponding to 3G synchronous position. Synpps4G is made a 4G synchronous speed at 4GPls corresponding to 3G synchronous position.

This is expressed in equation form as follows.

(1) Total 3G start-up time—time Ta for 4G synchronous speed at 4G synchronous position, is obtained.

$Ta = TimAcc3G\text{-}1/Synpps4G$ (2) Relative Pls up to 4G target—1Pls at 4G synchronous position is obtained.

$Pls\_res = PlsAcc4G\text{-}1$ (3) Speed accpps until 1Pls before 4G synchronous position is obtained.

$accpps = Pls\_res/Ta = (PlsAcc4G\text{-}1)/(TimAcc3G\text{-}1/Synpps4G)$

The 4G start-up such as is shown in FIG. 21B can be obtained from the equations above. In FIG. 21B, X for the 4G relative Pls position is the final Pls constituting the 4G synchronous position.

As a modified example, computation may be carried out without removing the 1Pls portion. In this case, the speed of the synchronous speed table may be transitioned to at the next Pls that has reach the target Pls. As another modified example an acceleration curve may be calculated without equal spacing. However, in this case, since time allotted to t1, t2, . . . increases, times tm, tm-1, . . . decrease, and difference in speed at the time the target speed is reached becomes large.

Figure 22:
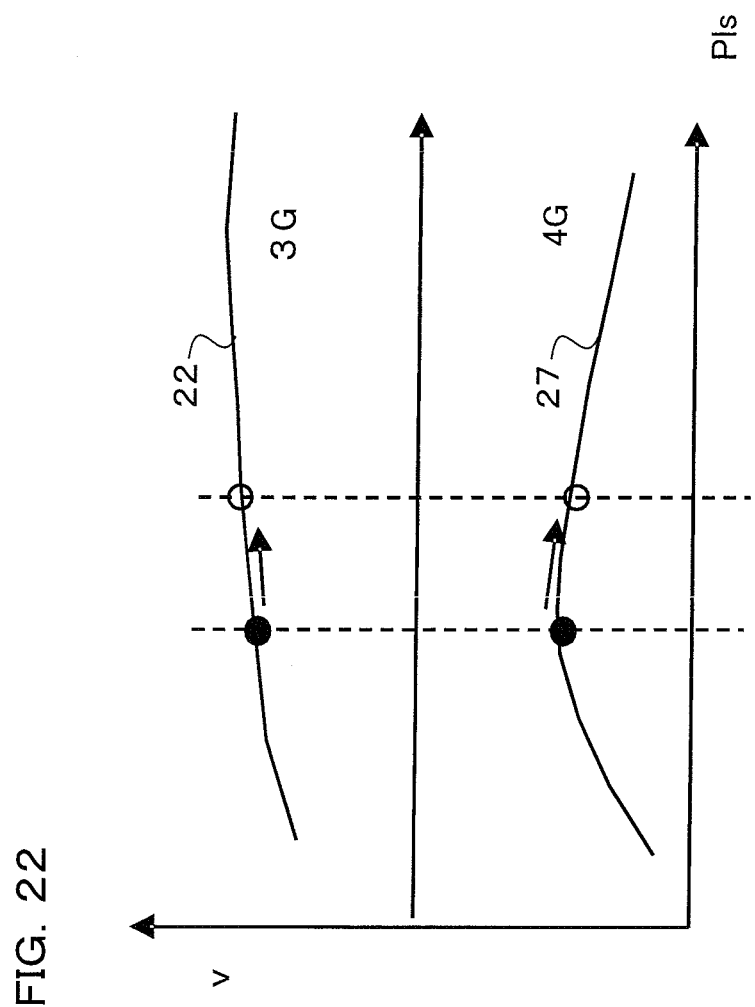
FIG. 22 is a graph showing an outline of trajectories of the first zoom group (3G) and the second zoom group (4G) at the time of constant speed drive of the electronic zoom (EZ), in the interchangeable lens of one embodiment of the present invention.

Next, constant speed drive of the first zoom group (3G) 105 and the second zoom group (4G) 107 will be described using FIG. 22. Once the start-up that was described using FIG. 18-FIG. 21B has been carried out and the first zoom group (3G) 105 and the second zoom group (4G) 107 have reached synchronous speed, they are thereafter driven at a constant speed. Specifically, the first zoom group 105 is driven at a synchronous speed in accordance with the 3G synchronous speed table 22, and the second zoom group 107 is driven at the synchronous speed in accordance with the 4G synchronous speed table 27.

This constant speed drive is controlled in accordance with the synchronous position tables for 3G and 4G that were shown in FIG. 8A, and the synchronous speed tables for 3G and 4G that were shown in FIG. 8B. Specifically, every time Pls representing relative position is updated, the above two tables are referenced and position information and speed information is updated, and speed control of the stepping motor 175a and the stepping motor 179a for 3G and 4G respectively is carried out based on the updated speed information.

Amounts of variation in speed corresponding to the adjacent encoders (Pls) for the 3G and 4G is an amount of change in speed that can be changed without carrying out acceleration and deceleration control. Also, determination of intermittent drive region and non-intermittent drive region is carried out from the 3G Ediv (refer to FIG. 8B). In the case of an intermittent drive region, 4G is subjected to an intermittent drive. This intermittent drive will be described later.

Next, deceleration of the first zoom group (3G) 105 and the second zoom group (4G) 107 will be described using FIG. 23A-FIG. 23C. In the previously described constant speed drive, if the zoom ring (zoom function switching operation member 143) is set at the neutral position, or turned in the opposite direction, or set close to the wide end or the telephoto end, deceleration drive is carried out for the stepping motor 175a and the stepping motor 179a.

FIG. 23A shows deceleration drive that is carried out when the zoom ring is at the neutral position or turned in the opposite direction, when the zoom ring has been operated by the user. Once deceleration drive has commenced, the 3G current position 31 of the first zoom group 105 and the speed at this position are detected, and then deceleration drive along a deceleration curve is commenced together with calculation of 3G stop target position 32.

Also, if deceleration drive of the first zoom group 105 commences, a 4G stop target position 34 for the second zoom group 107 is calculated from a position corresponding to the 3G stop target position 32 of the first zoom group 105. Once a remaining number of deceleration Pls until the calculated 4G stop target position 34 are reached, deceleration drive for the second zoom group 107 is commenced. Since speed of the first zoom group 105 (3G speed) is faster than the speed of the second zoom group 107 (4G speed), a relationship is established whereby remaining pulses until the stop target position of the first zoom group 105 (3G deceleration pulses) are more than remaining pulses until the stop target position of the second zoom group 107 (4G deceleration pulses). Specifically, the following relationship exists.

3G speed>4G speed 3G deceleration pulses>4G deceleration pulses Accordingly, it is possible to determine 4G target stop position 34 after determining 3G target stop position 32.

FIG. 23B shows deceleration drive for the case where a zoom group is close to the telephoto end. In a constant speed drive state, even with deceleration after the wide end position or the telephoto end position is reached, there will be undesirable collision with the wide end or the telephoto end. A movement distance from commencement of deceleration until stop (Pls number or Ediv) is therefore stored in advance. Specifically, as shown in FIG. 23C, movement distances (in Ediv units) until stop for the wide end and the telephoto end corresponding to EZ speed coefficients are stored in the storage section 133 within the interchangeable lens 100.

In FIG. 23B, at the telephoto end (the same also applies to the wide end), if a deceleration commencement position 35 that is closet to the distance until stop that is shown in FIG. 23C is reached, deceleration control is commenced for the stepping motor. Deceleration control causes lowering of speed in line with the deceleration table 37.

The movement distance from commencement of deceleration until stop differs with drive speed, and so, as shown in FIG. 23C, the deceleration commencement position differs in accordance with EZ speed coefficient, and as drive speed becomes faster, the deceleration commencement position becomes a position that is further from the telephoto end or the wide end. Also, in the case where movement distance is different for the first zoom group 105 and the second zoom group, respectively different tables are stored. Also, in FIG. 23B, there may be cases where the current position 36 is detected as the neutral position, where speed of the zoom ring detected by the EZ speed switching detection mechanism 171 is 0, and in this case also deceleration is performed in line with the deceleration table 37. Also, in FIG. 23B, only one zoom group is shown, but as shown in FIG. 23A similar deceleration control is carried out respectively for the first and second zoom groups in accordance with the end sections.

Figure 24A:
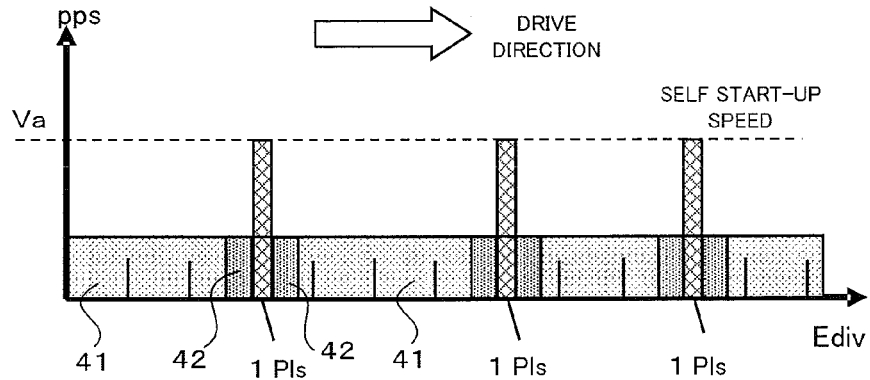
FIG. 24A-FIG. 24C are drawings for describing operation of the electronic zoom (EZ) at the time of intermittent drive, in the interchangeable lens of one embodiment of the present invention, FIG. 24A showing an excitation operation at the time of intermittent drive, FIG. 24B showing operation in the case of changing from intermittent operation to non-intermittent operation, and FIG. 24C showing operation in the case of changing from non-intermittent operation to intermittent operation.

Next, intermittent drive will be described using FIG. 24A-FIG. 24C. As was described using FIG. 8B, the second zoom group (4G) 107 is subject to intermittent drive toward the telephoto end. In the non-intermittent drive region, the 3G and 4G synchronous position tables shown in FIG. 8A are referenced at the time the 3G Ediv is updated, and drive control is carried out at the corresponding 4G drive speed. In the event that the corresponding 4G drive position is an intermittent drive region, tracking such as non-intermittent (synchronous) drive cannot be carried out, and only Pls position is tracked. With intermittent drive, while 3G is being continuously tracked, 4G is discretely tracked, and so there is a little image degradation. Since there is a 1Pls degree of error for a number of Ediv, it is possible to keep image quality within a permissible range.

Setting of drive parameters will be described using FIG. 24A. With intermittent drive there is only drive of a maximum of 1 Pls for 1 Ediv. Also drive speed at that time is made the self-starting speed Va of the stepping motor 179a. For a region 42 driven 1 Pls forward or backward, there is no initial excitation/retained excitation applied to the stepping motor 179a. In a region 41 where there is no drive of the stepping motor 179a, weak excitation is applied. This applied excitation voltage is the same voltage as the drive voltage. Applying weak excitation is for maintaining a relationship between electrodes and magnetic poles of the stepping motor, and so that rotation does not occur.

During intermittent drive, in the event that the zoom ring (zoom function switching operation member 143) has returned to the neutral position, namely in the case of reaching a drive stop position, after the lapse of a weak excitation time at the time of non-intermittent drive, the weak excitation voltage is the same voltage as the drive voltage, and so the weak excitation voltage at the time of non-intermittent drive is restored. Setting of drive voltage is the performing of voltage setting in accordance with the temperature-area-voltage table that was described using FIG. 11A and FIG. 11B.

Intermittent drive is carried out with the second zoom group (4G) 107, but update of 4G Ediv representing relative position of 4G is carried out on the basis of 3G Ediv. Borders between non-intermittent drive and intermittent drive are determined on the basis of 3G Ediv, and with this embodiment an intermittent→Non-intermittent border Ediv (Inter_T2W) as shown in FIG. 24B, and a non-intermittent→intermittent border Ediv (Inter_W2T) as shown in FIG. 24C, are stored. With this embodiment, the border differs depending on drive direction, but is also possible to have a structure in which directionality is not considered.

Figure 24B:
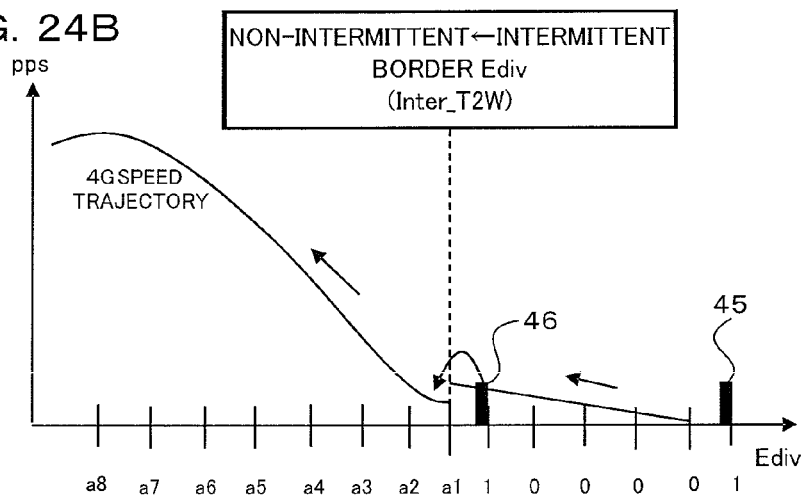

Switching from intermittent to non-intermittent occurs in the telephoto to wide direction, as shown in FIG. 24B. If intermittent drive is carried out (refer to reference numeral 45), fractional numbers of Pls less than 1 Pls are accumulated, and intermittent drive is carried out when the fractional number of Pls reaches 1 Pls. If the border Inter_T2W is exceeded, there is a switch from intermittent drive to non-intermittent drive. Numerical values shown below the horizontal axis of FIG. 24B represent number of Pls, with a1-a8 representing a number of Pls that is neither 0 nor 1.

Figure 24C:
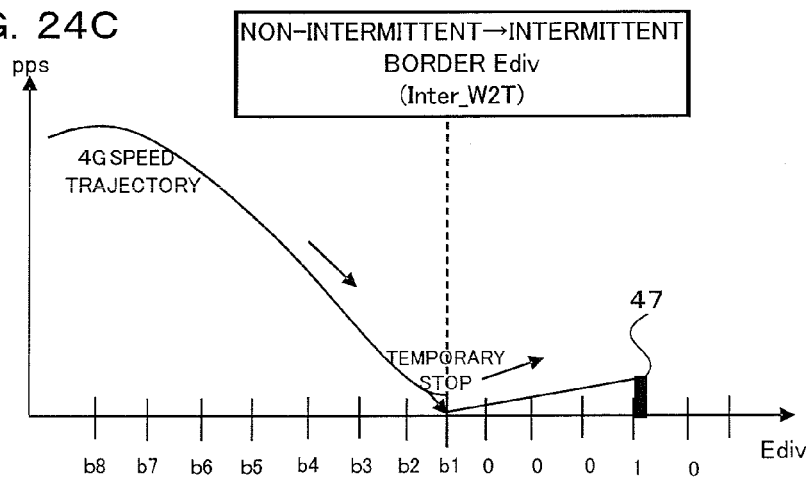

Switching from non-intermittent to intermittent occurs in the wide to telephoto direction, as shown in FIG. 24C. If the border Inter_W2T from non-intermittent drive is exceeded, there is a temporary stop, and drive for the next Ediv is set to 0 Pls. After that, a fractional number of Pls is accumulated, and intermittent drive is carried out once the accumulated value exceeds 1 Pls (refer to reference numeral 47). Numerical values shown below the horizontal axis in FIG. 24C represent number of Pls, with b1-b8 representing a number of Pls that is neither 0 nor 1, similarly to FIG. 24B.

Figure 25:
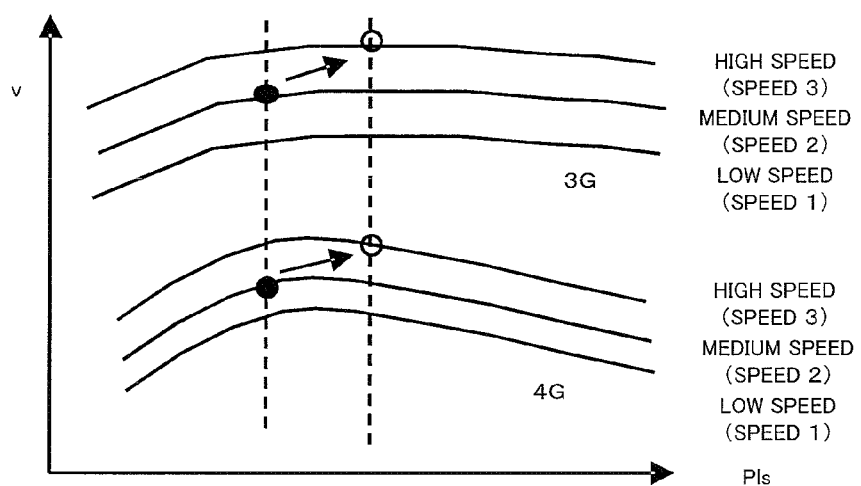
FIG. 25 is a graph showing an outline of trajectories of the first zoom group (3G) and the second zoom group (4G) at the time of speed switching of the electronic zoom (EZ), in the interchangeable lens of one embodiment of the present invention.

Next, speed switching of the first zoom group (3G) 105 and the second zoom group (4G) 107 will be described using FIG. 25-FIG. 27. As described previously, if the zoom ring (zoom function switching operation member 143) is subjected to a turning operation, it is possible to change the zooming speed in accordance with the rotational angle. For example, with the example shown in FIG. 25, when zooming at medium speed the zoom ring is operated to switch the speed to high speed. With this embodiment, mutual speed switching is possible between high-speed, medium speed, and low-speed.

Processing for this speed switching is generally carried out as shown below.

(1) Zoom ring speed update is carried out every fixed time according to the encoder of the EZ speed switching detection mechanism 171. If the result of detection is that position (rotational angle) is unchanged, constant speed drive continues, and in the event that the speed has been switched, speed change for the first zoom group (3G) 105 and the second zoom group (4G) 107 is carried out simultaneously at the time of the next encoder update.

(2) In the event that speed change is carried out, a speed change amount for 1 step is imparted in accordance with GearK shown in FIG. 13A. GearK is determined such that there is a speed transition that does not cause a problem even if it is changed in 1 step.

(3) Switching of the speed is carried out when different speeds have been detected in the same direction as the drive direction by zoom ring speed detection. In the case of an operation in the opposite direction, the previously described deceleration is carried out.

The above processing is for the case of non-intermittent drive, but in the case of an intermittent drive region the first zoom group (3G) 105 is subjected to processing for the speed switching with non-intermittent (synchronous) drive. Intermittent drive of the second zoom group (4G) 107 is carried out in accordance with speed switching processing for the first zoom group 105, based on updated Ediv information. At the time of intermittent drive, only position tracking for the second zoom group is carried out based on positional information of the first zoom group 105. As a result, in actual fact speed change processing is not performed for the second zoom group 107.

Figures 26A, 26B:
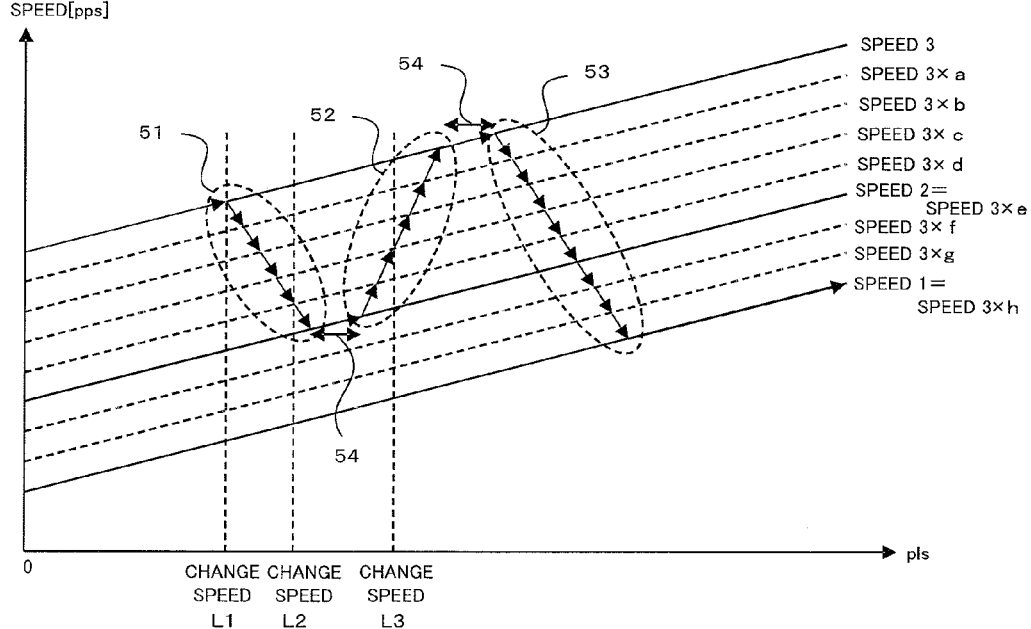
FIG. 26A and FIG. 26B are graphs showing an outline of trajectories of the first zoom group (3G) at the time of speed switching of the electronic zoom (EZ), in the interchangeable lens of one embodiment of the present invention With FIG. 26A being a graph showing an outline of the first zoom group (3G), and FIG. 26B showing a relationship between 3G position and 3G speed.

One example of speed switching processing is shown in FIG. 26A and FIG. 26B. With the example shown in FIG. 26A, until position L1 is reached constant speed drive at speed 3 (high speed) is carried out, but at position L1 a speed change instruction 1 for changing from speed 3 to speed 2 is received. Speed change drive to decelerate to speed 2, as shown in the segment of reference numeral 51, and in FIG. 26B, is carried out based on this speed change instruction 1. When carrying out this speed change drive, the speed for speed 3 is multiplied by a speed change coefficient to obtain the new speed. Specifically, actual controlled speed is obtained from 3G speed×speed change coefficient for the first zoom group 105, and from 4G speed×speed change coefficient for the second zoom group 107. The alphabetic characters on the right side of FIG. 26A are speed change coefficients. Once processing using the speed change instruction is completed, processing using a speed change instruction 2 performed at position L2 is carried out in the segment shown by reference numeral 52. Further, processing using the speed change instruction 3 performed at position L3 is carried out in the segment shown by reference numeral 53.

After dealing with the speed change instructions, the next speed change is carried out in Ediv units. With the illustrated example, the speed change instruction 2 is received at position L2, but in segment 54 for the lowest 1 Ediv a flat speed is secured. A GearK is determined so that speed change amount for one Pls becomes less than or equal to speed change amount of the acceleration and deceleration tables. For this reason the flat portion during speed change need not be considered. In the case of changing from acceleration to deceleration, acceleration change doubles and there is a possibility of loss of synchronization. A speed flat period is therefore provided. However, the speed flat period is limited to a normal time, a Pls number for a fixed period must be calculated in accordance with drive speed, and processing using firmware is made complicated.

In speed switching towards the wide end, in the case where a coefficient at the time of speed gear switching is fixed, processing for speed change is very time consuming. In order to counteract this, the following processing is carried out.
(1) Provided with a speed threshold, and a speed change coefficient is switched depending on the speed.
(2) Change is performed in Ediv units.
(3) Coefficient is switched for both first zoom group 105 and second zoom group 107.

Figure 27:
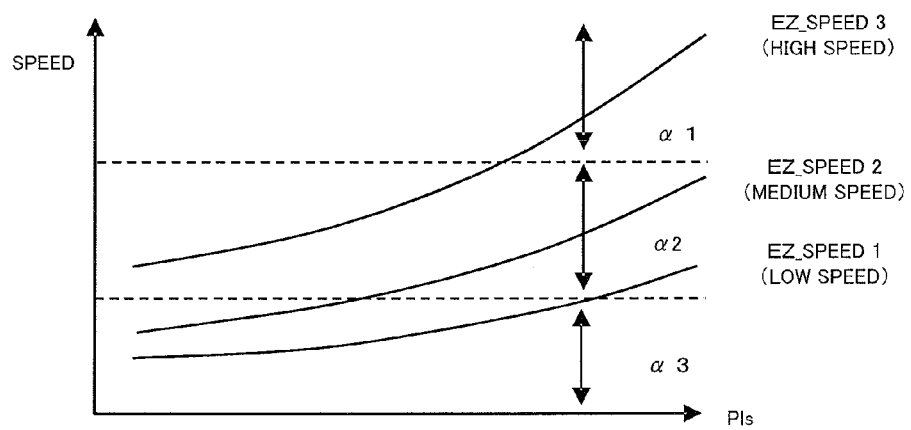
FIG. 27 is a graph showing coefficient switching using EZ speed change coefficients at the time of speed switching of the electronic zoom (EZ), in the interchangeable lens of one embodiment of the present invention.

For example, in FIG. 27, if initial speed is made vt0 and speeds for Ediv units are made vt1, vt2, . . . , then $$vt1 = vt0 \times \alpha1$$
$$vt2 = vt1 \times \alpha1$$
$$\ldots$$

to sequentially obtain speeds.

If there is a switch from threshold A speed to threshold B speed (dotted lines in the drawings show thresholds), the coefficient is changed from $\alpha1$ to $\alpha2$, to obtain speeds as described below.

$$vt11 = vt10 \times \alpha2$$
$$vt12 = vt11 \times \alpha2$$
$$\ldots$$

Figure 28:
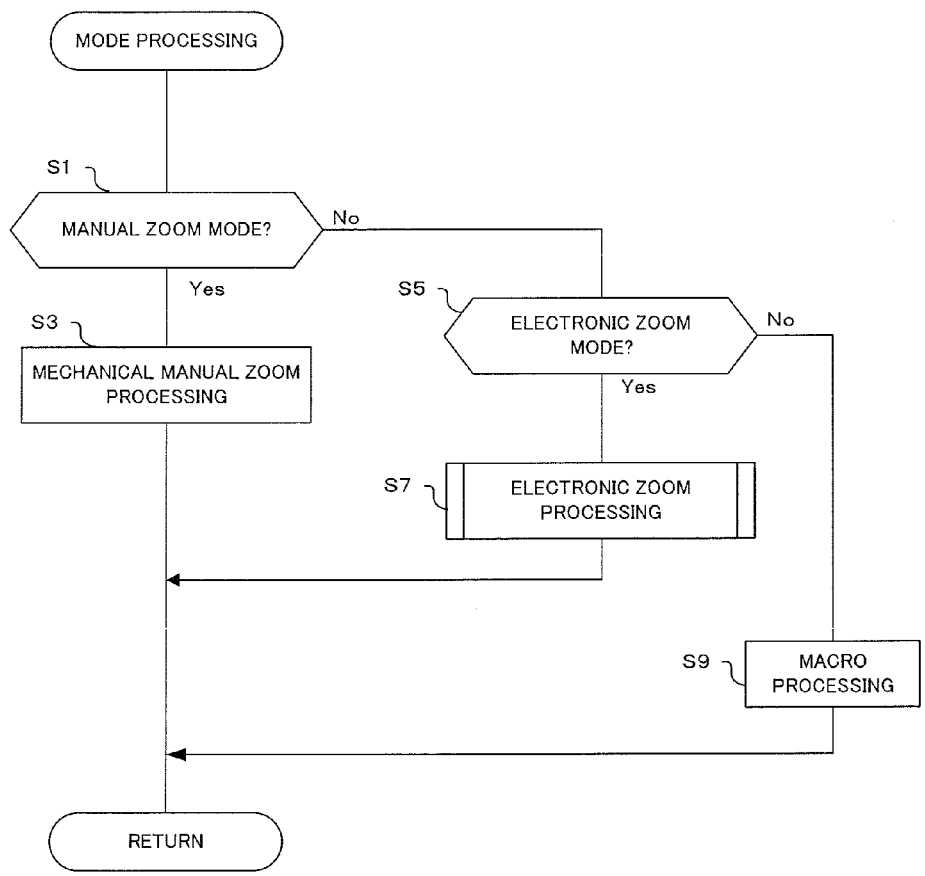
FIG. 28 is a flowchart showing operation of mode processing, in the interchangeable lens of one embodiment of the present invention.
Figure 38:
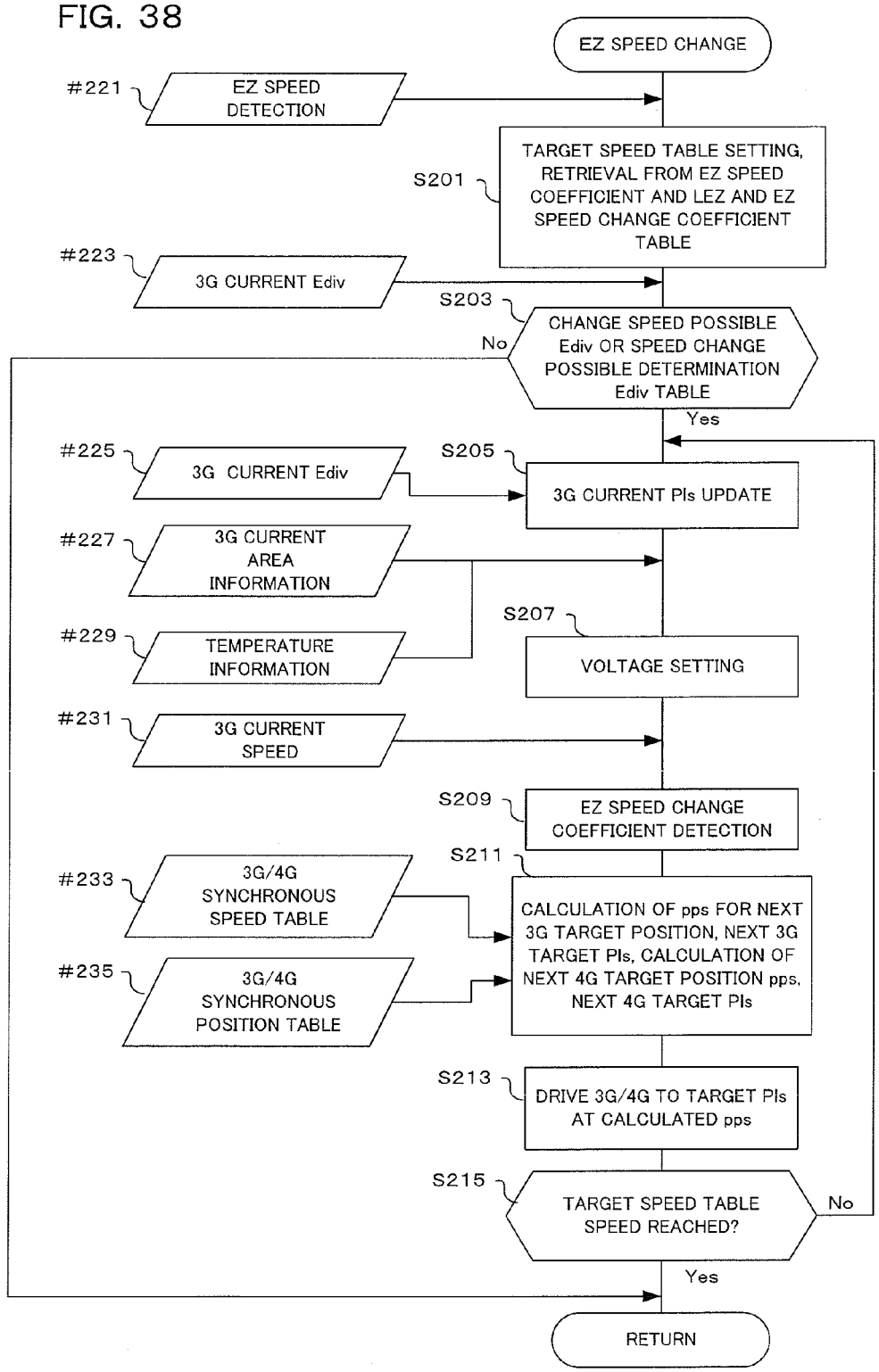
FIG. 38 is a flowchart showing operation of EZ speed change, in the interchangeable lens of one embodiment of the present invention.

Next, operation of the interchangeable lens 100 of one embodiment of the present invention will be described using the flowcharts shown in FIG. 28 two FIG. 38. These flowcharts are executed by a CPU of the control section 131 based on programs that have been stored in the storage section 133.

If the flow for mode processing is entered during the main flow, which is not illustrated, it is first determined whether or not it is manual zoom mode (S1). Here, as was described using FIG. 6 and FIG. 7A-FIG. 7C, it is determined whether or not the position of the zoom function switching operation member 143 is the mechanical manual zoom (MZ) position based on result of detection by the EZ/MZ switching detection mechanism 169.

If the result of determination in Step S1 is that it is manual zoom mode, mechanical manual zoom processing is executed (S3). Here, as shown in FIG. 3, drive and zooming of the first zoom group 105 are carried out directly with drive force due to a rotation operation of the zoom function switching operation member 143. Once mechanical manual zoom processing has been carried out, the originating flow is returned to.

If the result of determination in step S1 was that it is not manual zoom mode, it is next determined whether or not it is electronic zoom mode (S5). Here, it is determined whether or not the position of the zoom function switching operation member 143 is the electronic zoom (EZ) position based on result of detection by the EZ/MZ switching detection mechanism 169.

If the result of determination in Step S5 is that it is electronic zoom mode, electronic zoom processing is executed (S7). Here, the first zoom group 105 and the second zoom group 107 are driven by the 3G actuator 175 and the 4G actuator 179 in accordance with rotation direction and rotation angle of the zoom ring (zoom function switching operation member 143). Details of this electronic zoom processing will be described later using FIG. 29. Once electronic zoom processing is completed, the originating flow is returned to.

If the result of determination in Step S5 is that it is not electronic zoom mode, macro processing is executed (S9). Here, the first zoom group 105 and the second zoom group 107 are driven to a predetermined position, and focus is carried out using the focus lens 103. Once macro processing is complete, the original processing flow is returned to.

Figure 29:
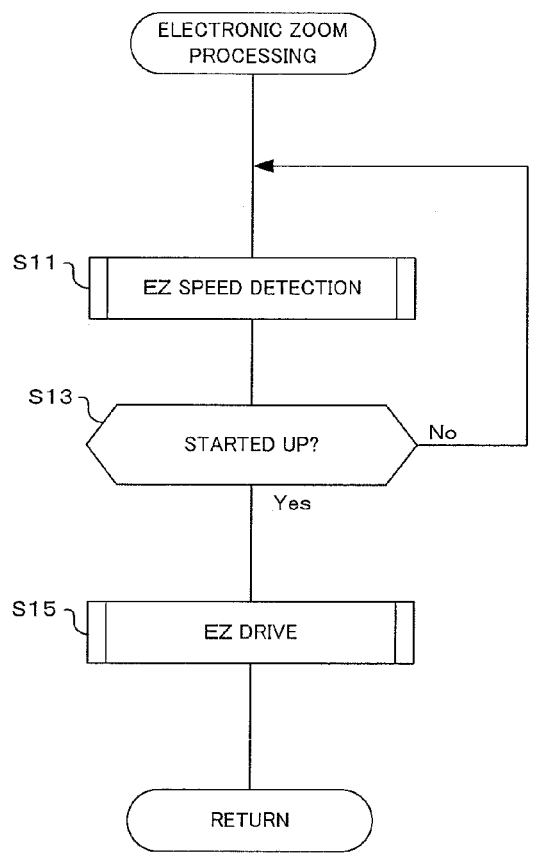
FIG. 29 is a flowchart showing operation of electronic zoom processing, in the interchangeable lens of one embodiment of the present invention.

Next, the electronic zoom processing of step S7 (refer to FIG. 28) will be described using FIG. 29. If the electronic zoom processing flow is entered, EZ speed detection is first carried out (S11). Here, as was described using FIG. 6 and FIG. 7A-FIG. 7C, a Gray code encoder of the EZ speed switching detection mechanism 171 detects rotational angle of the zoom ring (zoom function switching operation member 143), and detects which one of high-speed (speed 3), medium speed (speed 2), low-speed (speed 1) or the neutral position the user has set. Details of this EZ speed detection will be described later using FIG. 30.

Once EZ speed detection has been carried out, it is next determined whether or not start-up has taken place (S13). If the result of EZ speed detection is not the neutral position, the unit is in a start-up state, and so in this step determination is based on EZ speed detection result. If the result of this determination is that it is not start-up, processing returns to step S11.

If the result of determination in step S13 is that the unit has started up, next, EZ drive is carried out (S15). Zooming operation start-up, constant speed drive, deceleration drive and stopping etc. are carried out in accordance with turning operation state of the zoom ring (zoom function switching operation member 143). Details of the EZ drive will be described later using FIG. 31. Once EZ drive has been carried out, the originating flow is returned to.

Figure 30:
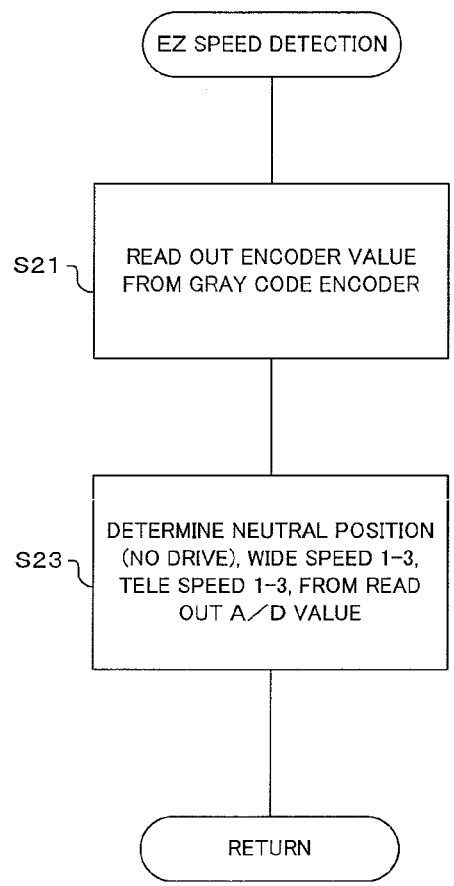
FIG. 30 is a flowchart showing operation of EZ speed detection, in the interchangeable lens of one embodiment of the present invention.

Next, the EZ speed detection of step S11 (refer to FIG. 29) will be described using FIG. 30. If the flow for EZ speed detection is entered, first of all an encoder value is read from the Gray code encoder (S21). Here, a value of the Gray code encoder of the EZ speed switching detection mechanism 171 that was described using FIG. 7A-FIG. 7C is read.

Then, neutral position (non-driven) wide speeds 1-3 and telephoto speeds 1-3 are determined from the A/D value that has been read (S23). Once determination has been performed the originating flow is returned to.

Figure 31:
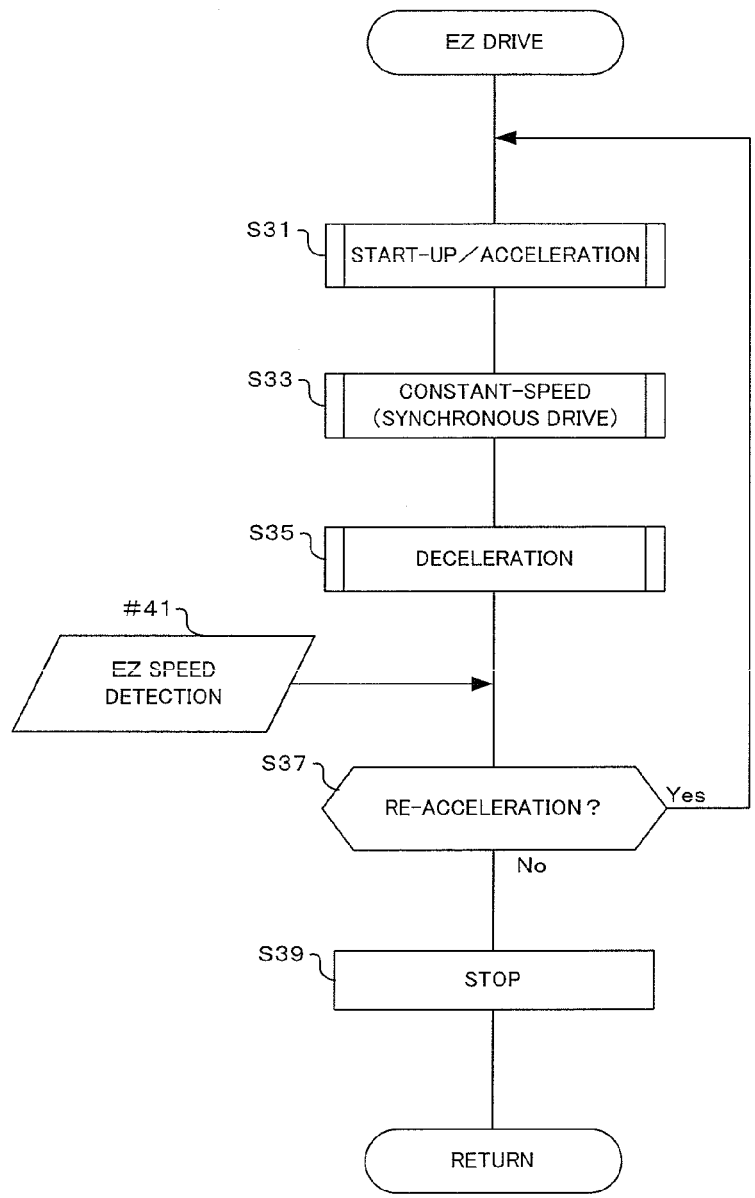
FIG. 31 is a flowchart showing operation of EZ drive, in the interchangeable lens of one embodiment of the present invention.

Next, the EZ drive of step S15 (refer to FIG. 29) will be described using FIG. 31. If the flow for EZ drive is entered, first of all start-up/acceleration is executed (S31). Here, start-up and acceleration processing for the electronic zoom (EZ) modes that was described using FIG. 18-FIG. 21B is executed. Detailed operation of this start-up/acceleration will be described later using FIG. 32.

Once the start-up/acceleration has been carried out, next, constant speed (synchronous drive) is executed (S33). Here, processing for constant speed (synchronous drive) of the electronic zoom (EZ) mode that was described using FIG. 22 is executed. Detailed operation of this constant speed (synchronous drive) will be described later using FIG. 36.

Once constant speed (synchronous drive) has been carried out, deceleration is executed next (S35). Here, processing for deceleration of the electronic zoom (EZ) mode that was described using FIG. 23A-FIG. 23C is executed. Detailed operation of this deceleration will be described later using FIG. 37.

At the time of processing the deceleration of step S35 from the start-up/acceleration of step S31, EZ speed detection is carried out (#41). The EZ speed detection is the CPU executing detection of output of the EZ speed switching detection mechanism 171 at a specified cycle (for example, 100 ms). The speed detection for electronic zoom is performed every time the stepping motor 175a and the stepping motor 179a are driven by 1 Pls (1 pulse drive), to detect speed setting by operation of the zoom ring, namely high speed, medium speed, low-speed or neutral. At the time of start-up/acceleration drive, constant speed drive, and deceleration drive, drive control is carried out in line with the EZ speed table, based on this detected EZ speed.

Once the deceleration has been performed in step S35, it is next determined whether or not to accelerate again (S37). Here, the user performs a rotation operation of the zoom ring (zoom function switching operation member 143), and it is determined whether or not it is necessary to increase the zoom speed based on the detection result from the EZ speed switching mechanism 171. If the result of this determination is that reacceleration is necessary, processing returns to step S31.

If the result of determination in step S37 is that reacceleration is not necessary, a stop is performed (S39). Here, in the event that the zoom ring is at the neutral position, the stopped state is maintained as it is. Once the stop has been performed the originating flow is returned to.

Figure 32:
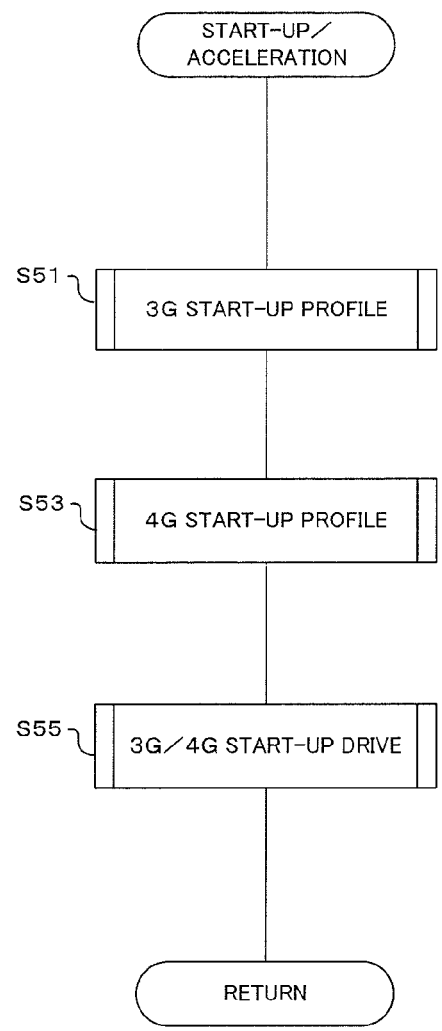
FIG. 32 is a flowchart showing operation of start-up/acceleration, in the interchangeable lens of one embodiment of the present invention.

Next, the start-up/acceleration of step S31 (refer to FIG. 31) will be described using FIG. 32. If the start-up/acceleration flow is entered, the 3G start-up profile is executed (S51). Here, as was described using FIG. 18-FIG. 20B, a profile for performing drive along an acceleration curve from a reference point position where start-up of the first zoom group (3G) 105 commences towards a target setting position, is produced. Detailed operation of this 3G start-up profile will be described later using FIG. 33.

Once the 3G start-up profile has been carried out, next the 4G start-up profile is executed (S53). Here, as was described using FIG. 19, FIG. 21A and FIG. 21B, a profile for performing drive in line with an acceleration table from a reference point position where start-up of the second zoom group (4G) 107 commences towards a target setting position, is produced, while taking into consideration the start-up profile of the first zoom group (3G) 105. Detailed operation of this 4G start-up profile will be described later using FIG. 34.

Once the 4G start-up profile has been carried out, next 3G/4G start-up drive is executed (S55). Here, start-up drive of the first zoom group (3G) 105 is carried out in accordance with the 3G start-up profile that was created in step S51, and start-up drive of the second zoom group (4G) 107 is carried out in accordance with the 4G start-up profile that was created in step S53. Once 3G/4G start-up drive has been carried out, the originating flow is returned to.

Figure 33:
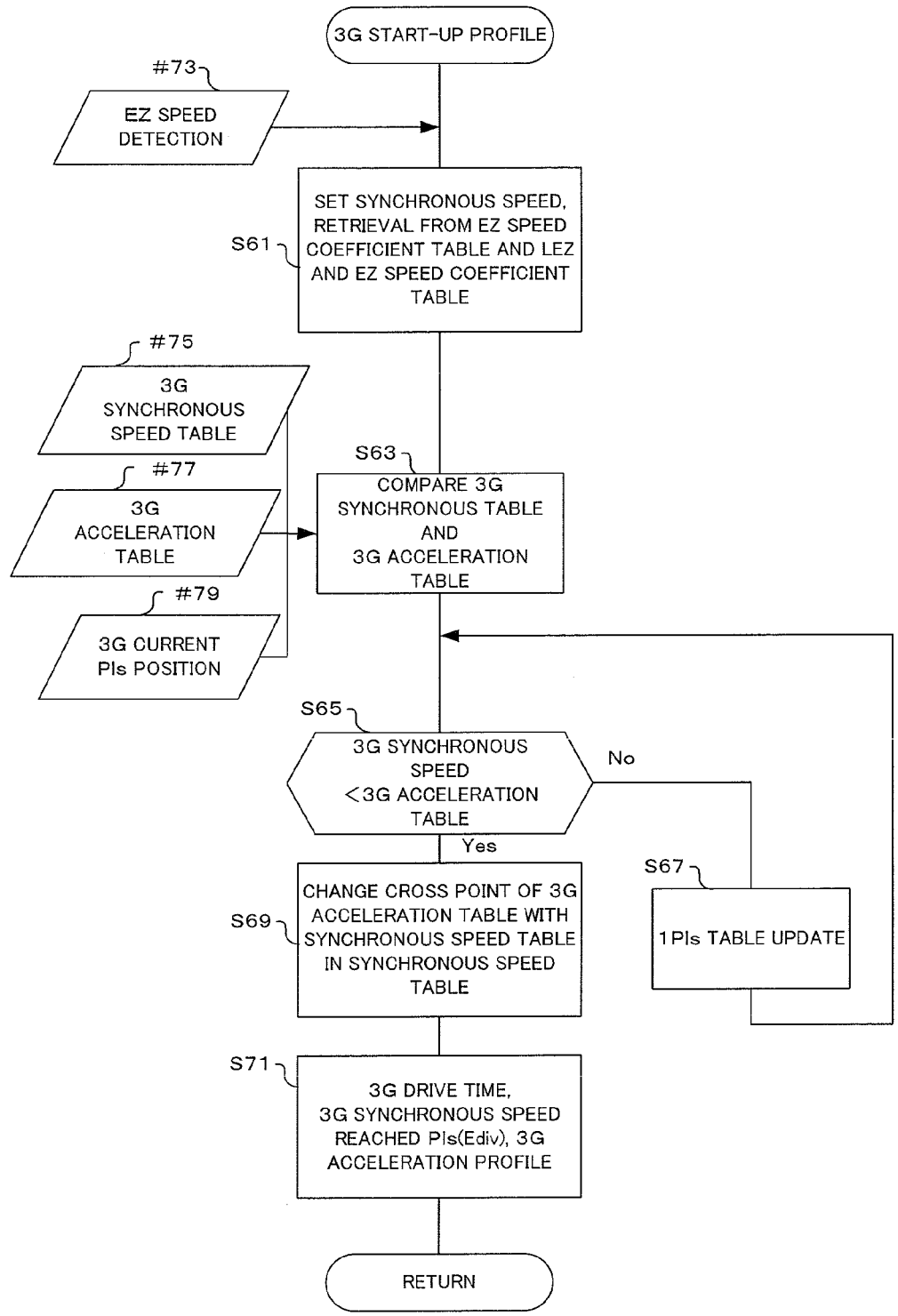
FIG. 33 is a flowchart showing operation of a 3G start-up profile, in the interchangeable lens of one embodiment of the present invention.

Next, the 3G start-up profile of step S51 (refer to FIG. 32) will be described using FIG. 33. If the flow for the 3G start-up profile is entered, first, similarly to step #41 (refer to FIG. 31), EZ speed detection is carried out (#73). Here, speed setting using zoom ring operation is detected every time the stepping motor 175a and the stepping motor 179a are driven by 1 Pls (1 pulse drive).

Next, retrieval is performed using an EZ speed coefficient table and an LEZ and EZ speed coefficient table, and synchronous speed setting is carried out (S61). Here, setting in order to select synchronous speed shown in FIG. 18 is carried out using the EZ speed coefficient shown in FIG. 13A and correspondence between the LEZ button and the coefficient EZ speed coefficient shown in FIG. 13B. Specifically, one of either high-speed (speed 3), medium speed (speed 2) or low-speed (speed 1) is selected using the LEZ button (zoom function switching operation member 143), and since selection of a movie or still picture is carried out at the camera body 200 side, one of 1-5 is selected as an Index using FIG. 13C. Change coefficient for each gear is set from the EZ speed coefficient index of FIG. 13A corresponding to the selected Index. Once change coefficient has been set, it is possible to carry out setting of synchronous speed by multiplying the synchronous speed shown in FIG. 8B by the change coefficient.

Once the synchronous speed setting has been carried out in step S61, next comparison of the 3G synchronization table and the 3G acceleration table is carried out (S63). Here, comparison is carried out on the basis of the 3G synchronous speed table that is based on the synchronous speed that was set in step S61 (#75), the 3G acceleration table (#77), and the 3G current Pls position (#79). Specifically, as shown in FIG. 20B, 3G synchronous speed corresponding to the Pls position representing the current position of the first zoom group 105, and an acceleration table corresponding to the Pls position, are compared Once the comparison of step S63 has been carried out, it is determined whether or not the 3G synchronous speed is smaller than the 3G acceleration table (S65). If result of this determination is that the 3G synchronous speed is larger than the 3G acceleration table, the current Pls position is increased by 1Pls and table update is carried out (S67). As described using FIG. 20B, synpps1, being the Pls1 3G synchronous speed, and acceleration table accpps1 are compared, and since the result of comparison is that the 3G synchronous speed is larger, a 1Pls increase is carried out and comparison of synpps1, which is now the Pls2 synchronous speed, and acceleration table accpps2, is carried out. In the case where the 3G synchronous speed is larger, the current Pls value is increased by one, step S65 is returned to, and comparison performed again.

If the result of comparison in step S65 is that the 3G synchronous speed is smaller than the 3G acceleration table, the point at which the 3G acceleration table crosses the synchronous speed table is shifted on to the synchronous speed table speed (S69). As described using FIG. 20B, if current Pls11 is attained, then 3G synchronous speed synpps11 becomes smaller than acceleration table accpps11, and so although the acceleration table up to then was written to the drive profile curve, change is performed so as to write the 3G synchronous speed to the drive profile curve.

Next, 3G drive time and 3G synchronous speed attainment Pls are obtained, and a 3G acceleration profile is created (S71). Here, an accumulated time for drive time entered in the right column of FIG. 20B is calculated as 3G drive time, and a Pls position at which the comparison result reverses (Pls11 in FIG. 20B) is obtained, to create the drive profile curve (3G acceleration profile). Once this step is complete, the original processing flow is returned to.

Figure 34:
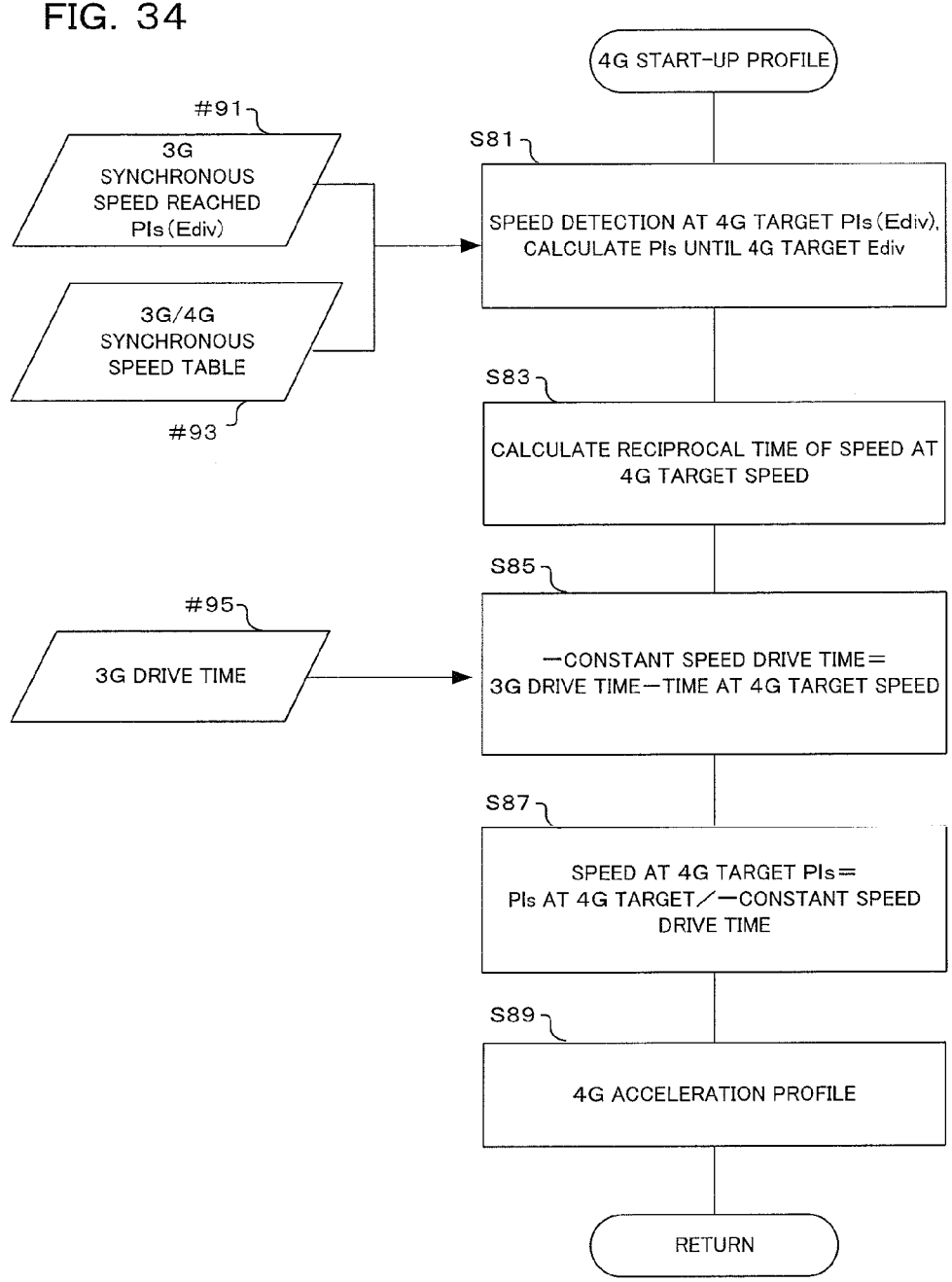
FIG. 34 is a flowchart showing operation of a 4G start-up profile, in the interchangeable lens of one embodiment of the present invention.

Next, the 4G start-up profile of step S53 (refer to FIG. 32) will be described using FIG. 34. If the flow for the 4G start-up profile is entered, first Pls up to the 4G target Ediv is calculated, and speed at the 4G target Pls (Ediv) is retrieved (S81). Here, Pls up to the 4G target Ediv is calculated using 3G synchronous speed attainment Pls (Ediv) (#91) and the 3G/4G synchronous speed table (#93), and speed at the 4G target Pls is retrieved. As was described using FIG. 21A and FIG. 21B, at the time of start-up of the second zoom group (4G) 107, drive is initially performed not with gradual acceleration, but at a speed close to the synchronous speed. In this step S81, retrieval of speed at the 4G target Pls, and calculation of Pls up to the 4G target Ediv, are carried out from the 3G attainment Pls that was obtained in step S71 (FIG. 33) and the 3G synchronous speed.

Next, reciprocal time for the speed at the 4G target speed is calculated (S83). Here, a reciprocal time for the speed at the 4G target Pls that was obtained in step S81 is calculated.

Next, a constant speed drive time is calculated by subtracting the time at the 4G target Pls from the 3G drive time (S85). Here, a time for performing constant speed drive at the speed V0 in FIG. 21A is calculated by subtracting the time at the 4G target Pls (corresponding to tm in FIG. 21A) from the 3G drive time (#95).

Once the constant speed drive time has been obtained in step S85, a speed to the 4G target Pls is calculated by dividing the Pls to the 4G target by the constant speed drive time (S87).

Once the speed to the 4G target Pls has been calculated, a 4G acceleration profile is created (S89). Here, the 4G acceleration profile shown in FIG. 21B (4G acceleration table) is created based on the processing in steps S81-S87. Once the 4G acceleration profile has been created, the originating flow is returned to.

Figure 35:
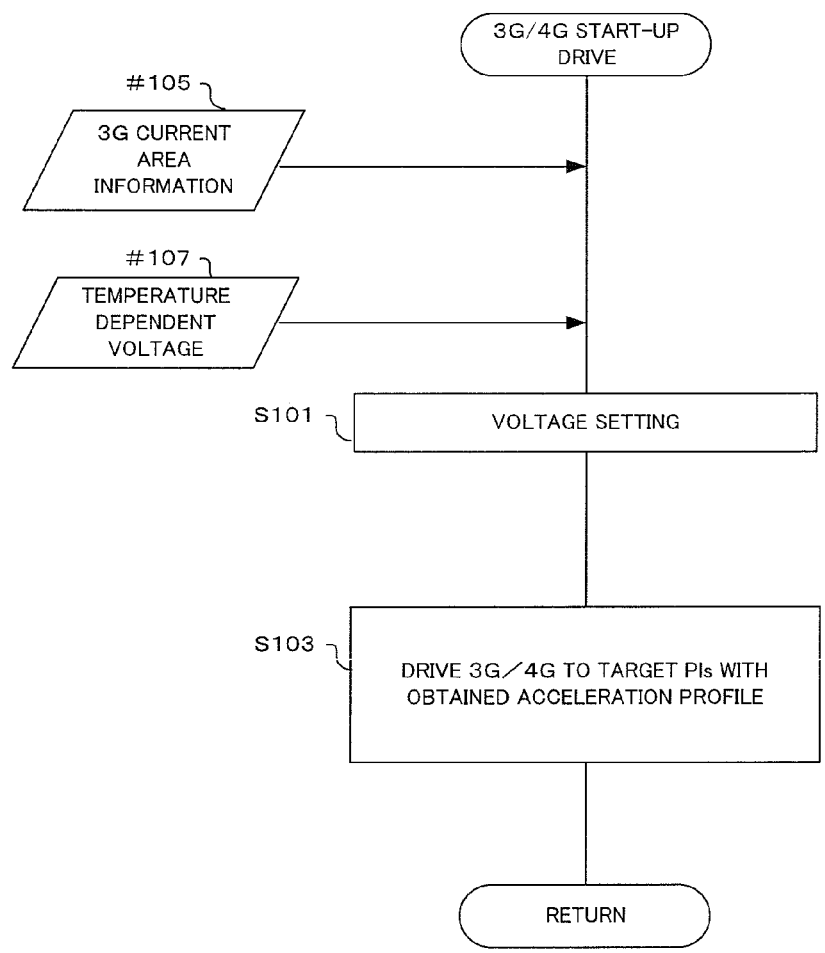
FIG. 35 is a flowchart showing operation of 3G/4G start-up drive, in the interchangeable lens of one embodiment of the present invention.

Next, the 3G/4G start-up drive of step S55 (refer to FIG. 32) will be described using FIG. 35. If the flow for 3G/4G start-up drive is entered, 3G current area information (#105) and temperature information (#107) are read. Pls position information is read every time the stepping motor 177a and the stepping motor 179a are subjected to stepping drive, and the area information and temperature information are updated at that time. As was described using FIG. 9B, current position of the first zoom group (3G) 105 is divided into areas A-H, and the 3G current area information is positional information showing which of these areas the 3G zoom group is in. Also, as was described using FIG. 11A and FIG. 11B, temperature information is measured using a measurement circuit that is not shown in the drawings.

Next, voltage setting is carried out (S101). As was described using FIG. 11A and FIG. 11B, drive voltages for the stepping motor 175a for driving the first zoom group (3G) 105 and for the stepping motor 179a for driving the second zoom group (4G) 107 are switched in accordance with environmental temperature, zooming speed and 3G current area information (A-H). In this step, voltage setting is carried out based on these items of information.

Once voltage setting has being carried out, 3G/4G are driven to target Pls at the obtained acceleration profile (S103). Here, the stepping motor 175a and the stepping motor 179a are driven to move the first and second zoom groups 105 and 107 towards the target Pls in accordance with the 3G start-up profile that was created in step S51 (refer to FIG. 33), and the 4G start-up profile that was created in step S53 (refer to FIG. 34). Once this step has been executed, the original processing flow is returned to.

Figure 36:
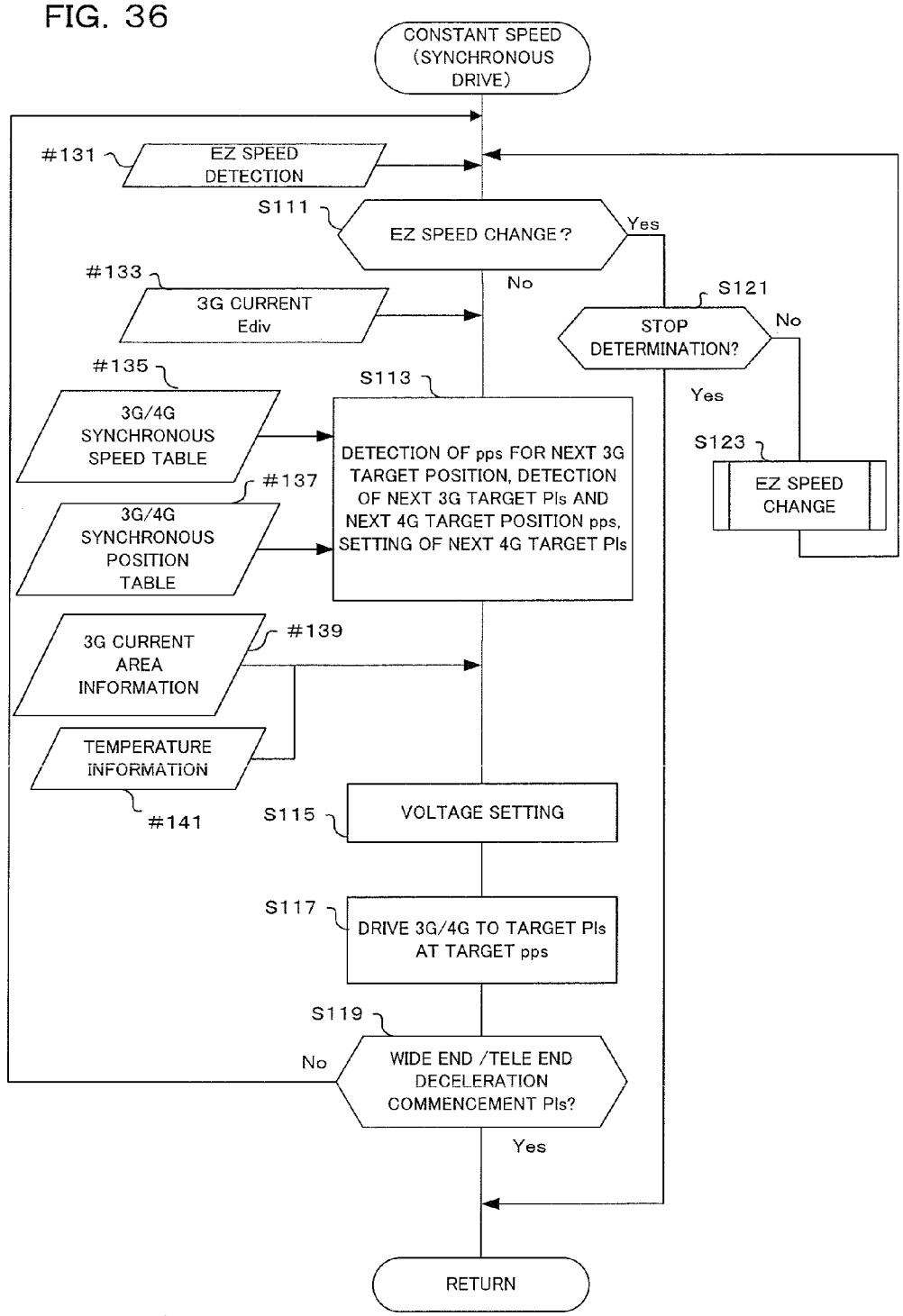
FIG. 36 is a flowchart showing a constant speed (synchronous drive) operation in the interchangeable lens of one embodiment of the present invention.

Next, the constant speed (synchronous drive) of step S33 (refer to FIG. 31) will be described using FIG. 36. If the constant speed (synchronous drive) flow is entered, then EZ speed detection is carried out similarly to step #41 (#131). As was described previously, speed setting by the zoom ring is detected every time the stepping motor 175a and the stepping motor 179a are driven by 1 Pls (1 pulse drive).

Next, it is determined whether or not there has been EZ speed change (S111). Here, determination as to whether or not change of the zooming speed has been carried out is made based on the detection result in step #131. If the result of this determination is that there has been speed change, is determined if there is stop determination (S121). Here, it is determined whether or not the zoom ring has been set to the neutral position. If result of this determination is that there has been a stop, the original processing is returned to and the deceleration processing of step S35 (refer to FIG. 31) is carried out to cause a stop.

If the result of determination in step S121 is not that a stop determination has been performed, there is a speed change other than a stop, and so EZ speed change is carried out (S123). Here, as was described using FIG. 25-FIG. 27, speed change control for the case where a change in zooming speed has been performed is carried out. Details of this EZ speed change will be described using FIG. 38. Once EZ speed change has been carried out, step S111 is returned to.

If the result of determination in step S111 was that there was no EZ speed change, 3G current Ediv is acquired (#133). Here, the 3G current Pls representing relative position of the first zoom group (3G) 105 is converted to Ediv units.

Subsequently, detection of speed pps for the next 3G target position, setting of the next 3G target Pls, detection of speed for the next 4G target, and setting of the next 4G target Pls are carried out (S113). Here, a 3G/4G synchronous speed table (#135) and the 3G/4G synchronous position table are acquired, and setting of target Pls is carried out for each zoom group using the current Ediv for the first zoom group (3G) 105 that was read out in #133.

Once target Pls for each zoom group has been set, then 3G current area information (#139) is obtained similarly to #105, and temperature information (#141) is obtained similarly to #107. Next voltage setting is carried out similarly to step S101

(S115). When carrying out constant speed drive, optimum drive voltage is set for the stepping motor 175a and the stepping motor 179a.

Once voltage setting has been carried out 3G/4G are next driven to the target Pls at the target pps (S117). Here, as was described in FIG. 22, drive of the first and second zoom groups 105 and 107 toward the target positions is next carried out. Specifically, drive is carried out towards the target Pls at the speed pps that was set in step S113.

Once drive towards the target Pls has been carried out in step S117, it is next determined whether the current position of 3G/4G is at the wide end or the telephoto end, and whether it is at the deceleration commencement Pls (S119). As was described using FIG. 23B and FIG. 23C, in the event that the current position is close to the wide end or the telephoto end, deceleration is commenced just before the wide end or the telephoto end in order to present collision with the wide end or the telephoto end. Here, it is determined whether or not the current position is at the deceleration commencement position such as is illustrated in FIG. 23C (in FIG. 23C, deceleration commencement position is shown in Ediv units).

If the result of determination in step S119 is not the deceleration commencement position at the wide end or the telephoto end, processing returns to step S111 and synchronous drive continues. On the other hand, if the result of determination is close to the deceleration commencement position at the wide end or the telephoto end, the originating flow is returned to and deceleration drive is carried out in step S35.

Figure 37:
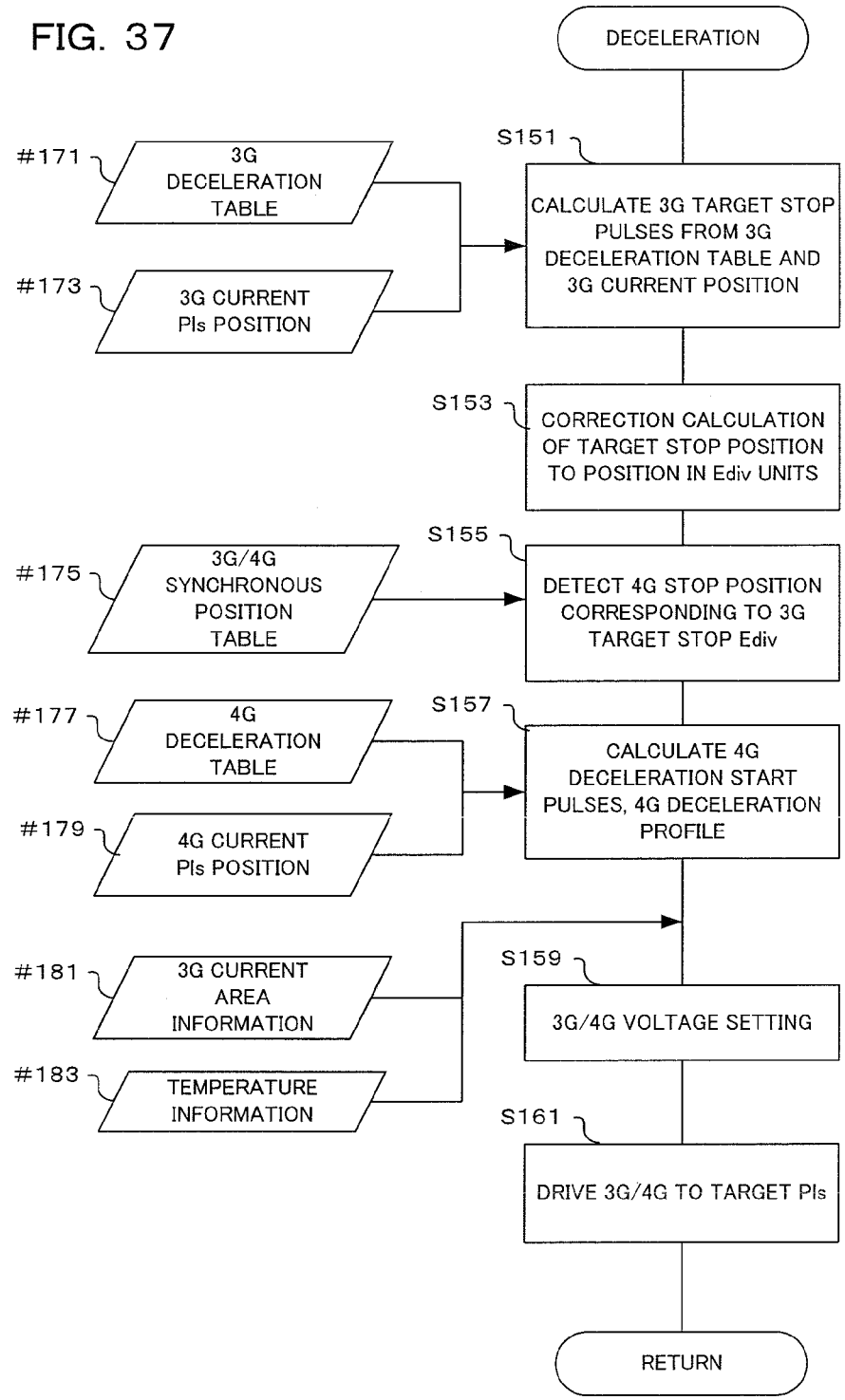
FIG. 37 is a flowchart showing a deceleration operation, in the interchangeable lens of one embodiment of the present invention.

Next, the deceleration of step S35 (refer to FIG. 31) will be described using FIG. 37. If the flow for deceleration is entered, a 3G deceleration table (#171) and a 3G current Pls position (#173) are obtained, and 3G target stop pulses are calculated from the 3G deceleration table and the 3G current position (S151). Here, as was described using FIG. 23A-FIG. 23C, target stop position for the first zoom group (3G) 105 is calculated.

Next, the target stop position is subjected to correction calculation to a position in Ediv units (S153). Since calculation is carried out in Pls units in step S151, this is corrected to Ediv units.

Once the target stop position has been corrected to Ediv units in step S153, next a 3G/4G synchronous position table (#175) is obtained, and 4G target Ediv retrieval corresponding to the 3G target stop Ediv is carried out (S155). Since stop target position for the first zoom group (3G) 105 has been calculated in steps S151 and S153, a stop target position for the second zoom group (4G) 107 corresponding to the first zoom group stop position is obtained.

Once the 4G target stop position has been obtained in step S155, next a 4G deceleration table (#177) and a 4G current Pls position (#179) are obtained, 4G deceleration start Pls is calculated, and a 4G deceleration profile is created (S157). Here, a deceleration table up to deceleration commencement position and stop target position for the second zoom group (4G) 107 is created.

Next, 3G current area information (#181) is obtained similarly to #105, and temperature information (#183) is obtained similarly to #107. Once these items of information have been acquired, 3G/4G voltage setting is carried out (S159). At the time of deceleration drive for the first and second zoom groups 105 and 107, voltage setting is carried out based on the acquired information.

Once voltage setting has being carried out, 3G/4G are driven to target Pls (S161). Here, deceleration of the first zoom group 105 towards the stop target position is carried out in line with the 3G deceleration table, and at the same time deceleration of the second zoom group 107 is carried out in line with the 4G deceleration profile that was created in step S157. Once 3G/4G have been driven to the target Pls, the originating flow is returned to.

Next, the EZ speed change of step S123 (refer to FIG. 36) will be described using FIG. 38. If the EZ speed change flow is entered, then EZ speed detection is carried out similarly to step #41 (#221). Here, every time the stepping motor 175a and the stepping motor 179a are driven by 1 Pls (1 pulse drive), high speed, medium speed, low-speed or neutral resulting from operation of the zoom ring is detected.

Next, similarly to step S61, target speed table is set by retrieving EZ speed coefficient and LEZ/EZ speed coefficient table (S201). Here, setting of synchronous speed in accordance with zooming speed that has been changed by rotational operation of the zoom ring (zoom function switching operation member 143) is carried out.

Next, similarly to #133, 3G current Ediv is acquired (#223). Next, it is determined whether or not it is a speed change possible Ediv, based on the speed change possible determination Ediv shown in FIG. 14 (S203). Here, in the event that the first zoom group 105 is at the wide end or the telephoto end, if a change in zooming speed has been carried out there is a possibility of collision with the end section, and therefore if the position is within the Ediv illustrated in FIG. 14, speed change is prevented from being carried out. If the result of this determination is not a change possible Ediv, the flow for EZ speed change is terminated and the originating flow is returned to.

On the other hand, if the result of determination in step S203 is that speed change is possible, then next, similarly to #223, 3G current Ediv (#225) is acquired, and update to 3G current Pls is carried out (S205). If 3G current Ediv is known, change is possible to the 3G current Pls.

Next, 3G current area information (#227) is obtained similarly to #105, and temperature information (#229) is obtained similarly to #107. Once these items of information have been acquired, voltage setting is carried out (S207). At the time of changing drive speed for the first zoom group 105, voltage setting is carried out based on the acquired information.

Once voltage setting has been carried out, 3G current speed that is stored in a non-illustrated storage area is acquired (#231). Next, retrieval of EZ speed change coefficient is carried out (S209). The EZ speed change coefficient is a coefficient corresponding to speed, as illustrated in FIG. 13B, and retrieval is carried out based on the 3G current speed that was acquired in #231.

Speed pps for the next 3G target position is then calculated by referencing the 3G/4G synchronous speed table (#233) and the 3G/4G synchronous position table (#235), the next target 3G Pls is set, speed pps for the next 4G target position is calculated, and the next 4G target Pls is set (S211). Here, as was described using FIG. 26A and FIG. 26B, target speed is calculated and a target position is set.

Once target speed and target position have been set in step S211, next 3G/4G are driven to the target Pls at the calculated pps (S213). Here, the stepping motor 175a and the stepping motor 179a are driven based on the speed pps and the position Pls that was set in step S211.

Once drive of the stepping motors has been carried out in step S213, it is next determined whether the speed of the target speed table has been reached (S215). Here, whether or not the speed of the target speed table corresponding to the zooming speed that has been set using the zoom ring has been reached is determined by comparing 3G current speed that is stored and speed of the target speed table.

If the result of determination in step S215 is that the target speed has not been reached, step S205 is returned to and speed change toward the target speed is carried out. On the other hand, if the target speed has been reached the EZ speed change flow is terminated and the originating flow is returned to.

As has been described above, with one embodiment of the present invention, the interchangeable lens includes a first drive section (first ZM group drive section 115) for moving a first zoom group (3G) 105 using a first actuator (stepping motor 175a), and a second drive section (second ZM group drive section 117) for moving a second zoom group (4G) 107 using a second actuator (stepping motor 179a) that is different to the first actuator of the first drive section, and position of the second zoom group 107 is controlled based on positional information of the first zoom group 105. Also, at the time of this control the second zoom group 107 is synchronized to the movement speed of the first zoom group 105. As a result, it is possible to prevent degradation in image quality due to a zoom operation during movie shooting.

Also, with the one embodiment of the present invention drive control for the second zoom group (4G) 107 is carried out with reference to the first zoom group (3G) 105. This makes it possible to simplify control and reduce size.

With the one embodiment of the invention, a range in which focal distance can be varied using an optical zoom of a zoom lens unit is divided into a plurality of regions, and the control section controls the first drive section and the second drive section. As a result it is possible to divide into plurality of regions and carry out control most appropriately for each region.

Also, with the one embodiment of the present invention, since control is carried out based on positional information of a position detection section for the first lens group, while maintaining a relative positional relationship with the second lens group, it is possible to reduce the size of the zoom lens unit and also to prevent degradation in image quality.

With the one embodiment of the present invention, acceleration and deceleration parameters for when carrying out acceleration and deceleration operations are stored, and by carrying out control of movement speed in accordance with these parameters, a positional relationship between the first and second lens group is maintained, and it is possible to prevent degradation in image quality.

With the one embodiment of the present invention, there is a switch from start-up drive to constant speed drive, and it is possible to carry out switching of the drive smoothly at the time of zoom drive commencement. When carrying out speed control at the time of start-up, control of the second lens group is carried out in accordance with movement of the first lens group, and it is possible to carry out smooth lens start-up control at the time of zoom drive commencement.

Also, with the one embodiment of the present invention since acceleration and deceleration coefficients are used, it is possible to reduce the storage capacity for control of the lens groups. Also, since speed change parameter information is used, it is possible to reduce the storage capacity for lens group control. Also, since intermittent drive is carried out when the movement speed of the second lens group is smaller than a specified speed, it is possible to prevent degradation in image quality even if speed drops below the specified speed.

Also, with the one embodiment of the present invention, control of zooming operations has been carried out within the interchangeable lens 100, but it is also possible to carry out control at the camera body side by means of a communication section. Also, the zoom groups are constituted by two groups, namely the first zoom group (3G) 105 and the second zoom group (4G) 107, but is also possible to have a structure with three or more lens groups.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. The present invention can be applied to any of the implementations, providing it is a device for taking pictures that adopts a zoom optical system.

Also, regarding the operation flow in the patent claims, the specification and the drawings, for the sake of convenience description has been given using words representing sequence, such as "first" and "next", but this does not mean that implementation must be in this order.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument having first and second lens groups capable of moving in an optical axis direction in order to perform optical zooming, comprising:
   a first drive section for moving the first lens group using a first actuator;
   a second drive section for moving the second lens group using a second actuator that is different from the first actuator of the first drive section;
   a storage section for storing information on the position of the first lens group and position of the second lens group in accordance with a specified focal length of the optical instrument, and storing information relating to movement speed of the first lens group and movement speed of the second lens group in accordance with specified focal length;
   a first lens group position detection section for detecting position of the first lens group; and
   a control section for calculating a first synchronous speed of the first lens group and a second synchronous speed of the second lens group, which are respective movement speeds for synchronizing the movement speed of the first lens group and movement speed of the second lens group, based on position of the first lens group, and movement speed of the first lens group and movement speed of the second lens group that have been stored in the storage section, calculating a first target position for the first lens group and a second target position for the second lens group based on position of the first lens group and information relating to position information of the first lens group and position information on the second lens group that has been stored in the storage section, and controlling the first drive section and the second drive section so as to respectively move the first lens group to the first target position at the first synchronous speed, and move the second lens group to the second target position at the second synchronous speed.

2. The optical instrument of claim 1 wherein:
a range in which it is possible to vary focal length using optical zoom of the optical instrument is divided into a plurality of regions;
the control section controls position of the first lens group and position of the second lens group, at both ends of each region of the plurality of regions, based on the information on the position of the first lens group and the position of the second lens group corresponding to a specified focal length that has been stored in the storage section, and
at both ends of each region of the plurality of regions, controls the first drive section and the second drive section so as to move the first lens group and the second lens group by synchronizing movement speed of the first lens group and movement speed of the second lens group, based on information relating to movement speed of the first lens group and movement speed of the second lens group corresponding to specified focal length that has been stored in the storage section.

3. The optical instrument of claim 1 wherein:
the storage section further stores acceleration and deceleration parameter information for when carrying out an acceleration operation for movement of the first lens group,
the control section, based on the acceleration and deceleration parameter information relating to the first lens group, movement speed of the first lens group corresponding to a specified focal length, and initial position at the time of start-up of the first lens group,
calculates a switching target position for switching from acceleration and deceleration based on the acceleration and deceleration information, to drive using a first synchronous speed based on movement speed corresponding to a specified focal length, and
controls the first drive section so as to move the first lens group at a movement speed based on the acceleration and deceleration parameter information from an initial position at the time of start-up to the switching target position.

4. The optical instrument of claim 3, wherein:
the control section calculates a second synchronous speed at a position of the second lens group corresponding to the switching target position, based on information relating to position of the second lens group corresponding to the switching target position, and movement speed of the first lens group and movement speed of the second lens group corresponding to the specified focal length,
calculates movement time for the first lens group from an initial position at the time of start-up of the first lens group to the switching target position, and
calculates the second lens group movement speed based on the second synchronous speed of the second lens group and the movement time of the first lens group, and controls the second drive section so as to move the second lens group at said movement speed.

5. The optical instrument of claim 4 wherein:
the storage section stores a plurality of movement speeds for the first lens group corresponding to the specified focal length; and
the control section selects one from among the plurality of movement speeds of the first lens group corresponding to the specified focal length, and controls the first drive section so as to move the first lens group based on selected movement speed of the first lens group corresponding to the specified focal length.

6. The optical instrument of claim 1 wherein:
the storage section further stores acceleration and deceleration parameter information for when carrying out a deceleration operation for movement of the first lens group and a deceleration operation for the second lens group; and
the control section calculates a stop target position for the first lens group based on current position of the first lens group and the acceleration and deceleration parameter information,
obtains a stop target position for the second lens group based on the stop target position of the first lens group, position of the first lens group corresponding to the specified focal length, and positional information on the second lens group, and
controls the first drive section, based on the stop target position of the first lens group and the acceleration and deceleration parameter information, so as to move the first lens group, and controls the second drive section based on stop target position of the second lens group and the acceleration and deceleration parameter information so as to move the second lens group.

7. The optical instrument of claim 1 wherein:
the storage section further stores speed change parameter information used at the time of carrying out a speed change operation for movement of the first lens group and the second lens group; and
the control section, when carrying out a speed change operation for movement of the first lens group and the second lens group, calculates change movement speed for the first lens group based on the speed change parameter information that has been stored in the storage section, and the first lens group movement speed,
calculates change movement speed for the second lens group based on speed change parameter information that has been stored in the storage section and movement speed of the second lens group, and
controls the first drive section and the second drive section so as to move the first lens group and the second lens group based on change movement speed at the time of a speed change operation for the first lens group and the second lens group.

8. The optical instrument of claim 7 wherein:
the control section sets speed change coefficients based on speed change parameter information that has been stored in the storage section, and calculates movement speed of the first lens group and movement speed of the second lens group at the time of speed change by multiplying the movement speed of the first lens group and the movement speed of the second lens group by the same speed change coefficient.

9. The optical instrument of claim 7 further comprising:
a zoom speed change operation section for instructing zoom drive speed when operated, and wherein
the control section carries out the speed change operation based on output of the speed change operation section.

10. The optical instrument of claim 1 further comprising:
a determination section for determining whether or not the position of the second lens group is within a specified range, and wherein
the control section, when it has been determined by the determination section that the position of the second lens group is within a specified range,
stops processing to control movement of the first lens group and the second lens group by synchronizing movement speed of the first lens group and movement speed of the second lens group, based on information relating to movement speed of the first lens group and movement speed of the second lens group corresponding to specified focal length that has been stored in the storage section, and
controls the second drive section so as to move the second lens group based on positional information corresponding to a specified focal length of the first lens group and the second lens group that has been stored in the storage section.

11. The optical instrument of claim 10 wherein:
the storage section stores information representing within the specified range.

12. The optical instrument of claim 11 wherein:
the storage section stores a plurality of items of information relating to within the specified range in accordance with movement direction of the second lens group, and
the determination section performs determination by selecting information representing within the specified range depending movement direction of the second lens group.

13. An imaging device, for acquiring image data by forming a subject image on an image sensor, by means of an optical system having first and second lens groups capable of moving in an optical axis direction in order to perform optical zooming, comprising:
a first drive section for moving the first lens group using a first actuator;
a second drive section for moving the second lens group using a second actuator that is different from the first actuator of the first drive section;
a storage section for storing information on the position of the first lens group and position of the second lens group in accordance with a specified focal length of the imaging device, and storing information relating to movement speed of the first lens group and movement speed of the second lens group in accordance with specified focal length;
a first lens group position detection section for detecting position of the first lens group; and
a control section for calculating a first synchronous speed of the first lens group and a second synchronous speed of the second lens group, which are respective movement speeds for synchronizing the movement speed of the first lens group and movement speed of the second lens group, based on position of the first lens group, and movement speed of the first lens group and movement speed of the second lens group that have been stored in the storage section, calculating a first target position for the first lens group and a second target position for the second lens group based on position of the first lens group and information relating to position information of the first lens group and position information on the second lens group that has been stored in the storage section, and controlling the first drive section and the second drive section so as to respectively move the first lens group to the first target position at the first synchronous speed, and move the second lens group to the second target position at the second synchronous speed.

14. The imaging device of claim 13, wherein
a range in which it is possible to vary focal length using optical zoom of the optical system is divided into a plurality of regions;
the control section controls position of the first lens group and position of the second lens group, at both ends of each region of the plurality of regions, based on the information on the position of the first lens group and the position of the second lens group corresponding to a specified focal length that has been stored in the storage section, and
at both ends of each region of the plurality of regions, controls the first drive section and the second drive section so as to move the first lens group and the second lens group by synchronizing movement speed of the first lens group and movement speed of the second lens group, based on information relating to movement speed of the first lens group and movement speed of the second lens group corresponding to specified focal length that has been stored in the storage section.

15. The imaging device of claim 13, wherein
the storage section further stores acceleration and deceleration parameter information for when carrying out an acceleration operation for movement of the first lens group,
the control section, based on the acceleration and deceleration parameter information relating to the first lens group, movement speed of the first lens group corresponding to a specified focal length, and initial position at the time of start-up of the first lens group,
calculates a switching target position for switching from acceleration and deceleration based on the acceleration and deceleration information, to drive using a first synchronous speed based on movement speed corresponding to a specified focal length, and
controls the first drive section so as to move the first lens group at a movement speed based on the acceleration and deceleration parameter information from an initial position at the time of start-up to the switching target position.

16. The imaging device of claim 15, wherein:
the control section calculates a second synchronous speed at a position of the second lens group corresponding to the switching target position, based on information relating to position of the second lens group corresponding to the switching target position, and movement speed of the first lens group and movement speed of the second lens group corresponding to the specified focal length,
calculates movement time for the first lens group from an initial position at the time of start-up of the first lens group to the switching target position, and
calculates the second lens group movement speed based on the second synchronous speed of the second lens group and the movement time of the first lens group, and controls the second drive section so as to move the second lens group at said movement speed.

17. The imaging device of claim 15, wherein:
the storage section stores a plurality of movement speeds for the first lens group corresponding to the specified focal length; and
the control section selects one from among the plurality of movement speeds of the first lens group corresponding to the specified focal length, and controls the first drive section so as to move the first lens group based on selected movement speed of the first lens group corresponding to the specified focal length.

18. The imaging device of claim 13, wherein
the storage section further stores acceleration and deceleration parameter information for when carrying out a deceleration operation for movement of the first lens group and a deceleration operation for the second lens group; and
the control section calculates a stop target position for the first lens group based on current position of the first lens group and the acceleration and deceleration parameter information,
obtains a stop target position for the second lens group based on the stop target position of the first lens group, position of the first lens group corresponding to the specified focal length, and positional information on the second lens group, and
controls the first drive section, based on the stop target position of the first lens group and the acceleration and deceleration parameter information, so as to move the first lens group, and controls the second drive section based on stop target position of the second lens group and the acceleration and deceleration parameter information so as to move the second lens group.

19. The optical instrument of claim 1 further comprising:
a focus lens group;
a focus lens group drive; and
a focus lens group position detection section,
wherein the first lens group is a first zoom lens group, the second lens group is a second zoom lens group, and the first and second lens group collectively operate to provide a variable focal length.

20. The imaging device of claim 13 further comprising:
a focus lens group;
a focus lens group drive; and
a focus lens group position detection section,
wherein the first lens group is a first zoom lens group, the second lens group is a second zoom lens group, and the first and second lens group collectively operate to provide a variable focal length.

* * * * *